US012766963B2

(12) United States Patent
Kim et al.

(10) Patent No.: US 12,766,963 B2
(45) Date of Patent: Oct. 20, 2026

(54) DISPLAY DEVICE FOR VEHICLE

(71) Applicant: LG ELECTRONICS INC., Seoul (KR)

(72) Inventors: Sangwon Kim, Seoul (KR); Juung Jo, Seoul (KR); Selim Hong, Seoul (KR); Kyunglack Kim, Seoul (KR); Dongkuk Kim, Seoul (KR); Doyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/881,526

(22) PCT Filed: Nov. 18, 2022

(86) PCT No.: PCT/KR2022/018347
§ 371 (c)(1),
(2) Date: Jan. 6, 2025

(87) PCT Pub. No.: WO2024/010154
PCT Pub. Date: Jan. 11, 2024

(65) Prior Publication Data

US 2026/0001404 A1 Jan. 1, 2026

(30) Foreign Application Priority Data

Jul. 7, 2022 (KR) ........................ 10-2022-0084011

(51) Int. Cl.
*B60K 35/81* (2024.01)
*B60K 35/22* (2024.01)
(Continued)

(52) U.S. Cl.
CPC .............. *B60K 35/81* (2024.01); *B60K 35/22* (2024.01); *B60K 35/656* (2024.01);
(Continued)

(58) Field of Classification Search
CPC .......... B60K 35/81; G02F 1/1323; G01J 1/42; B60R 1/26
(Continued)

(56) References Cited

U.S. PATENT DOCUMENTS 10,366,219 B2 7/2019 Kurian
2020/0319512 A1 10/2020 Murzyn et al.
(Continued)

FOREIGN PATENT DOCUMENTS

CN 114253012 A 3/2022
DE 10 2017 220 935 A1 5/2019
(Continued)

*Primary Examiner* — Duane N Taylor, Jr.
(74) *Attorney, Agent, or Firm* — Birch, Stewart, Kolasch & Birch, LLP

(57) ABSTRACT

The present disclosure relates to a display device for a vehicle. This display device for a vehicle according to an embodiment of the present disclosure comprises: a display panel for outputting at least one item of content; a viewing angle adjustment panel comprising at least one liquid crystal layer composed of liquid crystals; and a control unit for changing a viewing angle with respect to the display panel through control of an arrangement of the liquid crystals, wherein the control unit may: determine a first limitation area of the display panel on the basis of a first condition related to driving of a vehicle; determine a second limitation area of the display panel on the basis of a second condition related to privacy; and control the arrangement of the liquid crystals so as to change viewing angles with respect to the first limitation area and the second limitation area. Various other embodiments are possible.

14 Claims, 37 Drawing Sheets

(51) Int. Cl.
*B60K 35/65* (2024.01)
*G02F 1/13* (2006.01)
*G02F 1/13357* (2006.01)

(52) U.S. Cl.
CPC ...... *G02F 1/1323* (2013.01); *G02F 1/133603* (2013.01); *B60K 2360/149* (2024.01); *B60K 2360/1868* (2024.01); *B60K 2360/1876* (2024.01); *B60K 2360/195* (2024.01); *B60K 2360/27* (2024.01); *B60K 2360/345* (2024.01); *B60K 2360/349* (2024.01); *B60K 2360/741* (2024.01)

(58) Field of Classification Search
USPC .............................................................. 345/38
See application file for complete search history.

(56) References Cited

U.S. PATENT DOCUMENTS

| | | | | |
|---|---|---|---|---|
| 2021/0063783 | A1* | 3/2021 | Byoun ................. | B60K 35/654 |
| 2024/0367521 | A1* | 11/2024 | Lottes .................... | B60K 35/53 |

FOREIGN PATENT DOCUMENTS

| | | | |
|---|---|---|---|
| JP | 2021-138342 | A | 9/2021 |
| KR | 10-2006-0032035 | A | 4/2006 |
| KR | 10-2021-0027719 | A | 3/2021 |
| KR | 10-2022-0022509 | A | 2/2022 |

* cited by examiner

<1710> <1720>

DISPLAY DEVICE FOR VEHICLE

CROSS REFERENCE TO RELATED APPLICATIONS

This application is the National Phase of PCT International Application No. PCT/KR2022/018347, filed on Nov. 18, 2022, which claims priority under 35 U.S.C. 119 (a) to Patent Application No. 10-2022-0084011, filed in the Republic of Korea on Jul. 7, 2022, all of which are hereby expressly incorporated by reference into the present application.

BACKGROUND

Technical Field

The present disclosure relates to a display device for a vehicle.

Discussion of the Related Art

A vehicle refers to a means of transporting people or goods by using kinetic energy. A representative example of a vehicle is a car.

Systems for the convenience and safety of vehicle users have been actively developed. For example, for the user's convenience, vehicles may provide functions such as adaptive cruise control (ACC), smart parking assist system (SPAS), night vision (NV), head-up display (HUD), around view monitor (AVM), adaptive headlight system (AHS), etc. For example, for the user's safety, vehicles may provide functions such as lane departure warning system (LDWS), lane keeping assist system (LKAS), autonomous emergency braking (AEB), etc.

Meanwhile, for the convenience and safety of vehicle users, vehicles are increasingly equipped with various sensors and electronic devices. In particular, vehicles are equipped with one or more display devices that can display information related to vehicle driving or content for user's convenience. A display device is a device designed to display an image that can be viewed by a user. For example, the display device may include a liquid crystal display (LCD) using liquid crystal or an organic light emitting diode (OLED) display using organic light emitting diode.

A driver or a passenger on board the vehicle can watch various content displayed through a display device. For example, a vehicle may output an instrument panel screen containing driving speed, driving distance, and the like through a display on the driver side, and output an OTT screen including content through a display on the passenger side.

However, various problems may occur due to content output through a display device installed in a vehicle. For example, if a driver seated in the driver's seat stares at a display on the passenger side due to content output through the display on the passenger side, the driver may momentarily lose focus of the view ahead, resulting in a traffic accident. In addition, when content belonging to a specific person on board a vehicle is output through a display device within the vehicle, the privacy of the specific person may be exposed to others in the vehicle. Further, when content output through a display device provided inside a vehicle is exposed to others outside the vehicle, the privacy of a vehicle user may be violated.

SUMMARY

It is an objective of the present disclosure to solve the above and other problems.

It is another objective of the present disclosure to provide a display device that can adjust a viewing angle for a display panel.

It is another objective of the present disclosure to provide a display device for a vehicle that can variously adjust a display area where a viewing angle is adjustable.

It is another objective of the present disclosure to provide a display device for a vehicle that can compensate for the luminance of an image output through an area where a viewing angle is adjustable, when a viewing angle for a display panel is adjusted.

It is another objective of the present disclosure to provide a display device for a vehicle that can prevent the privacy of a specific person in a vehicle from being exposed to others in the vehicle.

It is another objective of the present disclosure to provide a display device for a vehicle that can prevent content output through a display panel from being exposed to the outside of a vehicle.

In accordance with an aspect of the present disclosure, the above and other objectives can be accomplished by providing a display device for a vehicle, the display device including: a display panel configured to output at least one content; a viewing angle adjustment panel including at least one liquid crystal layer including liquid crystal molecules; and a controller configured to control an arrangement of the liquid crystal molecules to change a viewing angle for the display panel, wherein the controller is configured to: based on a first condition related to driving of a vehicle, determine a first restricted area of the display panel; based on a second condition related to privacy, determine a second restricted area of the display panel; and control the arrangement of the liquid crystal molecules to change a viewing angle for the second restricted area.

In one embodiment, the viewing angle adjustment panel may consist of a plurality of sub-units disposed side by side to independently control the arrangement of the liquid crystal molecules, and the plurality of sub-units may respectively correspond to a plurality of areas constituting the display panel.

In one embodiment, the viewing angle adjustment panel may include a plurality of substrates disposed on both sides of the liquid crystal layer, respectively. Based on a voltage being applied to the plurality of substrates, the arrangement of the liquid crystal molecules may be changed to a predetermined direction that restricts emission of light toward a driver's seat. The controller may be configured to apply a predetermined voltage to the plurality of substrates disposed in one area of the viewing angle adjustment panel that corresponds to at least one of the first restricted area and the second restricted area.

In one embodiment, the voltage applied to the one area of the viewing angle adjustment panel may increase as a distance between the one area of the viewing angle adjustment panel and the driver's seat decreases.

In one embodiment, based on a speed of the vehicle being greater than or equal to a predetermined speed limit, which is one of the first condition, the controller may be configured to determine one area of the display panel that is adjacent to a passenger seat as the first restricted area. A size of the first restricted area may increase as the speed of the vehicle increases.

In one embodiment, based on predetermined content related to driving of the vehicle being output, which is one of the first condition, the controller may be configured to determine the first restricted area in a remaining area, excluding an area where the predetermined content is output.

In one embodiment, based on predetermined content corresponding to a passenger seat being output, which is one of the second condition, the controller may be configured to determine an area of the display panel where the predetermined content is output as the second restricted area.

In one embodiment, the controller may be configured to: based on a state of a transmission of the vehicle corresponding to drive (D), reverse (R), or neutral (N), perform a determination on the first condition and the second condition; and based on the state of the transmission of the vehicle corresponding to park (P), perform a determination on the second condition.

In one embodiment, the controller may be configured to: based on the vehicle being in a manual mode, perform a determination on the first condition and the second condition; and based on the vehicle being in an autonomous mode, perform a determination on the second condition.

In one embodiment, the viewing adjustment panel may include: a plurality of first substrates respectively disposed on both sides of a first liquid crystal layer; and a plurality of second substrates respectively disposed on both sides of a second liquid crystal layer. Based on a voltage being applied to the plurality of first substrates, an arrangement of liquid crystal molecules included in the first liquid crystal layer may be changed to a first direction that restricts emission of light toward a driver's seat. Based on a voltage being applied to the plurality of second substrates, an arrangement of liquid crystal molecules included in the second liquid crystal layer may be changed to a second direction that restricts emission of light toward a passenger seat.

In one embodiment, the controller may be configured to: apply a predetermined voltage to the plurality of first substrates disposed in a first adjustment area of the viewing angle adjustment panel corresponding to the first restricted area and, of the second restricted area, a third restricted area related to privacy of the passenger seat; and apply a predetermined voltage to the plurality of second substrates disposed in a second adjustment area of the viewing angle adjustment panel corresponding to a fourth restricted area related to privacy of the driver's seat of the second restricted area.

In one embodiment, the controller may be configured to: based on first content corresponding to the passenger seat being output, which is one of the second condition, determine an area of the display panel where the first content being output as the third restricted area; and based on second content corresponding to the driver's seat being output, which is one the second condition, determine an area of the display panel where the second content is output as the fourth restricted area.

In one embodiment, based on a gaze of a user seated in the driver's seat being directed forward, the controller may be configured to stop determining on the first condition and, of the second condition, on whether the first content is output.

In one embodiment, the controller is configured to: perform a determination on the second condition based on the user being seated in the passenger seat; and stop determining on the second condition based on the user not being seated in the passenger seat.

In one embodiment, the controller may be configured to: based on a predetermined object located outside the vehicle approaching the driver's seat, apply a predetermined voltage to the plurality of first substrates disposed in one area of the viewing angle adjustment panel; and based on the predetermined object approaching the passenger seat, apply a predetermined voltage to the plurality of second substrates disposed in one area of the viewing angle adjustment panel.

Advantageous Effects

A display device for a vehicle according to an embodiment of the present has the following effects.

According to at least one of the embodiments of the present disclosure, it is possible to adjust a viewing angle for a display panel.

According to at least one of the embodiments of the present disclosure, it is possible to variously control display areas that are adjustable in viewing angle.

According to at least one of the embodiments of the present disclosure, it is possible to compensate for the luminance of an image output through an area where a viewing angle is adjustable, when a viewing angle for a display panel is adjusted.

According to at least one of the embodiments of the present disclosure, it is possible to prevent the privacy of a specific person in a vehicle from being exposed to others in the vehicle.

According to at least one of the embodiments of the present disclosure, it is possible to prevent content output through a display panel from being exposed to the outside of a vehicle.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

DETAILED DESCRIPTION OF THE EMBODIMENTS

Figure 1:
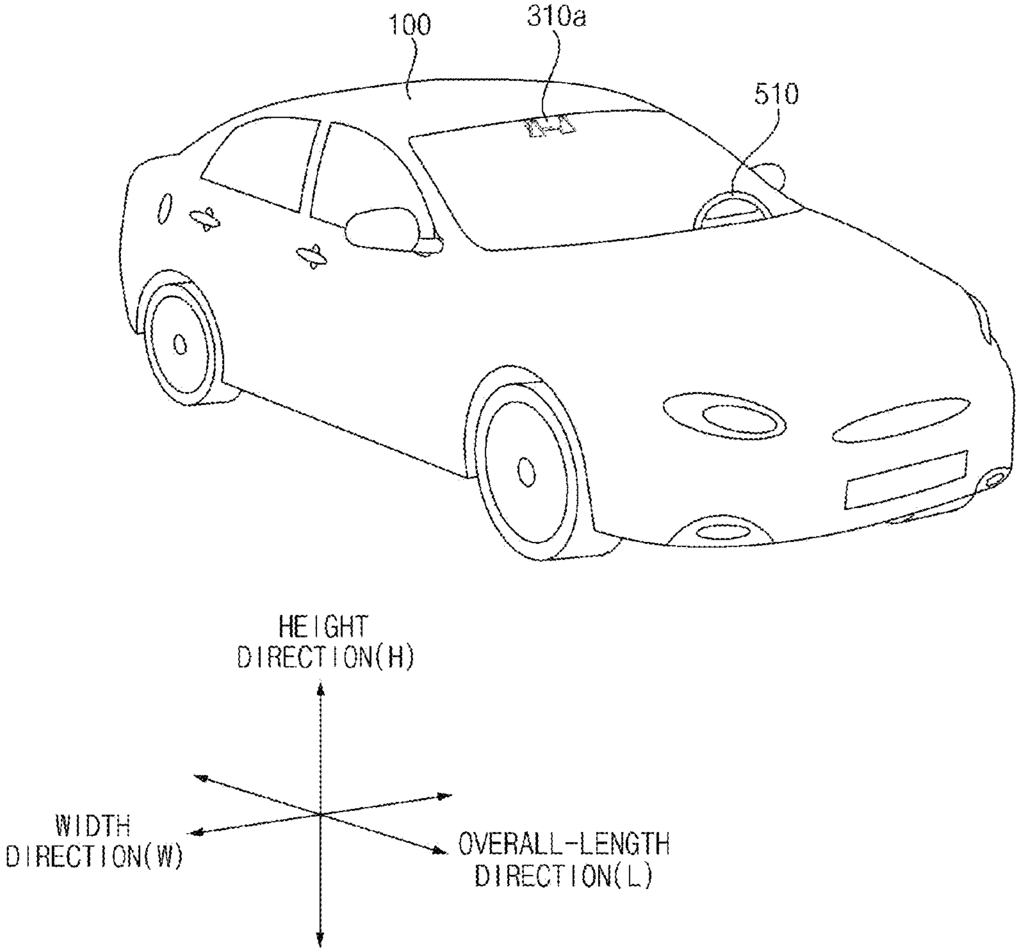
FIG. 1 illustrates an outer appearance of a vehicle, according to an embodiment of the present disclosure.
Figure 2:
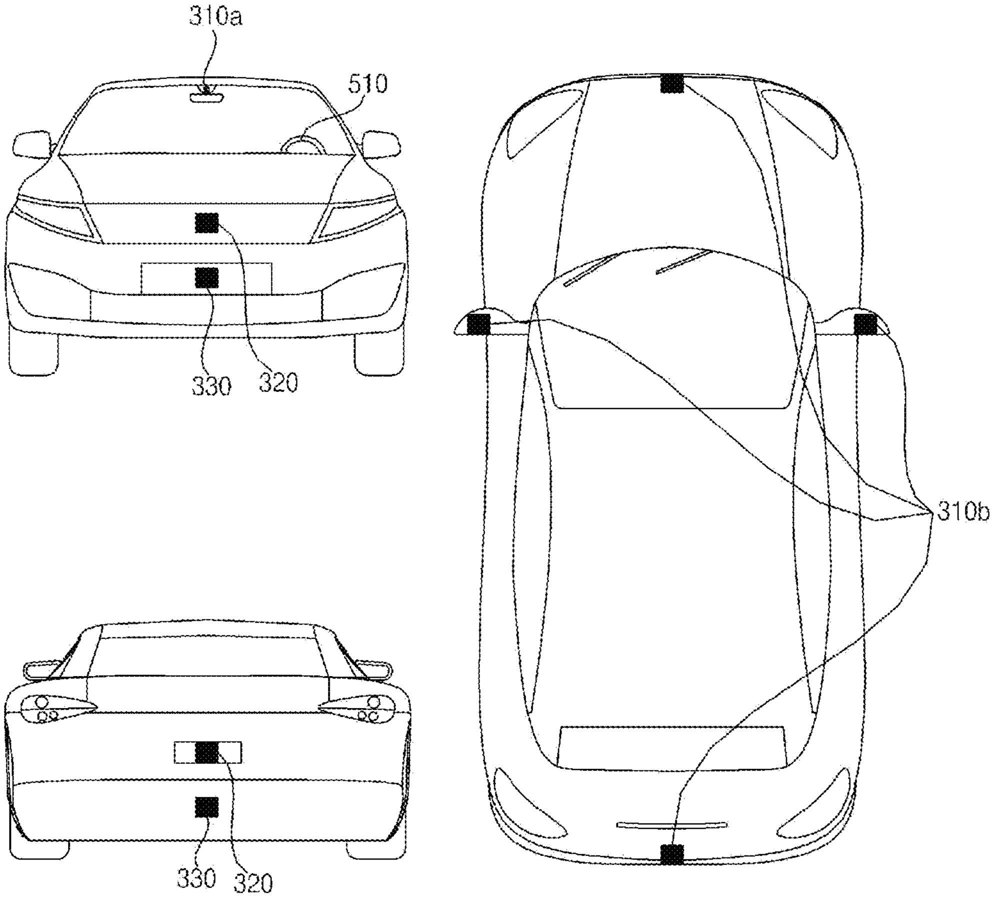
FIG. 2 illustrates a vehicle exterior from various angles, according to an embodiment of the present disclosure.
Figure 3:
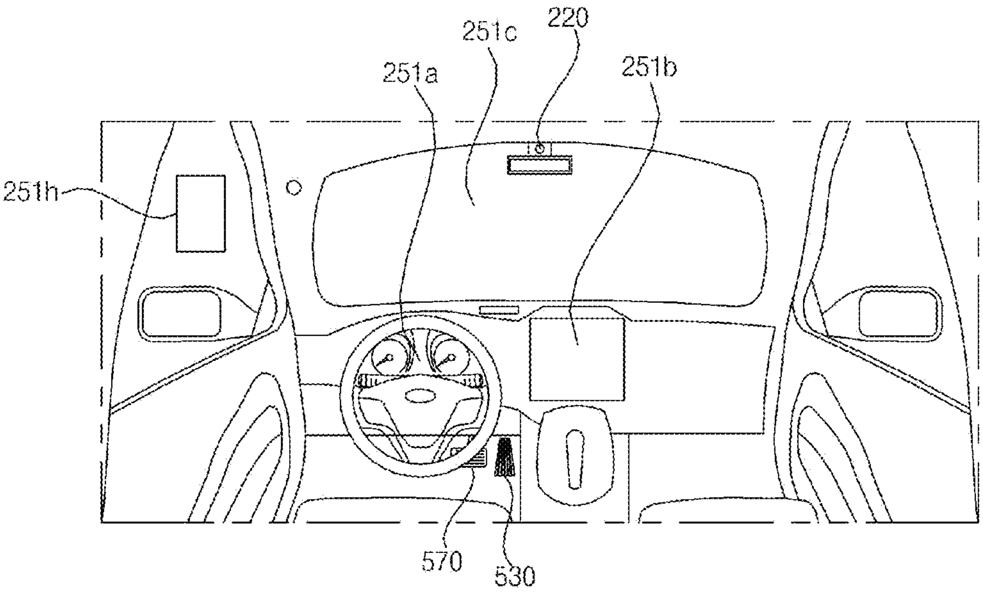
FIGS. 3 and 4 illustrate a vehicle interior, according to an embodiment of the present disclosure.
Figure 4:
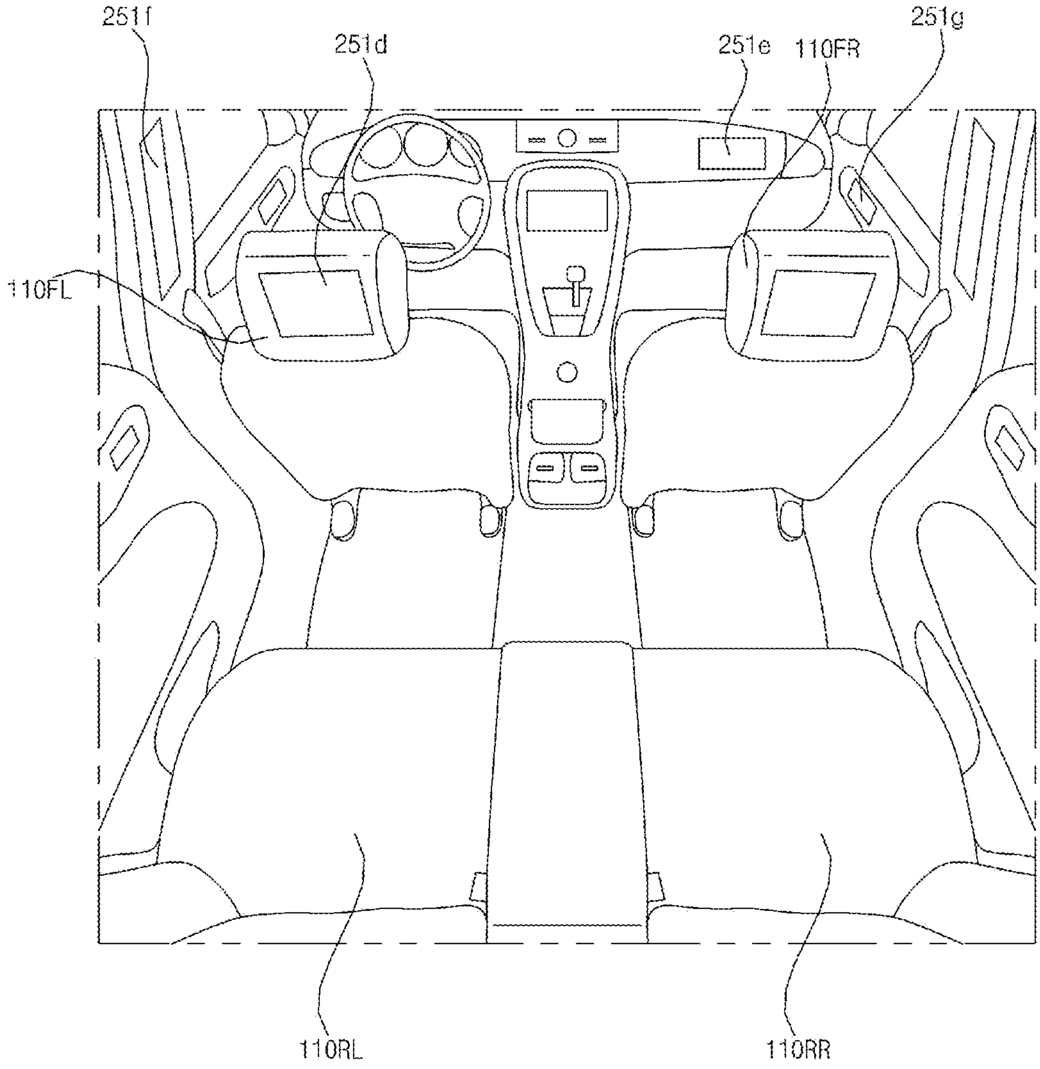

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

The suffixes "module" and "unit" used in the following description are given simply in view of the ease of the description, and do not carry any important meaning or role. Therefore, the "module" and the "unit" may be used interchangeably.

It will be understood that the terms "comprises or includes," "has," etc., when used in this specification, specify the presence of stated features, integers, steps, operations, elements, components, or combinations thereof, but do not preclude the presence or addition of one or more other features, integers, steps, operations, elements, components, or combinations thereof.

It will be further understood that although the terms "first," "second," etc. are used herein to describe various components, these components should not be limited by these terms. These terms are only used to distinguish one component from another component.

Referring to FIGS. 1 to 7, a vehicle 100 may include wheels turning by a driving force, and a steering input unit 510 for controlling a driving (or traveling) direction of the vehicle 100.

The vehicle 100 may be an autonomous vehicle.

The vehicle 100 may be switched to an autonomous mode or a manual mode in response to a user input. For example, in response to a user input received through a user interface device 200, the vehicle 100 may be switched from the manual mode to the autonomous mode, or vice versa.

The vehicle 100 may be switched to the autonomous mode or to the manual mode based on driving environment information. The driving environment information may include at least one of information on an object outside the vehicle, navigation information, and vehicle state information. For example, the vehicle 100 may be switched from the manual mode to the autonomous mode or switched from the autonomous mode to the manual mode, based on driving environment information generated by an object detection device 300. For example, the vehicle 100 may be switched from the manual mode to the autonomous mode or switched from the autonomous mode to the manual mode, based on driving environment information received through a communication device 400.

The vehicle 100 may be switched from the manual mode to the autonomous mode or switched from the autonomous mode to the manual mode, based on information, data, and signals provided from an external device.

When the vehicle 100 is driven in the autonomous mode, the autonomous vehicle 100 may be driven based on an operation system 700. For example, the autonomous vehicle 100 may be operated based on information, data, or signals generated by a driving system 710, a parking-out system 740, and a parking system 750.

When the vehicle 100 is driven in the manual mode, the autonomous vehicle 100 may receive a user input for driving of the vehicle 100 through a maneuvering device 500. Based on the user input received through the maneuvering device 500, the vehicle 100 may be driven.

The term "overall length" is the length from the front end to the rear end of the vehicle 100, the term "width" is the breadth of the vehicle 100, and the term "height" is the height from the bottom of the wheel to the roof. In the following description, an overall length direction L may be the reference direction for the measurement of the overall length of the vehicle 100, a width direction W may be the reference direction for the measurement of the width of the vehicle 100, and a height direction H may be the reference direction for the measurement of the height of the vehicle 100.

Figure 7:
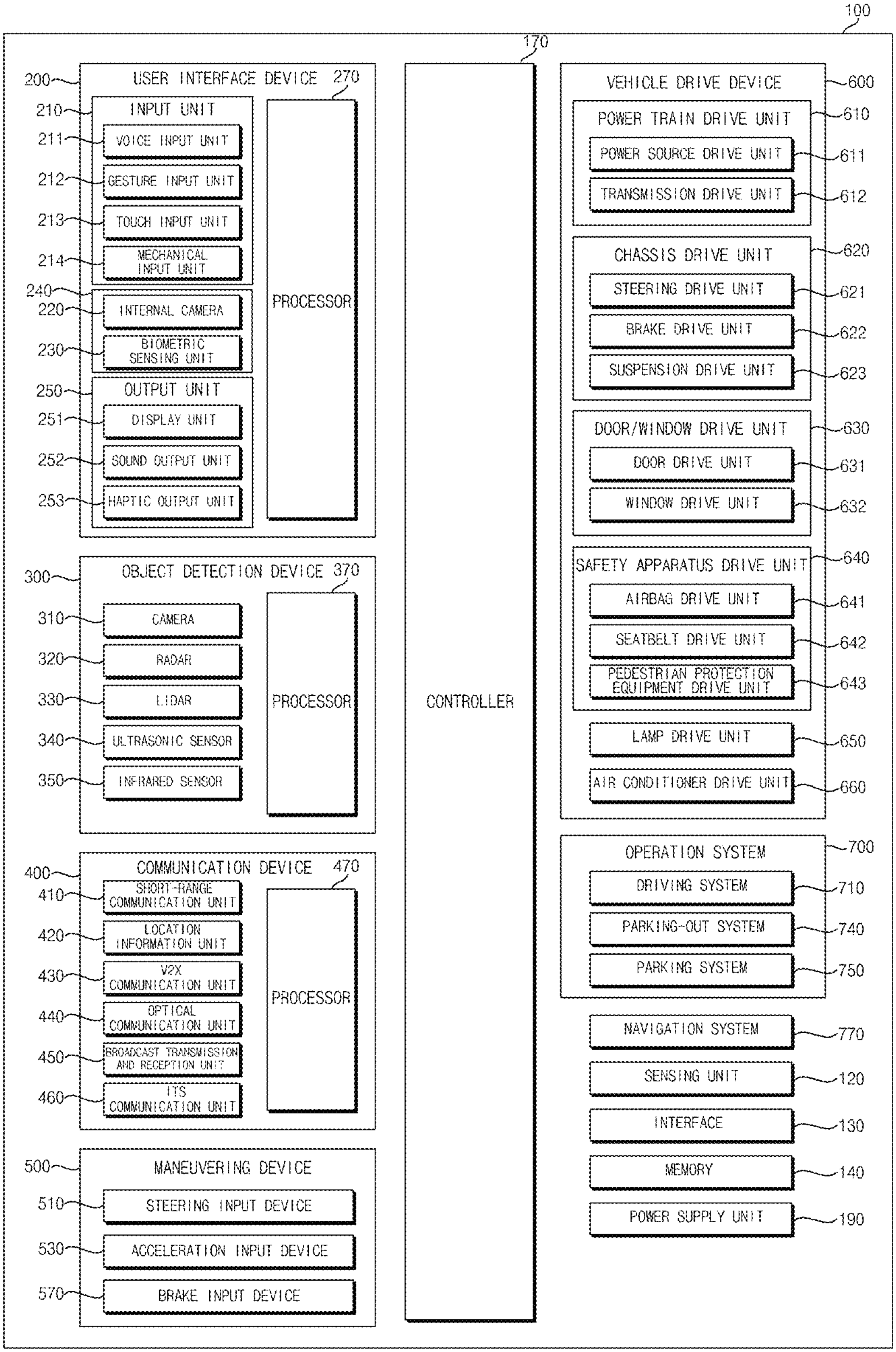
FIG. 7 is a block diagram for explaining a vehicle, according to an embodiment of the present disclosure.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and/or a power supply unit 190. In some embodiments, the vehicle 100 may further include other components in addition to the components described herein, or may not include some of the components described herein.

The user interface device 200 is configured to provide communication between the vehicle 100 and a user. The user interface device 200 may receive a user input and provide information generated in the vehicle 100 to the user. The vehicle 100 may implement user interfaces (UI) or user experience (UX) through the user interface device 200.

The user interface device 200 may include an input unit 210, an internal camera 220, a biometric sensing unit 230, an output unit 250, and/or a processor 270.

In some embodiments, the user interface device 200 may further include other components in addition to the components described herein, or may not include some of the components described herein.

The input unit 210 is configured to receive information from a user. Data collected in the input unit 210 may be analyzed by the processor 270 and then processed by a user's control command.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, a region of a window, or the like.

The input unit 210 may include a voice input unit 211, a gesture input unit 212, a touch input unit 213, and/or a mechanical input unit 214.

The voice input unit 211 may convert a user's voice input into an electrical signal. The converted electrical signal may be provided to the processor 270 or the controller 170. The voice input unit 211 may include one or more microphones.

The gesture input unit 212 may convert a user's gesture input into an electrical signal. The converted electrical signal may be provided to the processor 270 or the controller 170. The gesture input unit 212 may include at least one of an infrared sensor and an image sensor for sensing a gesture input of a user. In some embodiments, the gesture input unit 212 may sense a three-dimensional (3D) gesture input of a user. To this end, the gesture input unit 212 may include a light output unit for outputting a plurality of infrared rays, or a plurality of image sensors. The gesture input unit 212 may sense the user's 3D gesture input by using a time-of-flight (TOF) method, a structured light method, or a disparity method.

The touch input unit 213 may convert a user's touch input into an electrical signal. The converted electrical signal may be provided to the processor 270 or the controller 170. The touch input unit 213 may include a touch sensor for sensing a touch input of a user. In some embodiments, the touch input unit 210 may be integrated with a display unit 251 to implement a touch screen. Such a touch screen may provide both an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170. The mechanical input unit 214 may be disposed on a steering wheel, a center fascia, a center console, a cockpit module, a door, etc.

The internal camera 220 may acquire in-vehicle images (images of the inside of the vehicle 100). The processor 270 may detect the state of a user based on the in-vehicle images. The processor 270 may acquire user's gaze information from the in-vehicle images. The processor 270 may detect a user's gesture from the in-vehicle images.

The biometric sensing unit 230 may acquire biometric information of a user. The biometric sensing unit 230 may include a sensor for acquiring biometric information of the user. The biometric sensing unit 230 may obtain fingerprint information, heart rate information, and the like of the user by using the sensor. The biometric information may be used for user authentication.

The output unit 250 is configured to generate a visual, auditory, or tactile output. The output unit 250 may include at least one of a display unit 251, a sound output unit 252, and a haptic output unit 253.

The display unit 251 may display graphic objects corresponding to various types of information. The display unit 251 may include at least one selected from among a liquid crystal display (LCD), a thin film transistor-liquid crystal display (TFT LCD), an organic light-emitting diode (OLED) display, a flexible display, a 3D display, and an e-ink display. The display unit 251 may be referred to as a display device 251 for vehicle or a vehicle display device 251.

The display unit 251 may be inter-layered or integrally formed with the touch input unit 213 to thereby implement a touch screen.

The display unit 251 may be implemented as a head up display (HUD). When the display unit 251 is implemented as an HUD, the display unit 251 may include a projection module to output information through an image projected on a windshield or a window.

The display unit 251 may include a transparent display. The transparent display may be attached to the windshield or the window. The transparent display may display a predetermined screen with a predetermined transparency. In order to achieve the transparency, the transparent display may include at least one selected from among a transparent thin film electroluminescent (TFEL) display, an organic light-emitting diode (OLED) display, a transparent liquid crystal display (LCD), a transmissive transparent display, and a transparent light emitting diode (LED) display. The transparency of the transparent display is adjustable.

Meanwhile, the user interface device 200 may include a plurality of display units 251*a* to 251*g*. The display unit 251 may be disposed in a region of a steering wheel, a region 251*a*, 251*b* or 251*e* of an instrument panel, a region 251*d* of a seat, a region 251*f* of each pillar, a region 251*g* of a door, a region of a center console, a region of a head lining, a region of a sun visor, a region 251*c* of a windshield, or a region 251*h* of a window.

The sound output unit 252 converts an electrical signal provided from the processor 270 or the controller 170 into an audio signal to output the audio signal. To this end, the sound output unit 252 may include one or more speakers.

The haptic output unit 253 generates a tactile output. For example, the haptic output unit 253 may operate to vibrate a steering wheel, a safety belt, a seat 110FL, 110FR, 110RL, 110RR, etc., so as to allow a user to recognize the output.

The processor 270 may control the overall operation of each unit of the user interface device 200.

In some embodiments, the user interface device 200 may include a plurality of processors 270 or may not include the processor 270. When the user interface device 200 does not include the processor 270, the user interface device 200 may operate under the control of the controller 170 or a processor of another device in the vehicle 100.

Meanwhile, the user interface device 200 may be referred to as a vehicle display device. The user interface device 200 may operate under the control of the controller 170.

The object detection device 300 is configured to detect an object outside the vehicle 100. The object detection device 300 may generate object information based on sensing data. The object information may include information about the presence or absence of an object, location information of the object, distance information between the vehicle 100 and the object, and relative speed information between the vehicle 100 and the object. The object may include various objects associated with travelling of the vehicle 100.

Figure 5:
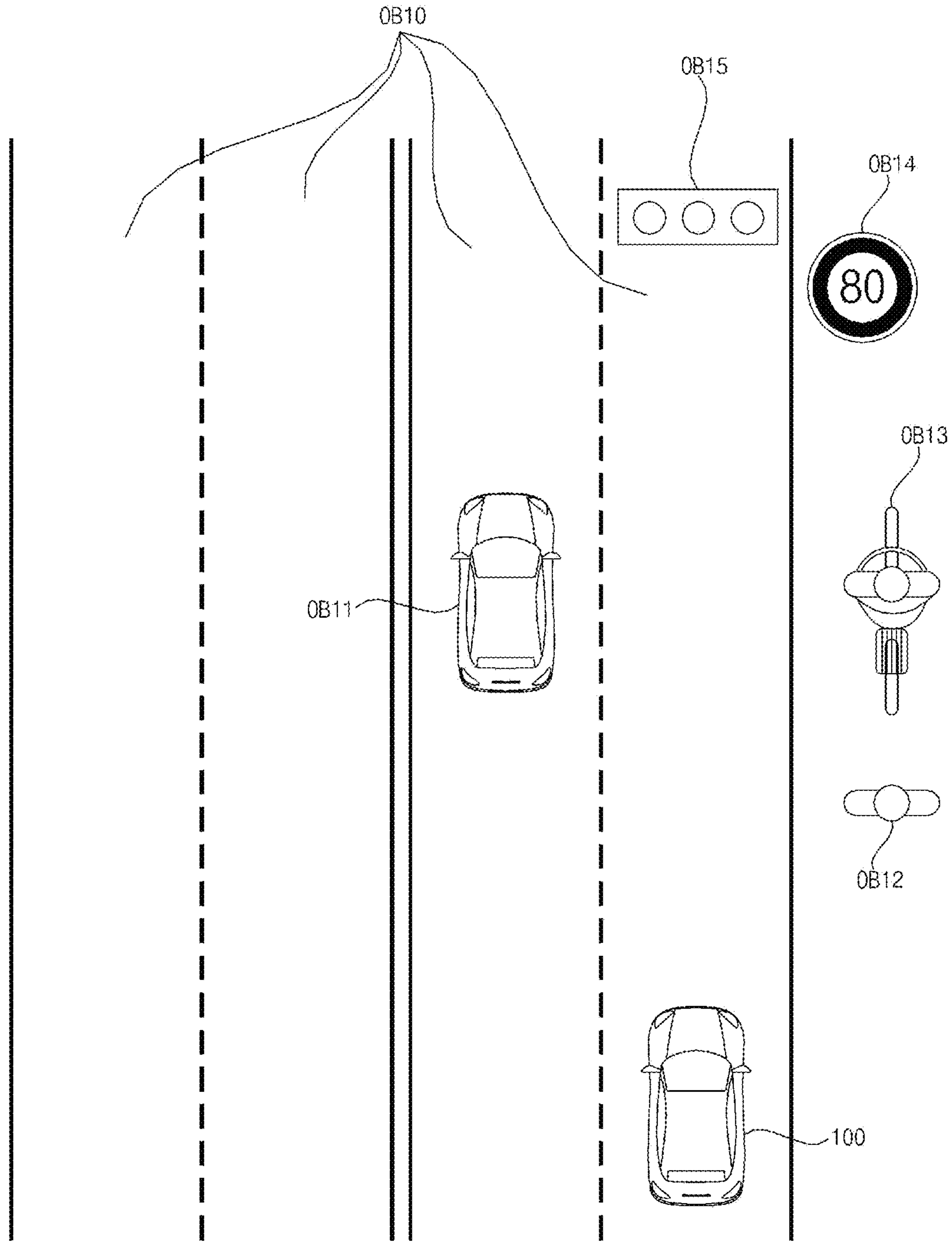
FIGS. 5 and 6 are views for explaining objects, according to an embodiment of the present disclosure.
Figure 6:
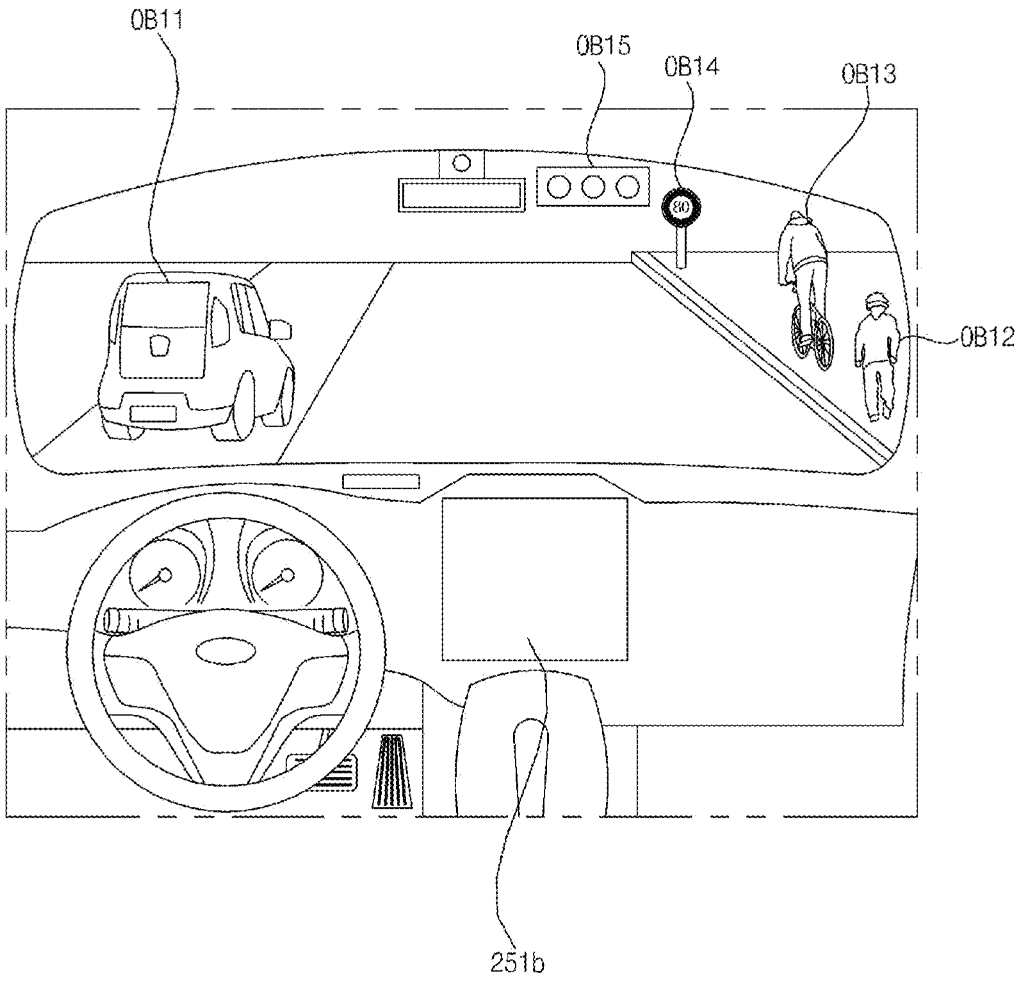

Referring to FIGS. 5 and 6, an object may include a lane OB10, another vehicle (or a nearby vehicle) OB11, a pedestrian OB12, a two-wheeled vehicle OB13, a traffic signal (OB14, OB15), a light, a road, a structure, a speed bump, a terrain, an animal, etc.

The lane OB10 may be a lane in which the vehicle 100 is traveling, namely, the current driving lane, a lane next to the current driving lane, and a lane in which a vehicle travelling in the opposite direction is travelling. The lane OB10 are defined by left and right lines forming a lane. A lane may include an intersection.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or roadway.

The two-wheeled vehicle OB13 is a vehicle that is located in the vicinity of the vehicle 100 and moves using two wheels. The two-wheeled vehicle OB13 may be a vehicle with two wheels located within a predetermined distance from the vehicle 100. For example, the two-wheeled vehicle OB13 may be a motorcycle or a bike on a sidewalk or roadway.

The traffic signal may include a traffic light OB15, a traffic sign OB14, and a pattern or text painted on a road surface.

The light may be light generated by a lamp provided in another vehicle. The light may be light generated by a street light. The light may be solar light.

The road may include a road surface, a curve, a slope such as an upward slope or a downward slope, etc.

The structure may be an object that is located near the road and fixed to the ground. For example, the structure may include a street light, a roadside tree, a building, a utility pole, a traffic light, a bridge, a curb, and a wall.

The terrain may include a mountain, a hill, etc.

Meanwhile, the object may be classified as a moving object and a stationary object. For example, the moving object may include a nearby moving vehicle and a pedestrian in motion. For example, the stationary object may include a traffic signal, a road, a structure, a stopped nearby vehicle and a still (motionless) pedestrian.

The object detection device 300 may include a camera 310, a radar 320, a LiDAR 330, an ultrasonic sensor 340, an infrared sensor 350, and/or a processor 370.

In some embodiments, the object detection device 300 may further include other components in addition to the components described herein, or may not include some of the components described herein.

The camera 310 may be located at an appropriate position outside the vehicle 100 to acquire images of the outside of the vehicle 100. The camera 310 may be a mono camera, a stereo camera 310*a*, an around view monitoring (AVM) camera 310*b*, or a 360-degree camera.

By using various image processing algorithms, the camera 310 may acquire location information of an object, information on distance to the object, and information on speed relative to the object.

For example, based on a change in object size over time from the acquired images, the camera 310 may obtain information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by the stereo camera 310*a*.

For example, the camera 310 may be disposed near a front windshield in the vehicle 100 so as to acquire images of the front of the vehicle. Alternatively, the camera 310 may be disposed around a front bumper or a radiator grille.

For example, the camera 310 may be disposed near a rear glass in the vehicle 100 so as to acquire images of the rear of the vehicle. Alternatively, the camera 310 may be disposed around a rear bumper, a trunk, or a tailgate.

For example, the camera 310 may be disposed near at least one of the side windows in the vehicle 100 so as to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be implemented as a pulse radar or a continuous wave radar based on the principle of electromagnetic wave radiation. The radar 320 may be implemented as a frequency modulated continuous wave (FMCW) type or a frequency shift keying (FSK) type of the continuous wave radar scheme, depending on the signal waveform.

The radar 320 may detect an object through the medium of an electromagnetic wave by using a time-of-flight (TOF) scheme or a phase-shift scheme, and may detect a position of the detected object, a distance to the detected object, and a speed relative to the detected object.

The radar 320 may be located at an appropriate position outside the vehicle to detect an object located in front, behind, or on the sides of the vehicle.

The LiDAR 330 may include a laser transmission unit and a laser reception unit. The LiDAR 330 may be implemented by the TOF scheme or the phase-shift scheme.

The LiDAR 330 may be implemented as a drive type LiDAR or a non-drive type LiDAR.

When implemented as the drive type LiDAR, the LiDAR 330 may be rotated by a motor to detect an object around the vehicle 100.

When implemented as the non-drive type LIDAR, the LiDAR 330 may detect, through light steering, an object located within a predetermined distance from the vehicle 100.

The LiDAR 330 may detect an object through the medium of laser light by using the TOF scheme or the phase-shift scheme, and may detect a location of the detected object, a distance to the detected object, and a speed relative to the detected object.

The LiDAR 330 may be located at an appropriate position outside the vehicle to detect an object located in front, behind, or on the sides of the vehicle.

The ultrasonic sensor 340 may include an ultrasonic wave transmission unit and an ultrasonic wave reception unit. The ultrasonic sensor 340 may detect an object based on an ultrasonic wave, and may detect a position of the detected object, a distance to the detected object, and a speed relative to the detected object.

The ultrasonic sensor 340 may be located at an appropriate position outside the vehicle to detect an object located in front, behind, or on the sides of the vehicle.

The infrared sensor 350 may include an infrared light transmission unit and an infrared light reception unit. The infrared sensor 350 may detect an object based on infrared light, and may detect a position of the detected object, a distance to the detected object, and a speed relative to the detected object.

The infrared sensor 350 may be located at an appropriate position outside the vehicle to sense an object located in front, behind, or on the sides of the vehicle.

The processor 370 may control the overall operation of each unit of the object detection device 300.

The processor 370 may detect or classify an object by comparing data sensed by the camera 310, the radar 320, the LiDAR 330, the ultrasonic sensor 340, and the infrared sensor 350 with pre-stored data.

The processor 370 may detect and track an object based on acquired images. The processor 370 may calculate a distance to the object and a speed relative to the object, based on an image processing algorithm.

For example, the processor 370 may acquire information on the distance to the object and information on the speed relative to the object based on a change in object size over time from the acquired images.

For example, the processor 370 may acquire information on the distance to the object or information on the speed relative to the object by employing a pin hole model or by profiling a road surface.

For example, the processor 370 may acquire information on the distance to the object and information on the speed relative to the object based on information on disparity of stereo images acquired from the stereo camera 310*a*.

The processor 370 may detect and track an object based on a reflected electromagnetic wave that is formed as a result of reflection of transmitted electromagnetic waves from the object. Based on the electromagnetic wave, the processor 370 may calculate a distance to the object and a speed relative to the object.

The processor 370 may detect and track an object based on reflected laser light that is formed as a result of reflection of transmitted laser light from the object. Based on the laser light, the processor 370 may calculate a distance to the object and a speed relative to the object.

The processor 370 may detect and track an object based on a reflected ultrasonic wave that is formed as a result of reflection of transmitted ultrasonic waves from the object. Based on the ultrasonic wave, the processor 370 may calculate a distance to the object and a speed relative to the object.

The processor 370 may detect and track an object based on reflected infrared light that is formed as a result of reflection of transmitted infrared light from the object. Based on the infrared light, the processor 370 may calculate a distance to the object and a speed relative to the object.

In some embodiments, the object detection device 300 may include a plurality of processors 370 or may not include the processor 370. For example, the camera 310, the radar 320, the LiDAR 330, the ultrasonic sensor 340, and the infrared sensor 350 may each include their own processor.

When the object detection device 300 does not include the processor 370, the object detection device 300 may operate under the control of the controller 170 or a processor in the vehicle 100.

The object detection device 300 may operate under the control of the controller 170.

The communication device 400 is configured to perform communication with an external device. Here, the external device may be another vehicle, a mobile terminal, or a server.

To perform communication, the communication device 400 may include at least one selected from among a transmission antenna, a reception antenna, a radio frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, and/or a processor 470.

In some embodiments, the communication device 400 may further include other components in addition to the components described herein, or may not include some of the components described herein.

The short-range communication unit 410 is configured to perform short-range communication. The short-range communication unit 410 may support short-range communication using at least one selected from among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, and Wireless Universal Serial Bus (Wireless USB).

The short-range communication unit 410 may establish wireless area networks to enable short-range communication between the vehicle 100 and at least one external device.

The location information unit 420 is configured to acquire location information of the vehicle 100. For example, the location information unit 420 may include a global positioning system (GPS) module or a differential global positioning system (DGPS) module.

The V2X communication unit 430 is configured to perform wireless communication with a server (V2I: Vehicle to Infrastructure), another vehicle (V2V: Vehicle to Vehicle), or a pedestrian (V2P: Vehicle to Pedestrian). The V2X communication unit 430 may include an RF circuit capable of implementing protocols for Vehicle-to-Infrastructure (V2I) communication, Vehicle-to-Vehicle (V2V) communication, and Vehicle-to-Pedestrian (V2P) communication.

The optical communication unit 440 is configured to perform communication with an external device through the medium of light. The optical communication unit 440 may include a light emitting unit to convert an electrical signal into an optical signal and transmit the optical signal to the outside, and a light receiving unit to convert a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a television (TV) broadcast signal, a radio broadcast signal, and a data broadcast signal.

The communication device 400 may further include an intelligent transport systems (ITS) communication unit 460.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. For example, the ITS communication unit 460 may receive a control signal from the traffic system and provide the control signal to the controller 170 or a processor provided in the vehicle 100.

The processor 470 may control the overall operation of each unit of the communication device 400.

In some embodiments, the communication device 400 may include a plurality of processors 470, or may not include the processor 470.

When the communication device 400 does not include the processor 470, the communication device 400 may operate under the control of the controller 170 or a processor of another device in the vehicle 100.

Meanwhile, the communication device 400 may implement a vehicle display device, together with the user interface device 200. In this case, the vehicle display device may be referred to as a telematics device or an audio video navigation (AVN) device.

The communication device 400 may operate under the control of the controller 170.

The maneuvering device 500 is configured to receive a user input for driving the vehicle 100.

In the manual mode, the vehicle 100 may be driven based on a signal provided by the maneuvering device 500.

The maneuvering device 500 may include a steering input unit 510, an acceleration input unit 530, and a brake input unit 570.

The steering input unit 510 may receive an input regarding a traveling direction of the vehicle 100 from a user. The steering input unit 510 may take the form of a wheel to enable a steering input through the rotation thereof. In some embodiments, the steering input unit may be configured as a touchscreen, a touch pad, or a button.

The acceleration input unit 530 may receive a user input regarding acceleration of the vehicle 100. The brake input unit 570 may receive a user input for deceleration of the vehicle 100. Each of the acceleration input unit 530 and the brake input unit 570 may take the form of a pedal. In some embodiments, the acceleration input unit or the break input unit may be configured as a touch screen, a touch pad, or a button.

The maneuvering device 500 may operate under the control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive device 600 may further include other components in addition to the components described herein, or may not include some of the components described herein.

Meanwhile, the vehicle drive device 600 may include a processor. Each unit of the vehicle drive device 600 may include its own processor.

The power train drive unit 610 may control the operation of a power train.

The power train drive unit 610 may include a power source drive unit 611 and/or a transmission drive unit 612.

The power source drive unit 611 may control a power source of the vehicle 100.

For example, when a fossil fuel-based engine is the power source, the power source drive unit 611 may perform electronic control of the engine, thereby controlling the output torque of the engine, etc. The power source drive unit 611 may adjust the output toque of the engine under the control of the controller 170.

For example, when an electric motor is the power source, the power source drive unit 611 may control the motor. The power train drive unit 610 may adjust the RPM and toque of the motor under the control of the controller 170.

The transmission drive unit 612 may control a transmission.

The transmission drive unit 612 may adjust the state of the transmission. The transmission drive unit 612 may adjust the state of the transmission to Drive (D), Reverse (R), Neutral (N), or Park (P).

Meanwhile, when an engine is the power source, the transmission drive unit 612 may adjust a gear-engaged state in the Drive (D) position.

The chassis drive unit 620 may control the operation of a chassis.

The chassis drive unit 620 may include a steering drive unit 621, a brake drive unit 622, and/or a suspension drive unit 623.

The steering drive unit 621 may perform electronic control of a steering apparatus in the vehicle 100. The steering drive unit 621 may change the traveling direction of the vehicle 100.

The brake drive unit 622 may perform electronic control of a brake apparatus in the vehicle 100. For example, the brake drive unit 622 may reduce the speed of the vehicle 100 by controlling the operation of a brake disposed at a wheel.

In some implementations, the brake drive unit 622 may control a plurality of brakes individually. The brake drive unit 622 may control such that different braking forces are applied to the plurality of wheels.

The suspension drive unit 623 may perform electronic control of a suspension apparatus in the vehicle 100. For example, when the road surface is uneven, the suspension drive unit 623 may control the suspension apparatus, so as to reduce the vibration of the vehicle 100.

In some implementations, the suspension drive unit 623 may control a plurality of suspensions individually.

The door/window drive unit 630 may perform electronic control of a door apparatus or a window apparatus in the vehicle 100.

The door/window drive unit 630 may include a door drive unit 631 and a window drive unit 632.

The door drive unit 631 may control the door apparatus. The door drive unit 631 may control the opening or closing of a plurality of doors included in the vehicle 100. The door drive unit 631 may control the opening or closing of a trunk or a tail gate. The door drive unit 631 may control the opening or closing of a sunroof.

The window drive unit 632 may perform electronic control of the window apparatus. The window drive unit 632 may control the opening or closing of a plurality of windows included in the vehicle 100.

The safety apparatus drive unit 640 may perform electronic control of various safety apparatuses in the vehicle 100.

The safety apparatus drive unit 640 may include an airbag drive unit 641, a safety belt drive unit 642, and/or a pedestrian protection equipment drive unit 643.

The airbag drive unit 641 may perform electronic control of an airbag apparatus in the vehicle 100. For example, upon detection of a dangerous situation, the airbag drive unit 641 may control an airbag to be deployed.

The safety belt drive unit 642 may perform electronic control of a seatbelt apparatus in the vehicle 100. For example, upon detection of a dangerous situation, the safety belt drive unit 642 may control such that occupants are secured in their seats 110FL, 110FR, 110RL, 110RR with a seatbelt.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses in the vehicle 100.

The air conditioner drive unit 660 may perform electronic control of an air conditioner in the vehicle 100. For example, when the temperature inside the vehicle 100 is high, an air conditioner drive unit 660 may control the air conditioner to supply cool air into the vehicle 100.

The vehicle drive device 600 may include a processor. Each unit of the vehicle drive device 600 may include its own processor.

The vehicle drive device 600 may operate under the control of the controller 170.

The operation system 700 is a system for controlling various driving of the vehicle 100. The operation system 700 may operate in the autonomous driving mode.

The operation system 700 may include the driving system 710, the parking-out system 740, and the parking system 750.

In some embodiments, the operation system 700 may further include other components in addition to the components described herein, or may not include some of the components described herein.

Meanwhile, the operation system 700 may include a processor. Each unit of the operation system 700 may include its own processor.

In some embodiments, when the operation system 700 is implemented as software, the operation system 700 may be a sub-concept of the controller 170.

In some embodiments, the operation system 700 may include at least one of the user interface device 200, the object detection device 300, the communication device 400, the maneuvering device 500, the vehicle drive device 600, the navigation system 770, the sensing unit 120, and the controller 170.

The driving system 710 may perform driving of the vehicle 100.

The driving system 710 may perform driving of the vehicle 100 by providing a control signal to the vehicle drive device 600 based on navigation information received from the navigation system 770.

The driving system 710 may perform driving of the vehicle 100 by providing a control signal to the vehicle drive device 600 based on object information received from the object detection device 300.

The driving system 710 may perform driving of the vehicle 100 by providing a control signal to the vehicle drive device 600 based on a signal received from an external device through the communication device 400.

The driving system 710 may be a system that includes at least one of the user interface device 270, the object detection device 300, the communication device 400, the maneuvering device 500, the vehicle drive device 600, the navigation system 770, the sensing unit 120, and the controller 170 to drive the vehicle 100.

Such a driving system 710 may be referred to as a vehicle driving control device.

The parking-out system 740 may perform pulling the vehicle 100 out of a parking space.

The parking-out system 740 may perform pulling the vehicle 100 out of a parking space by providing a control signal to the vehicle drive device 600 based on navigation information received from the navigation system 770.

The parking-out system 740 may perform pulling the vehicle 100 out of a parking space by providing a control signal to the vehicle drive device 600 based on object information received from the object detection device 300.

The parking-out system 740 may perform pulling the vehicle 100 out of a parking space by providing a control signal to the vehicle drive device 600 based on a signal received from an external device through the communication device 400.

The parking-out system 740 may be a system that includes at least one of the user interface device 200, the object detection device 300, the communication device 400, the maneuvering device 500, the vehicle drive device 600, the navigation system 770, the sensing unit 120, or the controller 170 to perform parking-out of the vehicle 100.

Such a parking-out system 740 may be referred to as a vehicle parking-out control device.

The parking system 750 may perform parking of the vehicle 100 in a parking space.

The parking system 750 may perform parking of the vehicle 100 in a parking space by providing a control signal to the vehicle drive device 600 based on navigation information received from the navigation system 770.

The parking system 750 may perform parking of the vehicle 100 in a parking space by providing a control signal to the vehicle drive device 600 based on object information received from the object detection device 300.

The parking system 750 may perform parking of the vehicle 100 in a parking space by providing a control signal to the vehicle drive device 600 based on a signal received from an external device through the communication device 400.

The parking system 750 may be a system that includes at least one of the user interface device 200, the object detection device 300, the communication device 400, the maneuvering device 500, the vehicle drive device 600, the navigation system 770, the sensing unit 120, or the controller 170 to perform parking of the vehicle 100.

Such a parking system 750 may be referred to as a vehicle parking control device.

The navigation system 770 may provide navigation information. The navigation information may include at least one of map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may receive information from an external device through the communication device 400 to update pre-stored information.

In some embodiments, the navigation system 770 may be classified as a subcomponent of the user interface device 200.

The sensing unit 120 may sense the state of the vehicle. The sensing unit 120 may include an IMU (Inertial Navigation Unit) sensor, a collision sensor, a wheel sensor, a speed sensor, a tilt sensor, a weight sensor, a heading sensor, a position module, a vehicle forward/reverse movement sensor, a battery sensor, a fuel sensor, a tire sensor, a steering sensor for steering wheel rotation, an in-vehicle temperature sensor, an in-vehicle humidity sensor, an ultrasonic sensor, an illumination sensor, an accelerator pedal position sensor, a brake pedal position sensor, etc.

Meanwhile, the IMU sensor may include one or more sensors from among an acceleration sensor, a gyro sensor, and a magnetic sensor.

The sensing unit 120 may acquire sensing signals associated with vehicle posture information, vehicle motion information, vehicle yaw information, vehicle roll information, vehicle pitch information, vehicle collision information, vehicle direction information, vehicle position information (GPS information), vehicle angle information, vehicle speed information, vehicle acceleration information, vehicle tilt information, vehicle forward/backward movement information, battery information, fuel information, tire information, vehicle lamp information, in-vehicle temperature information, in-vehicle humidity information, steering wheel rotation angle information, external illumination information, information about the pressure applied to an accelerator pedal, information about the pressure applied to a brake pedal, etc.

The sensing unit 120 may further include an accelerator pedal sensor, a pressure sensor, an engine speed sensor, an air flow-rate sensor (AFS), an air temperature sensor (ATS), a water temperature sensor (WTS), a throttle position sensor (TPS), a top dead center (TDC) sensor, a crank angle sensor (CAS), etc.

The sensing unit 120 may generate vehicle state information based on sensing data. The vehicle state information may be information generated based on data sensed by various sensors provided in the vehicle.

For example, the vehicle state information may include vehicle posture information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various types of external devices connected to the vehicle 100. For example, the interface 130 may include a port that can be connected to a mobile terminal, so that the interface 130 is connected to the mobile terminal via the port. In this case, the interface 130 may exchange data with the mobile terminal.

Meanwhile, the interface 130 may serve as a passage for supplying electrical energy to a mobile terminal connected thereto. When the mobile terminal is electrically connected to the interface 130, the interface 130 may provide electrical energy, supplied from the power supply unit 190, to the mobile terminal, under the control of the controller 170.

The memory 140 is electrically connected to the controller 170. The memory 140 may store basic data for each unit, control data for controlling the operation of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or controlling the controller 170.

In some embodiments, the memory 140 may be integrally formed with the controller 170, or may be implemented as a subcomponent of the controller 170.

The controller 170 may control the overall operation of each unit provided in the vehicle 100. The controller 170 may be referred to as an electronic controller (ECU).

The power supply unit 190 may supply power required to operate each component, under the control of the controller 170. In particular, the power supply unit 190 may receive power from, for example, a battery inside the vehicle 100.

One or more processors and the controller 170 included in the vehicle 100 may be implemented using at least one selected from among application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

FIGS. 8 to 19 are diagrams for explaining a display device for a vehicle (or a vehicle display device) according to an embodiment of the present disclosure.

Figure 8:
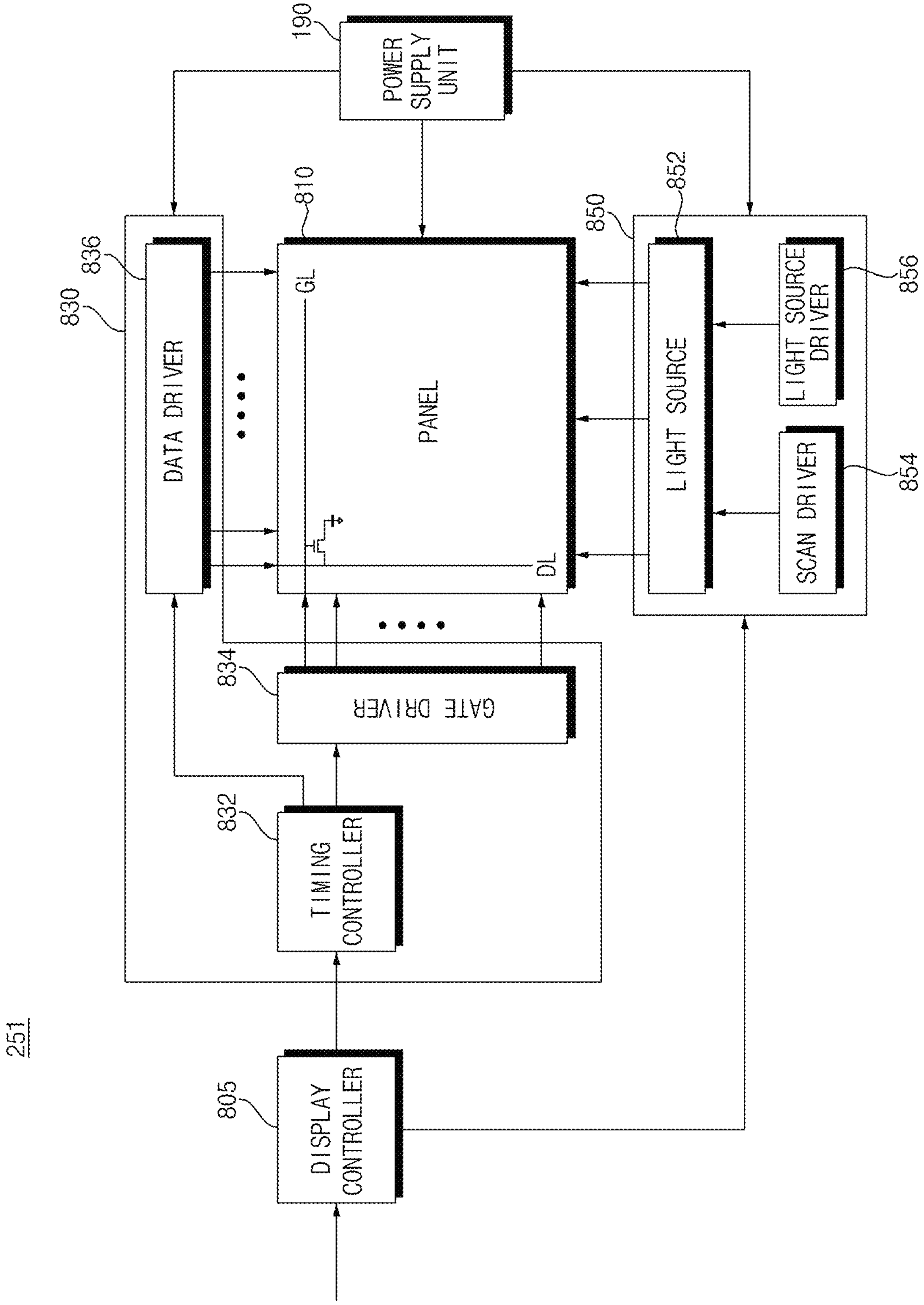
FIGS. 8 to 26 are views for explaining a display device for a vehicle according to an embodiment of the present disclosure.

Referring to FIG. 8, the vehicle display device 251 may output an image based on an image (or video) signal. For example, based on the image signal, the vehicle display device 251 may output graphic objects indicating instrument panel information of the vehicle 100, various video content, etc.

The vehicle display device 251 may include a display controller 805, a display panel 810, a panel drive unit 830, and/or a backlight unit 850.

The display controller 805 may receive an image signal from the controller 170. The display controller 805 may process an image signal. The display controller 805 may include a decoder, a scaler, a formatter, and the like to process an image signal. The display controller 805 may be included in the controller 170. The display controller 805 may be included in the processor 270. Alternatively, the display controller 805 may be provided separately from the controller 170 and/or the processor 270.

In one embodiment, the display controller 805 may include a demultiplexer that demultiplexes an input stream. The demultiplexer may separate the input stream into an image signal, an audio signal, and/or a data signal. The decoder may decode the demultiplexed image signal. The scaler may perform scaling to allow the resolution of the decoded image signal to be displayed on the display panel 810.

In one embodiment, the display controller 805 may include a frame rate converter (FRC) that converts the frame rate of an input image. Alternatively, the frame rate converter may output an input image without any frame rate conversion.

The formatter may change the format of an input image signal into an image signal suitable for being displayed on the display panel 810.

The demultiplexer, the decoder, the scaler, the frame rate converter, and/or formatter may not be provided in the display controller 805. Instead, they may be provided individually or provided as a single module, separately from the display controller 805.

The display panel 810 may include a plurality of pixels. The plurality of pixels may be connected to a plurality of gate lines GL and data lines DL arranged in a matrix form to intersect one another. A plurality of thin film transistors (TFTs) may be disposed at intersections of the plurality of gate lines GL and the data lines DL. The plurality of pixels may be formed at the intersections of the plurality of data lines DL and the plurality of gate lines GL. Each of the plurality of pixels may be connected to the data line and the gate line.

When the vehicle display device 251 is a liquid crystal display (LCD) device, a plurality of pixels may include a liquid crystal layer. When the vehicle display device 251 is an OLED display device, a plurality of pixels may include an organic light-emitting diode (OLED).

The display panel 810 may include a first substrate on which a driving element such as a thin film transistor (TFT) and a pixel electrode connected thereto are formed, a second substrate on which a common electrode is formed, and/or a liquid crystal layer formed between the first substrate and the second substrate. The arrangement of liquid crystal molecules for the display panel 810 may be an in-plane switching (IPS) type.

The panel drive unit 830 may drive the display panel 810 based on a control signal and/or a data signal transmitted from the display controller 805. The panel drive unit 830 may include a timing controller 832, a gate driver 834, and/or a data driver 836.

The timing controller 832 may receive a control signal, an image signal, and the like from the display controller 805. For example, the timing controller 832 may receive an RGB signal, a vertical synchronization signal (Vsync), and the like from the display controller 805. The timing controller 832 may control the gate driver 834 and/or the data driver 836 in response to the control signal. The timing controller 832 may relocate the image signal according to the specification of the data driver 836 and transmit it to the data driver 836.

The gate driver 834 and the data driver 836 may supply a scan signal and an image signal to the display panel 810 through the gate line GL and the data line DL, under the control of the timing controller 832.

Meanwhile, the data driver 836 may include a plurality of source driver integrated circuits (ICs) (not shown) corresponding to the plurality of data lines DL.

The backlight unit 850 may supply light to the display panel 810. To this end, the backlight unit 850 may include at least one light source 852 that outputs light, a scan driver 854 that controls the scanning operation of the light source 852, and/or a light source driver 856 that turns on/off the light source 852.

In a state where light transmittance of the liquid crystal layer is adjusted by an electric field formed between the pixel electrode and the common electrode of the display panel 810, the vehicle display device 251 may display a certain image by using light emitted from the backlight unit 850.

The power supply unit 190 may supply a common electrode voltage (Vcom) to the display panel 810. The power supply unit 190 may supply a gamma voltage to the data driver 836. The power supply unit 190 may supply driving power for driving the light source 852 to the backlight unit 850.

The vehicle display device 251 may be driven by a local dimming scheme. The backlight unit 850 may be divided into a plurality of blocks. The backlight unit 850 may be driven for each divided block. For example, when the backlight unit 850 is driven by a local dimming scheme, the display panel 810 may have a plurality of divided areas corresponding to respective blocks of the backlight unit 850. In this case, the intensity of light emitted from each of the blocks of the backlight unit 850 may be adjusted according to the luminance level of each of the divided areas of the display panel 810, for example, a peak value of the gray level or a color coordinate signal. That is, among the blocks of the backlight unit 850, the vehicle display device 251 may reduce the intensity of light emitted from a block corresponding to the dark part of the image, while increasing the intensity of light emitted from a block corresponding to the bright part of the image. Thus, it is possible to improve the contrast ratio and clarity of the image output through the vehicle display device 251.

The vehicle display device 251 may set a dimming value for each block based on a representative value for each block of the backlight unit 850. The display controller 805 may determine the representative value for each of the blocks of the backlight unit 850 based on the image signal.

In one embodiment, the representative value for each block may include the luminance level of an image corresponding to each of the blocks of the backlight unit 850. The display controller 805 may determine the luminance level for the entire area and/or a partial area of the image based on the image signal. For example, the display controller 805 may determine an average picture level (APL) for each of the plurality of divided areas corresponding to each of the blocks of the backlight unit 850, an APL level for the entire area of the image, etc.

Based on the luminance level for the entire area and/or a partial area of an image, the display controller 805 may calculate a dimming value for each of the blocks of the backlight unit 850. For example, the display controller 805 may calculate a dimming value for each of the blocks of the backlight unit 850 based on the luminance level of each of the plurality of divided areas, the luminance level of the surrounding area, the luminance level of the entire area, and the like. In this case, the display controller 805 may calculate the dimming value such that the intensity of light emitted from a block in an area with low luminance level diseases and the intensity of light emitted from a block in an area with high luminance level increases, among the blocks of the backlight unit 850.

The display controller 805 may output the calculated dimming value to the backlight unit 850. The display controller 805 may output a signal including the calculated dimming value to the backlight unit 850. Based on the dimming value received from the display controller 805, the backlight unit 850 may adjust the intensity of light emitted from the light source 852.

The light source 852 may be turned on or off in response to a driving signal received from the light source driver 856. The light source driver 856 may generate a driving signal based on the dimming value output from the display controller 805. The driving signal may be a pulse width modulation (PWM) signal. For example, the intensity of light emitted from the light source 852 may be adjusted according to the amplitude of the driving signal received from the light source driver 856. For example, the time during which light is emitted from the light source 852 may be adjusted according to the pulse width of the driving signal received from the light source driver 856.

Figure 9:
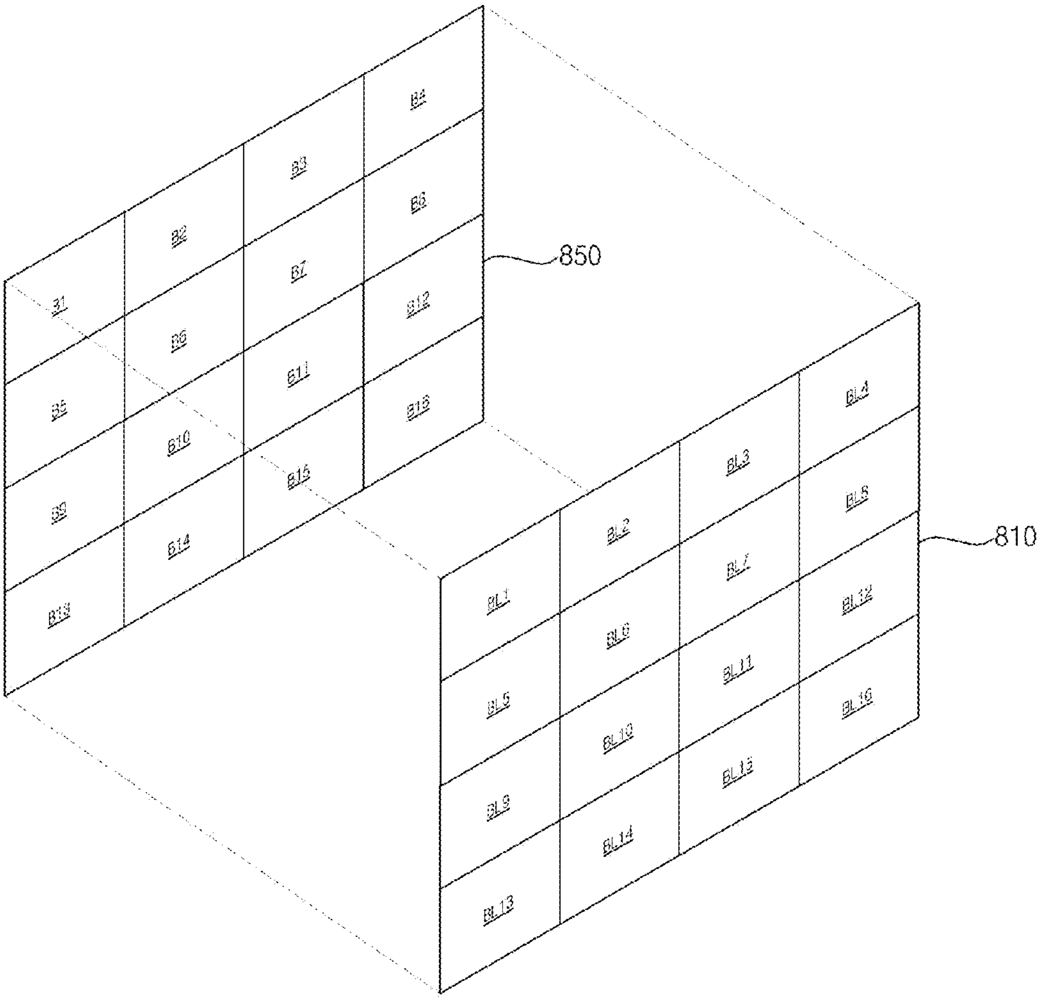

Referring to FIG. 9, the backlight unit 850 according to an embodiment of the present disclosure may be implemented as a direct type.

The display panel 810 may consist of a plurality of divided areas. FIG. 9 illustrates that the display panel 810 is equally divided into 16 divided areas BL1 to BL16, but the present disclosure is not limited thereto. The plurality of divided areas BL1 to BL16 may each include a plurality of pixels.

The backlight unit 850 may have a structure in which a plurality of optical sheets and a diffusion plate are stacked under the display panel 810, and a plurality of light sources are disposed under the diffusion plate.

Blocks B1 to B16 of the backlight unit 850 may respectively correspond to the divided areas BL1 to BL16 of the display panel 810. For example, a first block B1 of the backlight unit 850 may correspond to a first divided area BL1 of the display panel 810. In this case, the intensity of light incident on the first divided area BL1 of the display panel 810 may be adjusted by the light source 852 included in the first block B1 of the backlight unit 850 disposed at a position corresponding to the first divided area BL1 of the display panel 810.

The light source 852 provided in the blocks B1 to B16 of the backlight unit 850 may be implemented as a point light source such as a light emitting diode (LED).

Figure 10:
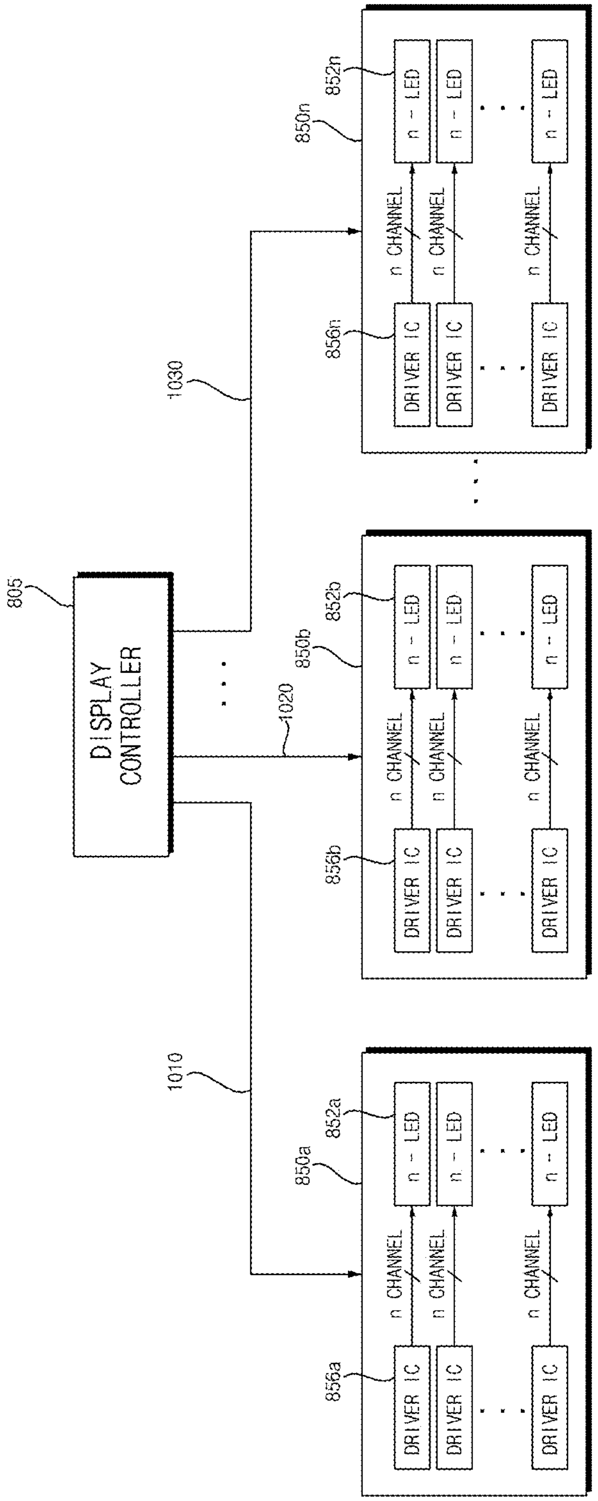

Referring to FIG. 10, the backlight unit 850 may include a plurality of drive units 850*a* to 850*n*.

The plurality of drive units 850*a* to 850*n* may receive dimming values calculated for a plurality of blocks, a vertical synchronization signal (Vsync) corresponding to one frame, and the like from the display controller 805. The plurality of drive units 850*a* to 850*n* may receive signals via Serial Peripheral Interface (SPI) communication.

The plurality of drive units 850*a* to 850*n* may receive dimming values calculated for a plurality of blocks, a vertical synchronization signal (Vsync) corresponding to one frame, and the like. The plurality of drive units 850*a* to 850*n* may receive signals via Serial Peripheral Interface (SPI) communication.

The plurality of drive units 850*a* to 850*n* may include a light source driver (856*a* to 856*n*) and/or a plurality of light sources (852*a* to 852*n*).

Each of the light source drivers 856*a* to 856*n* may include at least one driver IC. Each of the plurality of driver ICs may output a driving signal for controlling the intensity of n blocks by using n channels. Each of the plurality of driver ICs may output a driving signal to adjust the intensity of the light source 852 based on the dimming values calculated for the plurality of blocks. For example, when each driver IC outputs a driving signal via 16 channels, each driver IC may adjust the intensity of the light source 852 included in 16 blocks. In this case, when a first light source driver 856*a* includes 4 driver ICs, the first light source driver 856*a* may adjust the intensity of the light source 852 included in 4×16, i.e., 64 blocks, among the divided blocks of the backlight unit 850.

Each of the plurality of drive units 850*a* to 850*n* may include a substrate. For example, the substrate may be a printed circuit board (PCB). Components included in the plurality of drive units 850*a* to 850*n*, for example, driver ICs, may be respectively mounted on a plurality of substrates corresponding to the plurality of drive units 850*a* to 850*n*. The substrates corresponding to the plurality of drive units 850*a* to 850*n* may be disposed adjacent to each other according to the order of the divided blocks of the backlight unit 850.

The plurality of driving units 850*a* to 850*n* may be electrically connected to the display controller 805 through respective cables 1010 to 1030 corresponding to the plurality of drive units 850*a* to 850*n*. For example, the cables 1010 to 1030 corresponding to the plurality of drive units 850*a* to 850*n* may be respectively connected to connectors mounted on the substrates corresponding to the plurality of drive units 850*a* to 850*n*.

Figure 11:
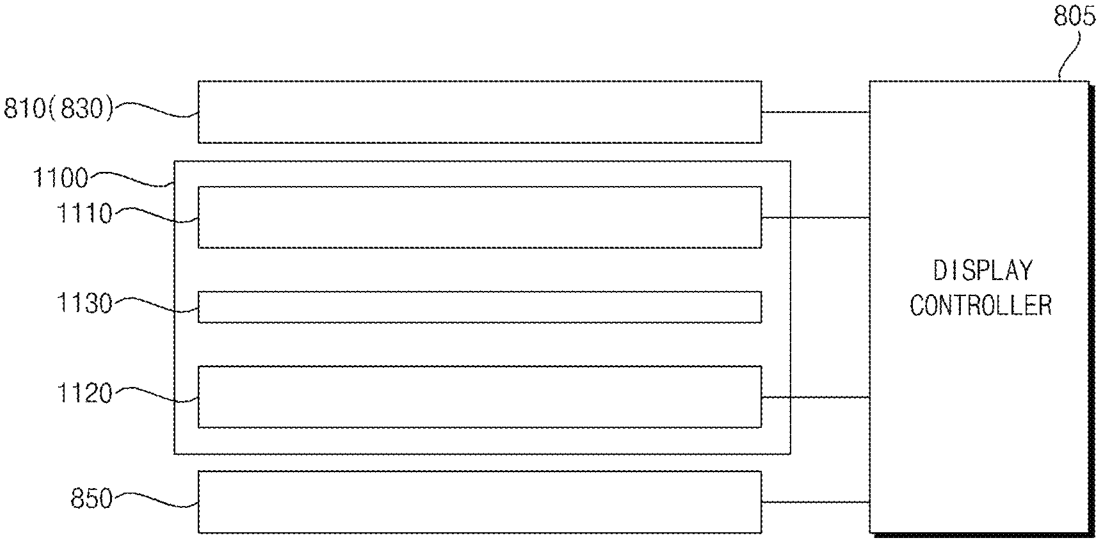
Figure 12:
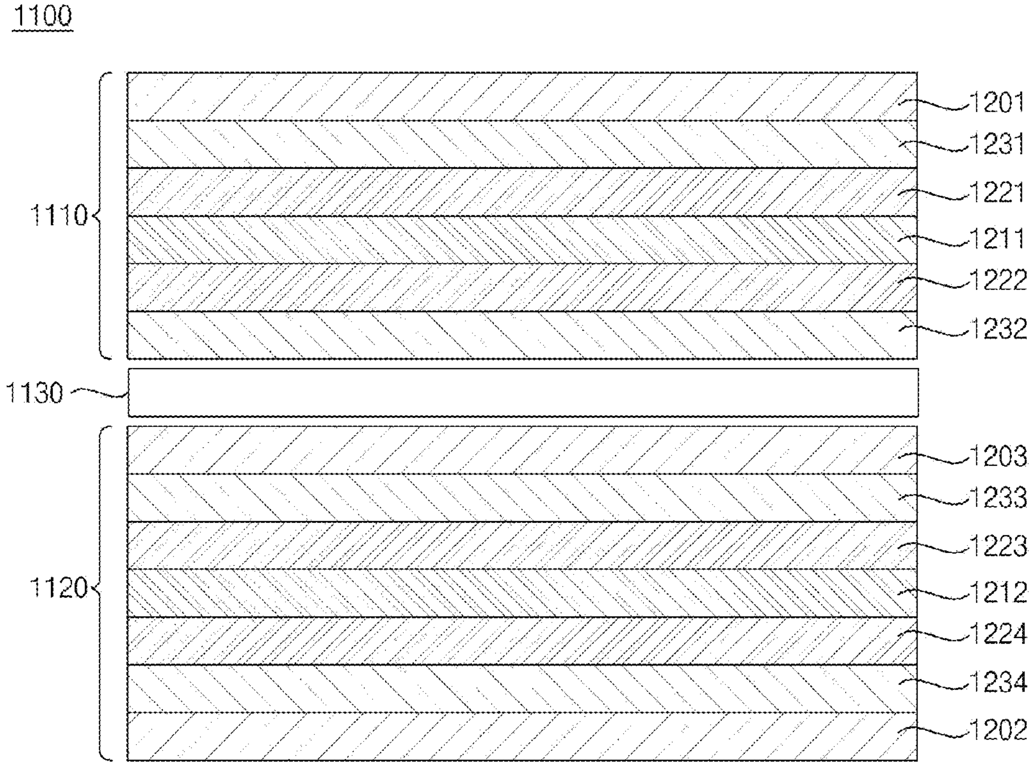
Figure 13:

Referring to FIGS. 11 to 13, the vehicle display device 251 may include a viewing angle adjustment panel 1100.

The viewing angle adjustment panel 1100 may adjust a viewing angle of the display panel 810. Here, the viewing angle may refer to a range of angles at which a user can view an image with a certain image quality or higher, when the user looks at the display panel 810. The viewing angle adjustment panel 1100 may adjust the viewing angle according to the control of the display controller 805.

The viewing angle adjustment panel 1100 may include a first adjustment unit 1110, a second adjustment unit 1120, and/or a film 1130. The film 1130 may be configured to limit emission of light to a predetermined angle. In one embodiment, the film 1130 may be disposed between the first adjustment unit 1110 and the second adjustment unit 1120, but the present disclosure is not limited thereto. For example, the film 1130 may be disposed on top of the first adjustment unit 1110, on bottom of the second adjustment unit 1120, etc.

The first adjustment unit 1110 and the second adjustment unit 1120 may each include a liquid crystal layer 1211, 1212 composed of liquid crystal molecules. The first adjustment unit 1110 and the second adjustment unit 1120 may each include a plurality of alignment layers that define the arrangement of the liquid crystal molecules included in the liquid crystal layer 1211, 1212. The orientation of the liquid crystal molecules included in the liquid crystal layer 1211, 1212 may be defined by properties of the liquid crystal molecules and patterns of the plurality of alignment layers.

The first adjustment unit 1110 may include a first upper alignment layer 1221 disposed over a first liquid crystal layer 1211, and a first lower alignment layer 1222 disposed under the first liquid crystal layer 1211. For example, the direction in which the liquid crystal molecules are aligned by the first upper alignment layer 1221 and the direction in which the liquid crystal molecules are aligned by the first lower alignment layer 1222 may be perpendicular to each other. The second adjustment unit 1120 may include a second upper alignment layer 1223 disposed over a second liquid crystal layer 1212, and a second lower alignment layer 1224 disposed under the second liquid crystal layer 1212. For example, the direction in which the liquid crystals are aligned by the second upper alignment layer 1223 and the direction in which the liquid crystal molecules are aligned by the second lower alignment layer 1224 may be perpendicular to each other.

The first adjustment unit 1110 and the second adjustment unit 1120 may each include a plurality of substrates on which electrodes are formed. The electrode may be formed of a metal oxide such as Indium Tin Oxide (ITO), Indium Zinc Oxide (IZO), or the like, but the present disclosure is not limited thereto. The first adjustment unit 1110 may include a first upper substrate 1231 disposed over the first liquid crystal layer 1211 and a first lower substrate 1232 disposed under the first liquid crystal layer 1211. The second adjustment unit 1120 may include a second upper substrate 1233 disposed over the second liquid crystal layer 1212 and a second lower substrate 1234 disposed under the second liquid crystal layer 1212.

The display controller 805 may adjust a viewing angle by controlling the arrangement of the liquid crystal molecules included in the liquid crystal layer 1211, 1212. The viewing angle may vary depending on the degree (or extent) to which the arrangement of the liquid crystal molecules included in the liquid crystal layer 1211, 1212 is changed. In one embodiment, the arrangement of liquid crystal molecules may be a twisted nematic (TN) type, but the present disclosure is not limited thereto. For example, the arrangement type of liquid crystal molecules may include super-twisted nematic (STN), vertically aligned nematic (VAN), twisted vertically aligned nematic (TVAN), hybrid aligned nematic (HAN), etc.

The display controller 805 may control voltage applied to the electrodes of the plurality of substrates. Depending on the difference between voltages applied to the electrodes of the plurality of substrates (hereinafter referred to as "voltage difference"), the arrangement of the liquid crystal molecules included in the liquid crystal layer 1211, 1212 may be changed. For example, according to the voltage difference between a first electrode of the first upper substrate 1231 and a second electrode of the first lower substrate 1232 that corresponds to the first electrode, the arrangement of liquid crystal molecules corresponding to the first electrode and the second electrode may be changed.

In one embodiment, as the voltage difference between the electrode of the first upper substrate 1231 and the electrode of the first lower substrate 1232 increases, the degree to which the arrangement of the liquid crystal molecules included in the first liquid crystal layer 1211 is changed may increase. In this case, as the degree to which the arrangement of the liquid crystal molecules included in the liquid crystal layer 1211, 1212 is changed increases, the viewing angle may decrease. For example, when the voltage difference between the electrode of the first upper substrate 1231 and the electrode of the first lower substrate 1232 is a preset minimum value of 0V, light may be emitted intactly through the liquid crystal layer 1211, 1212. For example, when the voltage difference between the electrode of the first upper substrate 1231 and the electrode of the first lower substrate 1232 is a preset maximum value of 4V or higher, light may be blocked by the liquid crystal layer 1211, 1212.

The viewing angle adjustment panel 1100 may include a plurality of polarizers 1201 to 1204. In one embodiment, the viewing angle adjustment panel 1100 may include a first polarizer 1201 disposed at the top, a second polarizer 1202 disposed at the bottom, and/or a third polarizer 1203 disposed between the plurality of liquid crystal layers 1211 and 1212. For example, the first polarizer 1201 may be disposed at the top of the first adjustment unit 1110, and the second polarizer 1202 and the third polarizer 1203 may be disposed at the bottom and the top of the second adjustment unit 1120, respectively. In one embodiment, a polarization axis of the first polarizer 1201 and a polarization axis of the second polarizer 1202 may be parallel to each other. A polarization axis of the third polarizer 1203 may be perpendicular to the polarization axis of the first polarizer 1201 and the polarization axis of the second polarizer 1202.

Figure 14:
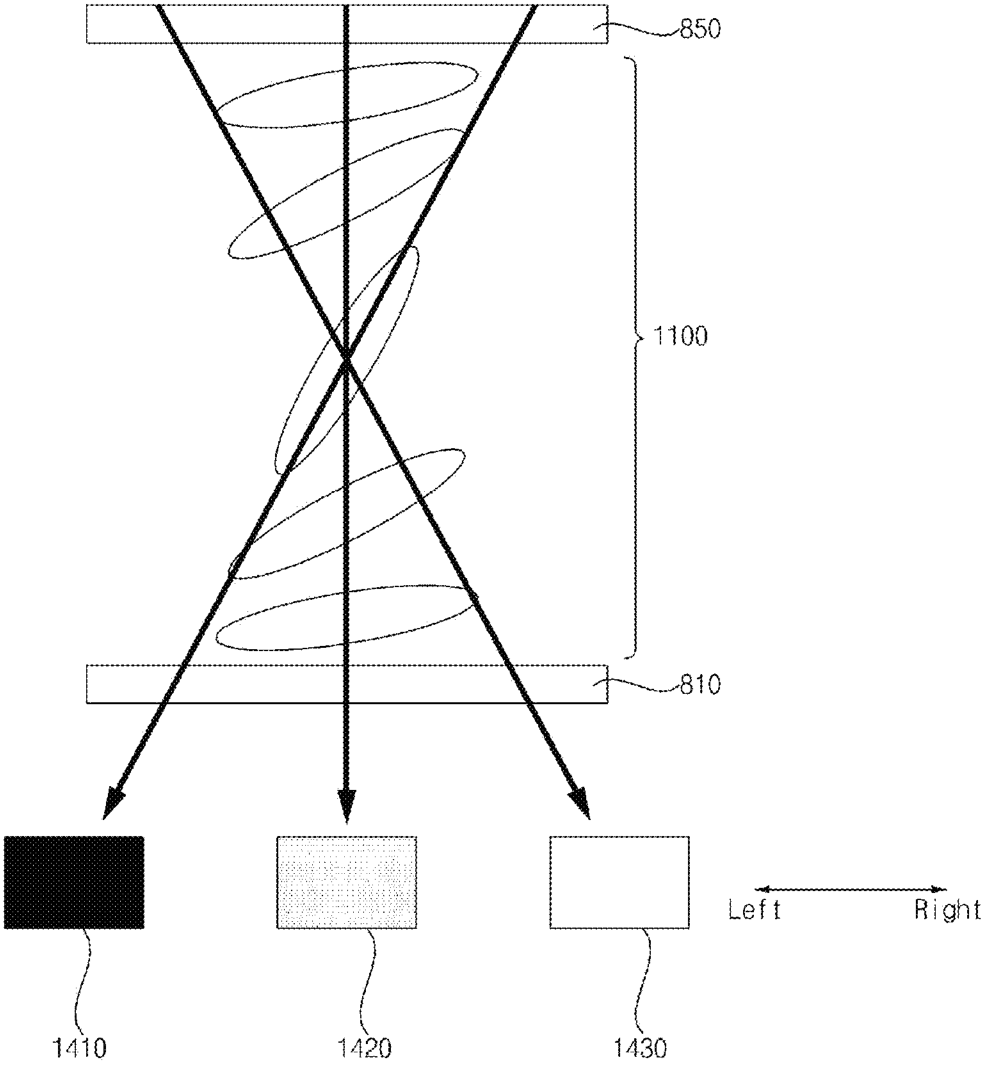

Referring to FIG. 14, light output from the backlight unit 850 may pass through the viewing angle adjustment panel 1100 and then be emitted through the display panel 810. In this case, when the arrangement of the liquid crystal molecules included in the viewing angle adjustment panel 1100 is changed, the luminance of an image output through the vehicle display device 251 may vary depending on the angle at which a user views the display panel 810.

In one embodiment, when a user looks at the display panel 810 from the left side with respect to the overall length direction, the luminance of the screen viewed by the user may be relatively low compared to when viewed from the front or right side (see 1410). In addition, as the user move from left to right, the luminance of the screen viewed by the user may gradually increase (see 1420 and 1430).

Figure 15:
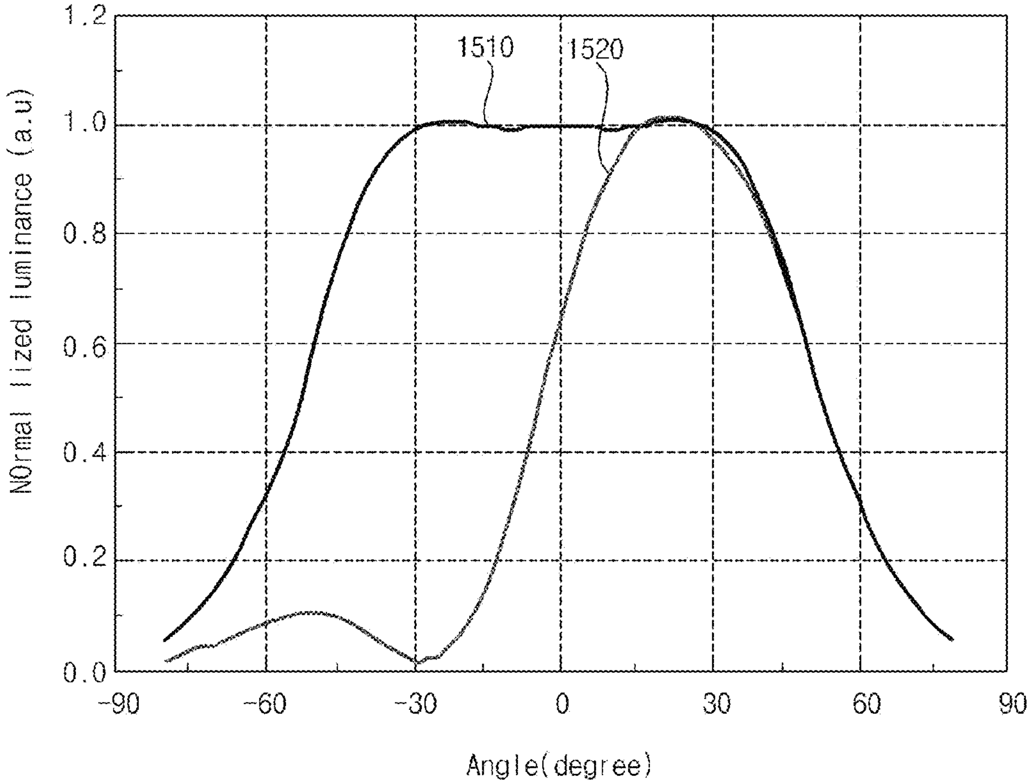
Figure 16:
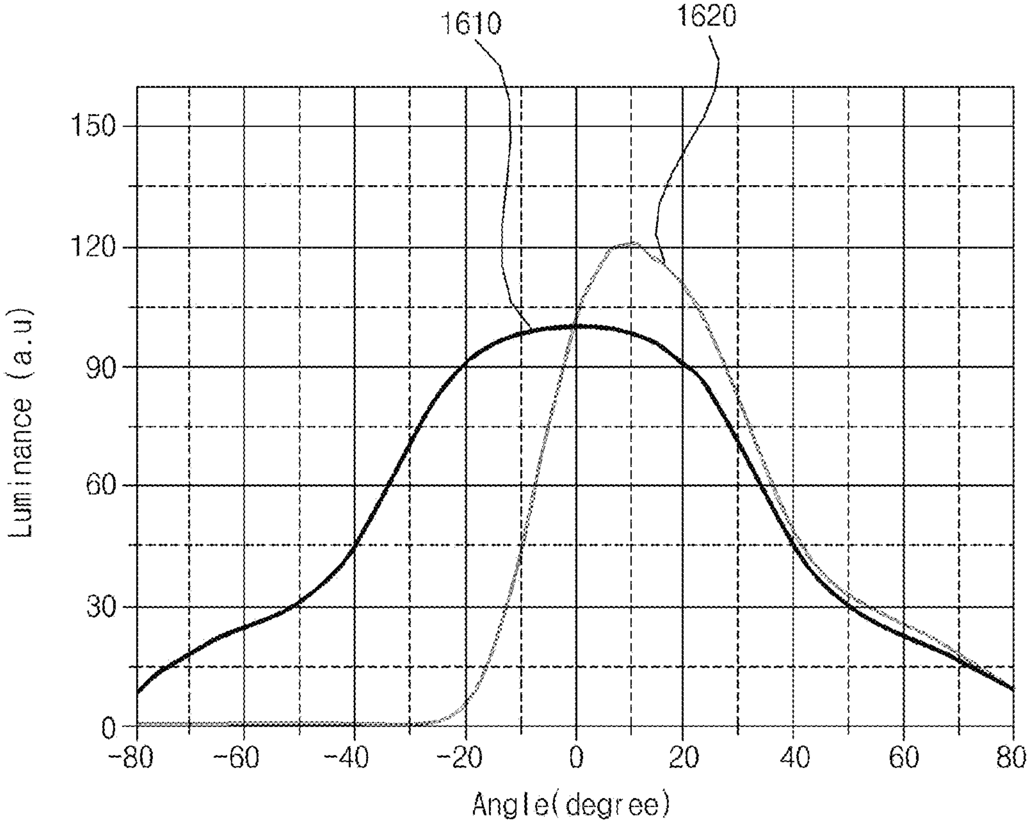
Figure 17:
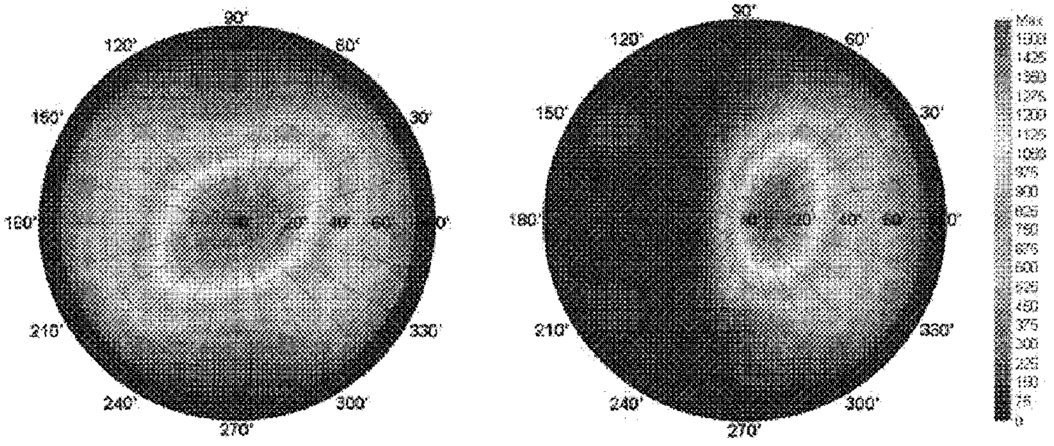

FIG. 15 is a diagram for explaining a case in which the film 1130 is not included in the viewing angle adjustment panel 1100, according to an embodiment of the present disclosure. FIGS. 16 and 17 are diagrams for explaining a case in which the film 1130 is included in the viewing angle adjustment panel 1100, according to an embodiment of the present disclosure.

Although the present disclosure is described based on an example in which the driver's seat is located on the left side and the passenger seat is located on the right side with respect to the overall length direction, the present disclosure is not limited thereto. For example, the present disclosure is applicable to an embodiment in which the driver's seat is located on the right side and the passenger seat is located on the left side or an embodiment in which the driver's seat is located in the center and the passenger seats are located on both sides, with respect to the overall length direction.

Referring to FIG. 15, the viewing angle of the display panel 810 may be determined depending on whether a predetermined mode for adjusting (or controlling) a viewing angle through the viewing angle adjustment panel 1100 is set. When the predetermined mode is set, the arrangement of liquid crystal molecules included in the viewing angle adjustment panel 1100 may be changed to adjust the viewing angle. Thus, a luminance level 1510 of an image output through one area of the display panel 810 when the predetermined mode is not set may be different from the case of a luminance level 1520 when the predetermined mode is set.

According to the luminance level 1510 when the predetermined mode is not set and the luminance level 1520 when the predetermined mode is set, as for the case when the predetermined mode is not set, a user can view the image output through the one area of the display panel 810 from a wider range of angles without distortion. Based on the luminance level 1510 when the predetermined mode is not set, the user can view the image without distortion while maintaining the viewing angle of the one area of the display panel 810 at −30° to 30°. Meanwhile, when the angle at which the user views the one area of the display panel 810 is less than −30° or greater than 30°, the luminance of the screen that the user views through the one area of the display panel 810 may decrease. That is, even when the predetermined mode is not set, the viewing angle may be limited or restricted by the viewing angle adjustment panel 1100 disposed between the display panel 810 and the backlight unit 850.

Based on the luminance level 1520 when the predetermined mode is set, when the angle at which the user views the one area of the display panel 810 is less than 0°, the luminance of the screen that the user views through the one area of the display panel 810 may decrease. That is, when the predetermined mode is set, as the user moves to the left where the driver's seat is located, the luminance of the screen that the user views through the one area of the display panel 810 may decrease.

In addition, when the angle between the user and the one area of the display panel 810 is −30°, the luminance of the screen that the user views through the one area of the display panel 810 may be at its minimum value. However, when the angle between the user and the one area of the display panel 810 is less than −30°, the luminance of the screen viewed through the one area of the display panel 810 may increase again.

Referring to FIGS. 16 and 17, in case the viewing angle adjustment panel 1100 includes the film 1130, when the angle at which a user views one area of the display panel 810 is less than 0°, the luminance of the screen that the user views through the one area of the display panel 810 may decrease. However, as for the case when the predetermined mode is not set (see 1610 and 1710), it exhibits a wider range of viewing angles, compared to the case when the predetermined mode is set (see 1620 and 1720).

Meanwhile, when the predetermined mode is set (see 1620 and 1720), if the angle between the user and the one area of the display panel 810 is −25°, the luminance of the screen that the user views through the one area of the display panel 810 may be at its minimum value. In this case, as emission of light is limited by the film 1130, the luminance of the screen that the user views through the one area of the display panel 810 may be at its minimum value even when the angle between the user and the one area of the display panel 810 is less than-25°. Therefore, when the angle between the one area of the display panel 810 and the driver's seat is less than −25°, the user located in the driver's seat may be blocked from watching the image output through the one area of the display panel 810.

Figure 18:
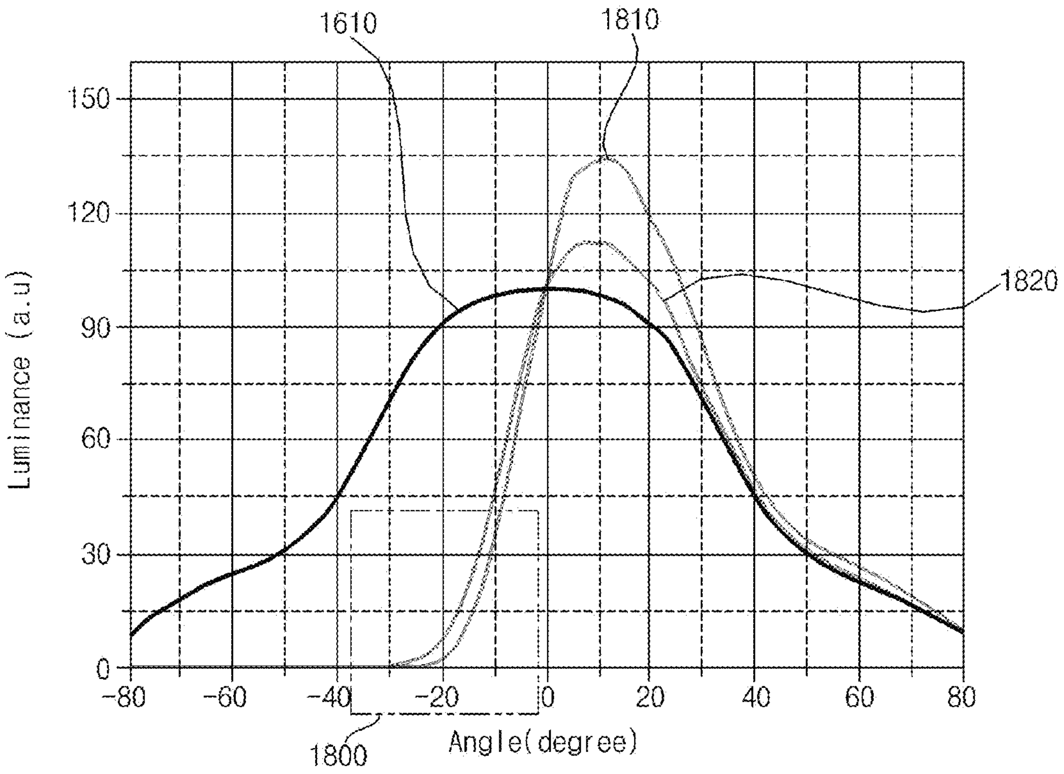
Figure 19:
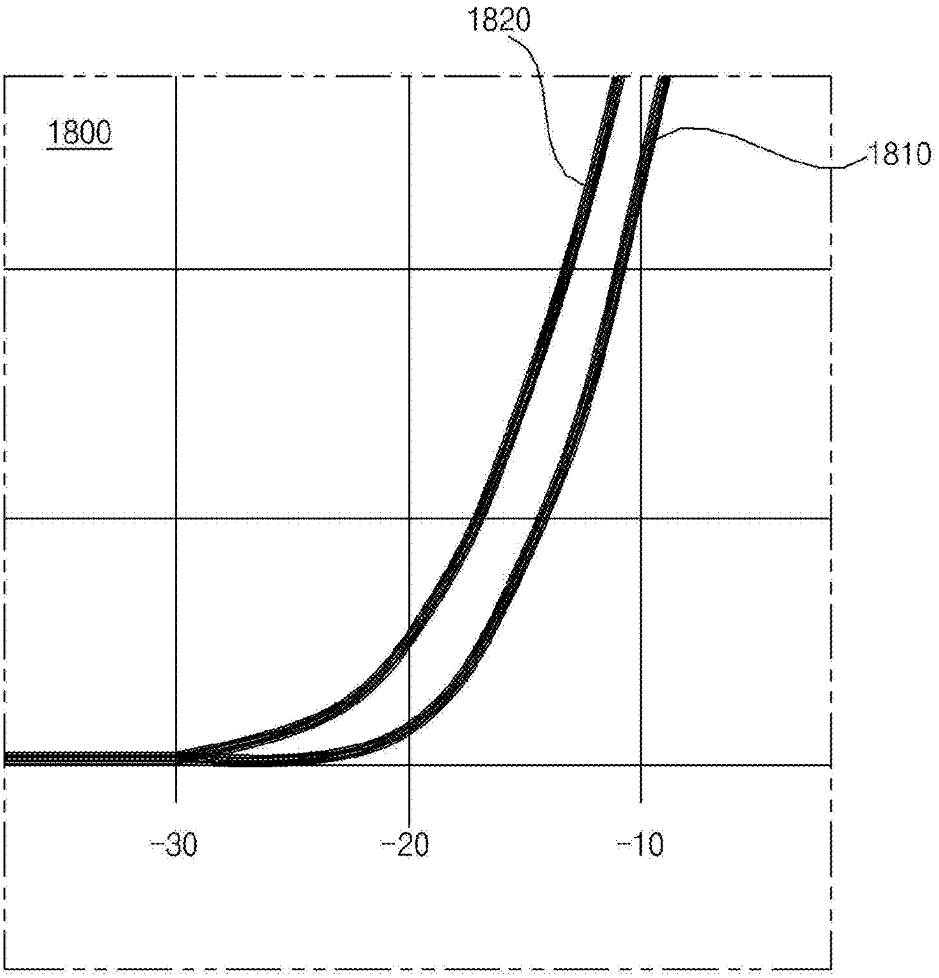

Referring to FIGS. 18 and 19, when the voltage difference between the electrodes is a first voltage (e.g., 2.43V) (see 1810), if the angle between a user and one area of the display panel 810 is less than −23°, the luminance of the screen that the user views through the one area of the panel 810 may be at its minimum value. By contrast, when the voltage difference between the electrodes is a first voltage (e.g., 2.35V) (see 1820), if the angle between a user and one area of the display panel 810 is less than −28°, the luminance of the screen that the user views through the one area of the panel 810 may be at its minimum value.

In other words, the vehicle display device 251 may change the viewing angle by adjusting the voltage difference between the electrodes of the plurality of substrates. In addition, as the voltage difference between the electrodes of the plurality of substrates increases, the viewing angle for the display panel 810 may decrease.

The vehicle display device 251 may adjust a viewing angle for the display panel 810 based on the position of a user located in the driver's seat (hereinafter referred to as a "driver"). For example, the vehicle display device 251 may set the voltage difference between the electrodes to 2.35V when the angle between the driver and one area of the display panel 810 is −28°. In this case, when the angle between the driver and the one area of the display panel 810 becomes −23° as the driver moves to the right, the vehicle display device 251 may change the voltage difference between the electrodes to 2.43V. Accordingly, even when there is a change in the driver's position, it is possible to block the driver from watching the image output through the one area of the display panel 810.

Figure 20:
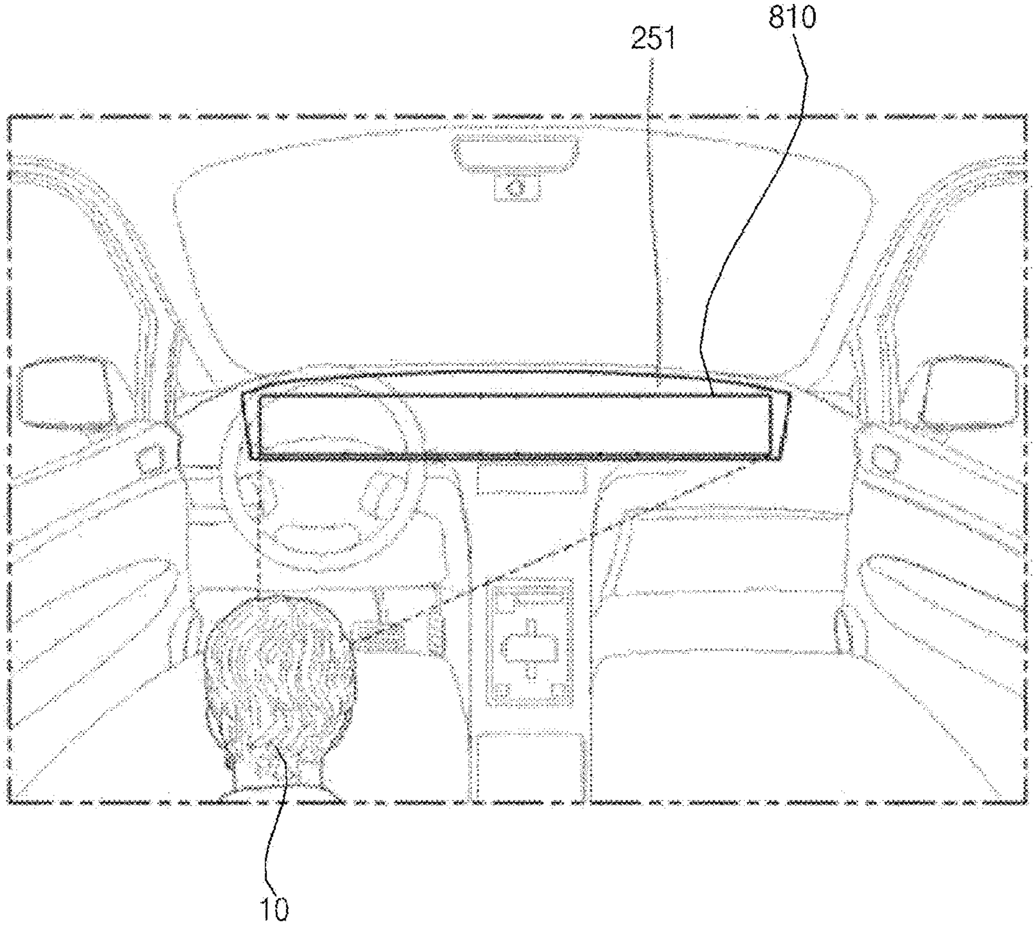
Figure 21:
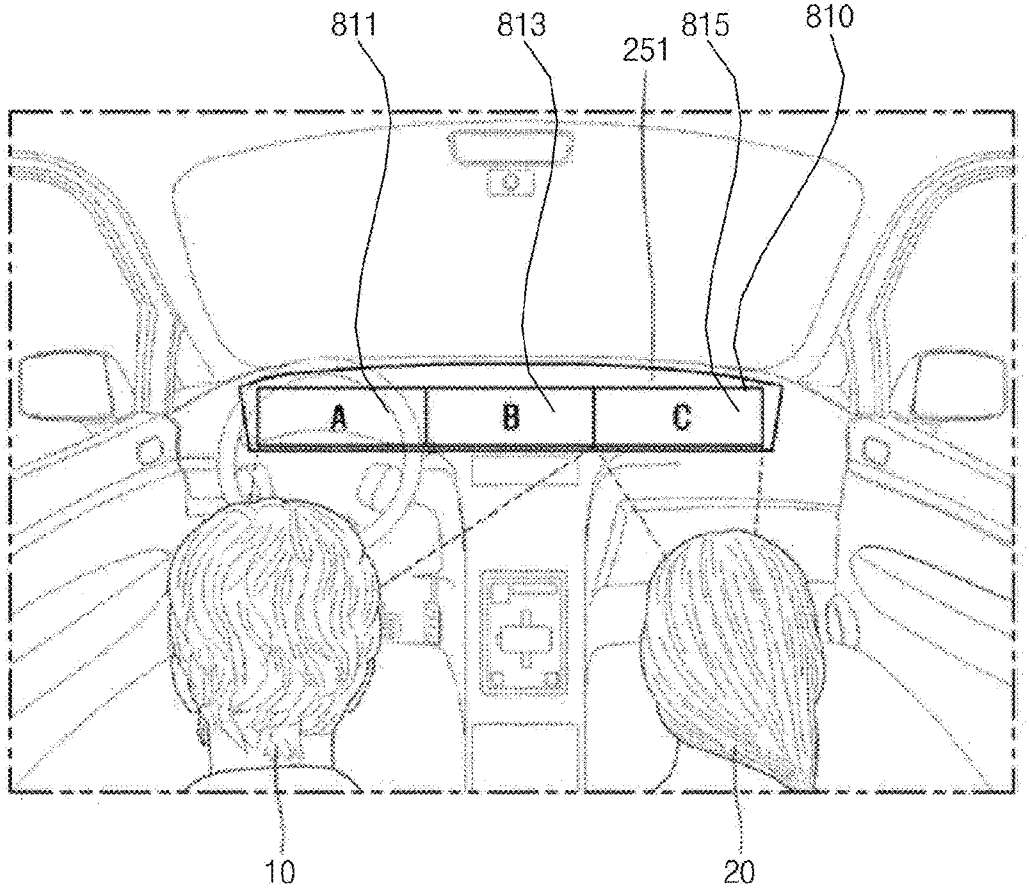

Referring to FIGS. 20 and 21, the display panel 810 corresponding to the instrument panel (or dashboard) may be disposed in front of a driver 10 and/or a user 20 in the passenger seat (hereinafter referred to as a "passenger"). The driver 10 can gaze at the entire area of the display panel 810.

The display panel 810 may include a first area 811 corresponding to the driver 10, a second area 813 corresponding to the driver 10 and the passenger 20, and/or a third area 815 corresponding to the passenger 20. In the present disclosure, it is illustrated that the display panel 810 consists of three areas (811, 813, 815), but the present disclosure is not limited thereto.

The vehicle display device 251 may output an image through at least one area of the display panel 810. For example, the vehicle display device 251 may output, through the first area 811, an instrument panel screen containing driving (or traveling) speed, driving distance, etc. For example, the vehicle display device 251 may output, through the second area 813, a control screen for controlling devices in the vehicle 100 such as a lamp device and an air conditioner, a screen containing navigation information, etc. For example, the vehicle display device 251 may output video content, such as a movie, a game, or the like, through the third area 815.

Figure 22:
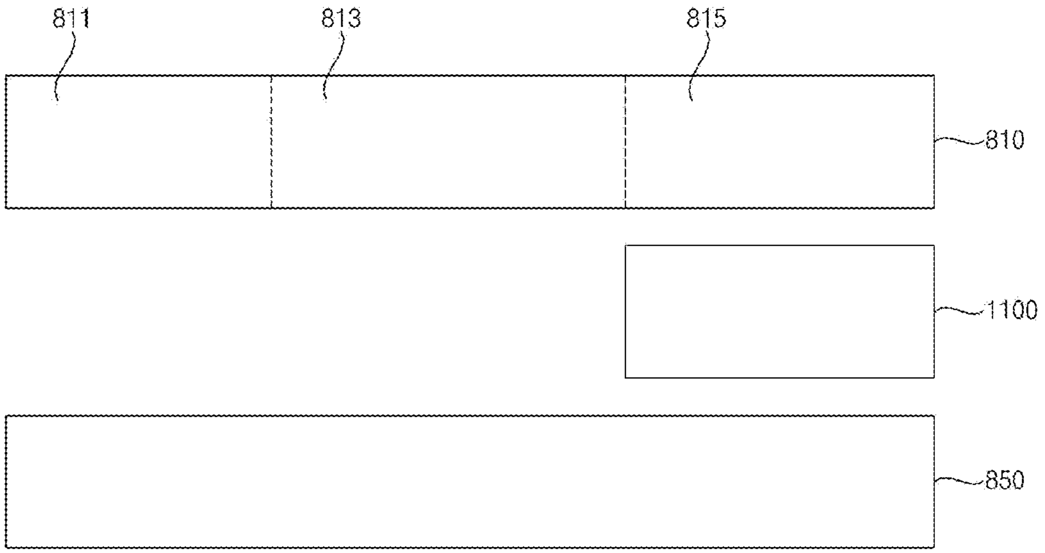
Figure 23:
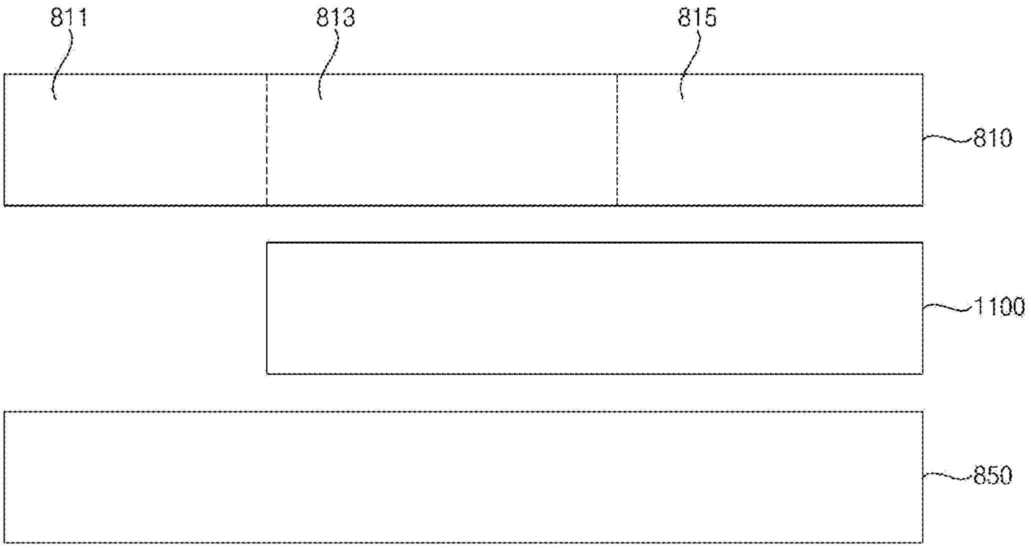
Figure 24:
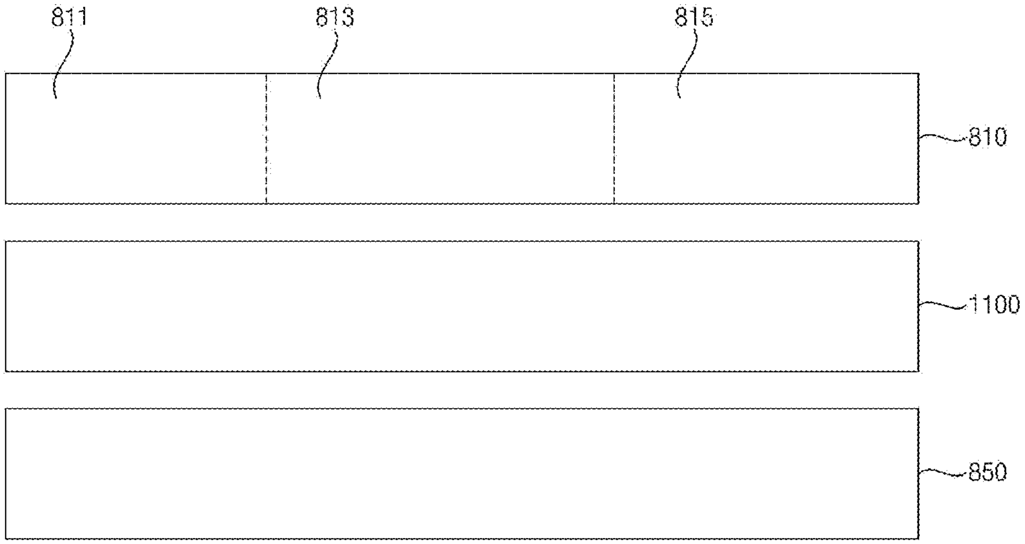

Referring to FIGS. 22 to 24, the viewing angle adjustment panel 1100 may be disposed to correspond to at least a portion of the plurality of areas of the display panel 810.

Referring to FIG. 22, the viewing angle adjustment panel 1100 may be disposed to correspond to the third area 815 of the display panel 810. When the arrangement of the liquid crystal molecules included in the viewing angle adjustment panel 1100 is changed, the viewing angle for at least a portion of the third area 815 may be adjusted. For example, when a predetermined mode is set, the vehicle display device 251 may adjust the viewing angle for the entire third area 815. In this case, a restricted area may correspond to the entire third area 815.

Referring to FIG. 23, the viewing angle adjustment panel 1100 may be disposed to correspond to the second area 813 and the third area 815 of the display panel 810. When the arrangement of the liquid crystal molecules included in the viewing angle adjustment panel 1100 is changed, the viewing angle for at least a portion of the second area 813 or the third area 815 may be adjusted. For example, when a predetermined mode is set, the vehicle display device 251 may adjust the viewing angle for the third area 815 between the second area 813 and the third area 815.

Referring to FIG. 24, the viewing angle adjustment panel 1100 may be disposed to correspond to the first area 811, the second area 813, and the third area 815 of the display panel 810. When the arrangement of liquid crystal molecules included in the viewing angle adjustment panel 1100 corresponding to the first area 811 is changed, light emitted toward the passenger seat through the first area 811 may be blocked. When the arrangement of liquid crystal molecules included in the viewing angle adjustment panel 1100 corresponding to the second area 813 and the third area 815 is changed, light emitted toward the driver's seat through at least a portion of the second area 813 or the third area 815 may be blocked.

Figure 25:
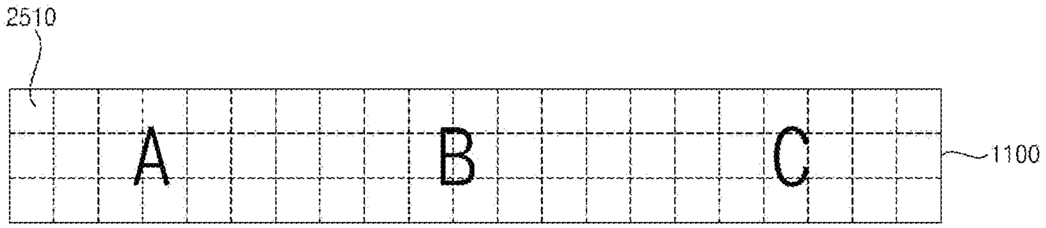

Referring to FIG. 25, the viewing angle adjustment panel 1100 may include a plurality of sub-units 2510 that independently control the arrangement of liquid crystal molecules. The plurality of sub-units 2510 may be disposed side by side in an area where the viewing angle adjustment panel 1100 is disposed. The plurality of sub-units 2510 may be disposed to correspond to the respective areas of the display panel 810.

The vehicle display device 251 may apply a predetermined voltage to the sub-unit 2510 so as to change the arrangement of the liquid crystal molecules included in the sub-unit 2510. In this case, as the voltage applied to the sub-unit 2510 increases, the voltage difference between the electrodes of a plurality of substrates included in the sub-unit 2510 may increase. For example, when the third area 815 corresponds to a restricted area, the vehicle display device 251 may apply a predetermined voltage to the sub-unit 2510 corresponding to the third area 815, so that the arrangement of the liquid crystal molecules included in the sub-unit 2510 corresponding to the third area 815 is changed. For example, when the second area 813 and the third area 815 correspond to a restricted area, the vehicle display device 251 may apply a first voltage to the sub-unit 2510 corresponding to the second area 813, and may apply a second voltage lower than the first voltage to the sub-unit 2510 corresponding to the third area 815.

Figure 26:
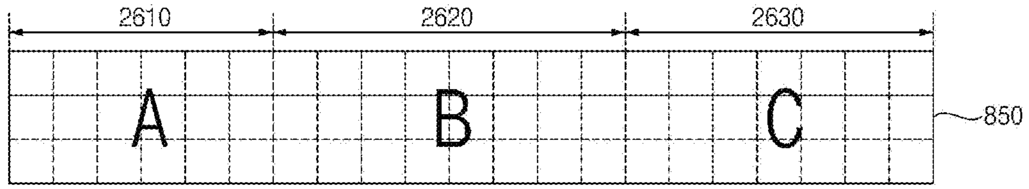

Referring to FIG. 26, a plurality of blocks included in the backlight unit 850 may be disposed to correspond to the respective areas of the display panel 810. The vehicle display device 251 may adjust the intensity of light output from each of the plurality of blocks included in the backlight unit 850. For example, the backlight unit 850 may include a first block 2610 corresponding to the first area 811, a second block 2620 corresponding to the second area 813, and a third block 2630 corresponding to the third area 815. In this case, when the third area 815 corresponds to a restricted area, the vehicle display device 251 may adjust the intensity of light output from at least a portion of the third block 2630 according to a predetermined compensation value.

Figure 27:
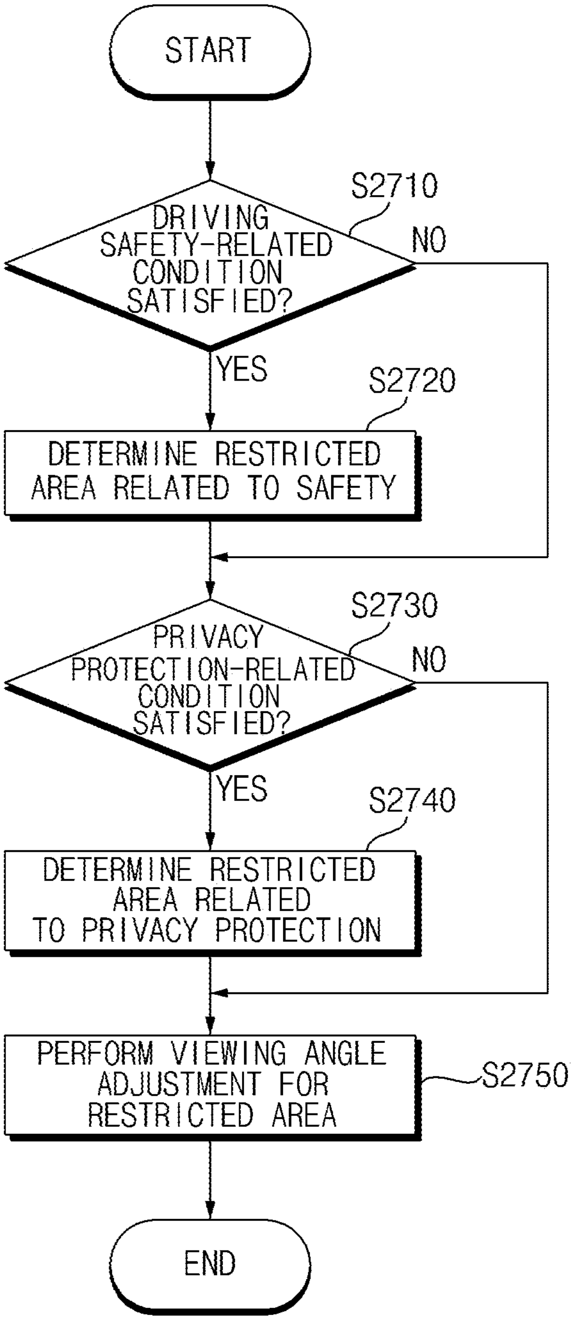
FIG. 27 is a flowchart illustrating a method of operating a display device for a vehicle according to an embodiment of the present disclosure.

FIG. 27 is a flowchart illustrating a method of operating a display device for a vehicle, according to an embodiment of the present disclosure. In the following description, it can be understood that at least some of the operations performed by the vehicle display device 251 are performed by the controller 170 and/or the processor 270.

Referring to FIG. 27, in operation S2710, the vehicle display device 251 may determine whether a condition related to driving of the vehicle 100 (hereinafter referred to as a "first condition") is satisfied. Here, the first condition may correspond to a condition related to safety when driving the vehicle 100.

In one embodiment, the vehicle display device 251 may determine whether the first condition is satisfied based on at least one of the speed of the vehicle 100, the state of a transmission, the autonomous mode, the use of a restricted area of the display panel 810 where a viewing angle is adjusted, the type of image output through the display 810, and the user's gaze. For example, the vehicle display device 251 may determine that the first condition is satisfied when a user input for adjusting the viewing angle of the display panel 810 is received through the input unit 210 during driving. For example, the vehicle display device 251 may determine that the first condition is satisfied when the speed of the vehicle 100 is greater than or equal to a preset speed limit (e.g., 10 km per hour), and may determine that the first condition is not satisfied when the speed of the vehicle 100 is less than the preset speed limit (e.g., 10 km per hour). For example, the vehicle display device 251 may determine that the first mode is satisfied when the autonomous mode is set, and may determine that the first condition is not satisfied when the manual mode is set. For example, the vehicle display device 251 may determine that the first condition is not satisfied when only driving-related content (e.g., instrument panel and navigation information) is output through the display panel 810.

In one embodiment, the vehicle display device 251 may perform a determination on the first condition when the transmission is in drive (D), reverse (R), or neutral (N), and may stop (or terminate) the determination on the first condition when the transmission is in park (P).

In one embodiment, data corresponding to the eyes of a user located in the driver's seat may be obtained through the internal camera 220 provided in the vehicle 100. In this case, the vehicle display device 251 may stop the determination on the first condition when it is determined that the driver's gaze is directed forward based on driver's gaze information.

In operation S2720, when the first condition is satisfied, the vehicle display device 251 may determine, of the display panel 810, a restricted area related to driving safety (hereinafter referred to as a "first restricted area").

In one embodiment, when the first condition is satisfied, the vehicle display device 251 may determine one area of the display panel 810 adjacent to the passenger seat as the first restricted area. For example, the one area of the display panel 810 adjacent to the passenger seat may include at least the third area 815. Meanwhile, a size (or area) of the first restricted area may increase as the speed of the vehicle 100 increases. For example, when the speed of the vehicle 100 is less than a first speed (e.g., 60 km/h), the third area 815 may be included in the first restricted area. For example, when the speed of the vehicle 100 is greater than or equal to the first speed (e.g., 60 km/h) but less than a second speed (e.g., 80 km/h), the third area 815 and a portion of the second area 813 adjacent to the third area 815 may be included in the first restricted area. For example, when the speed of the vehicle 100 is greater than or equal to a third speed (e.g., 100 km/h), the second area 813 and the third area 815 may be included in the first restricted area. That is, as the speed of the vehicle 100 increases, the size of the second area 813 included in the first restricted area may increase in the direction toward the driver's seat. In this case, as the speed of the vehicle 100 changes, the size of the second area 813 included in the first restricted area may gradually change.

In one embodiment, the vehicle display device 251 may determine the first restricted area based on the type of content output through the display panel 810. For example, based on driving-related content (e.g., instrument panel and navigation information) being output through the display panel 810, the vehicle display device 251 may determine the first restricted area in the remaining area of the display panel 810, excluding an area where the driving-related content is output. For example, based on video content, such as a movie, a game, OTT service, or the like, being output through the display panel 810, the vehicle display device 251 may determine an area of the display panel 810 where the video content is output as the first restricted area.

In operation S2730, the vehicle display device 251 may determine whether a privacy-related condition (hereinafter referred to as a "second condition") is satisfied. Here, the second condition may include at least one of a condition related to the privacy of the driver 10 and a condition related to the privacy of the passenger 20. For example, when content corresponding to the passenger seat is output through the display panel 810, the vehicle display device 251 may determine that it corresponds to the condition related to the privacy of the passenger 20. In this case, the content corresponding to the passenger seat may include content transmitted to the vehicle 100 from a mobile device of the passenger 20, content preset to correspond to the passenger 20, etc.

Meanwhile, in one embodiment, the vehicle display device 251 may perform a determination on the second condition based on whether the passenger 20 is located in the passenger seat. For example, data corresponding to the passenger seat may be obtained through the internal camera 220 provided in the vehicle 100. In this case, based on the passenger 20 being seated in the passenger seat, the vehicle display device 251 may perform a determination on the second condition. By contrast, based on the passenger 20 not being seated in the passenger seat, the vehicle display device 251 may stop (or terminate) the determination on the second condition.

In operation S2740, when the second condition is satisfied, the vehicle display device 251 may determine a privacy-related restricted area (hereinafter referred to as a "second restricted area") of the display panel 810. For example, when a message transmitted from the mobile device of the passenger 20 to the vehicle 100 is output through the second area 813 of the display panel 810, the second area 813 may be determined as the second restricted area. For example, when video content preset or designated as exclusive content for the passenger 20 is output through the third area 815 of the display panel 810, the third area 815 may be determined as the second restricted area.

In operation S2750, the vehicle display device 251 may adjust a viewing angle for the restricted area. The vehicle display device 251 may apply voltage to the viewing angle adjustment panel 1100 corresponding to one area of the display panel 810 determined as at least one of the first restricted area and the second restricted area. For example, when the third area 815 is determined as the first restricted area and the second area 813 is determined as the second restricted area, the vehicle display device 251 may apply voltage to a plurality of sub-units 2510 that correspond to the second area 813 and the third area 815, respectively.

Figure 28:
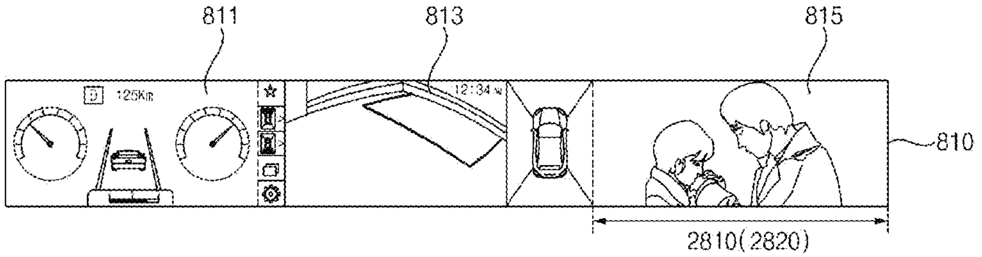
FIGS. 28 to 39 are views for explaining the operation of a display device for a vehicle according to an embodiment of the present disclosure.

Referring to FIG. 28, an instrument panel screen may be output through the first area 811 of the display panel 810. An around view monitor screen may be output through the second area 813 of the display panel 810 via the camera 310. In this case, as the instrument panel screen and the around view monitor screen are driving-related content, the vehicle display device 251 may determine the first restricted area from the remaining area, excluding the first area 811 and the second area 813.

Meanwhile, movie-related video content may be output through the third area 815 of the display panel 810. In this case, the vehicle display device 251 may determine the third area 815 of the display panel 810, where the movie-related content corresponding to video content is output, as the first restricted area 2810. Meanwhile, when movie-related video content is transmitted from a mobile device of the passenger 20 or is preset as exclusive content for the passenger 20, the vehicle display device 251 may determine the third area 815 of the display panel 810 as the second restricted area 2820.

The vehicle display device 251 may apply voltage to the viewing angle adjustment panel 1100 corresponding to the first restricted area 2810. In this case, as the arrangement of liquid crystal molecules corresponding to the first restricted area 2810 is changed, emission of light from the first restricted area 2810 toward the driver's seat may be restricted. Meanwhile, the vehicle display device 251 may continue to change the arrangement of liquid crystal molecules corresponding to the second restricted area 2820 even when the driving of the vehicle 100 is finished. Thus, while the movie-related video content is being output, emission of light from the second restricted area 2820 to the driver's seat may continue to be restricted.

In FIGS. 29 to 38, description will be given under the assumption that the first area 811 of the display panel 810 where an instrument panel screen is output is not included in the first restricted area and the second restricted area. In addition, the third area 815 of the display panel 810 where movie-related video content is output may be determined as the first restricted area.

Figure 29:
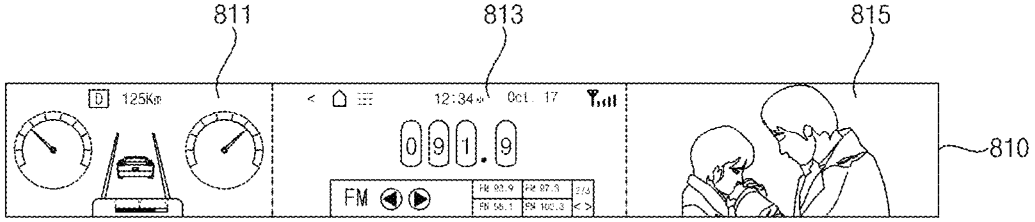

Referring to FIG. 29, radio-related content may be output through the second area 813 of the display panel 810. In this case, as the radio-related content does not correspond to driving-related content, at least a portion of the second area 813 may be determined as the first restricted area according to the first condition. For example, when the speed of the vehicle 100 is greater than or equal to the first speed (e.g., 60 km/h), at least a portion of the second area 813 may be included in the first restricted area according to the speed of the vehicle 100.

Figure 30:
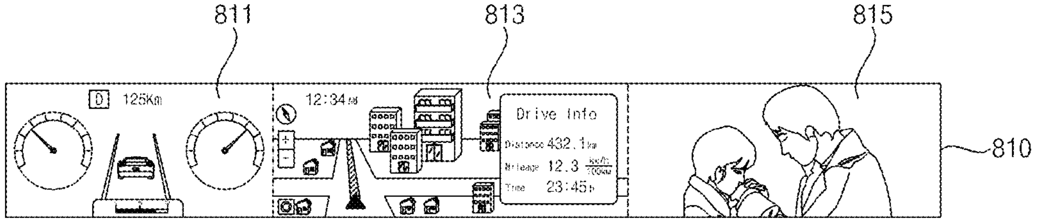

Referring to FIG. 30, an instrument panel screen may be output through the first area 811 of the display panel 810. In addition, a navigation screen may be output through the second area 813 of the display panel 810. In this case, as the instrument panel screen and the navigation screen are driving-related content, the vehicle display device 251 may determine the first restricted area from the remaining area, excluding the first area 811 and the second area 813.

Figure 31:
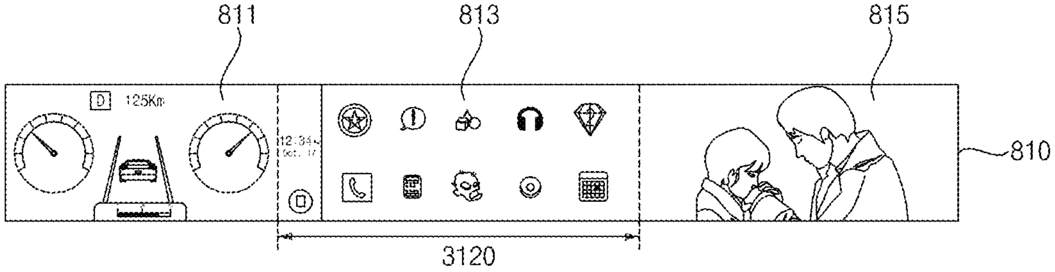

Referring to FIG. 31, by contrast, as a home screen corresponding to the mobile device of the passenger 20 is output through the second area 813 of the display panel 810, the vehicle display device 251 may determine the second area 813 of the display panel 810 as the second restricted area 3120.

Figure 32:
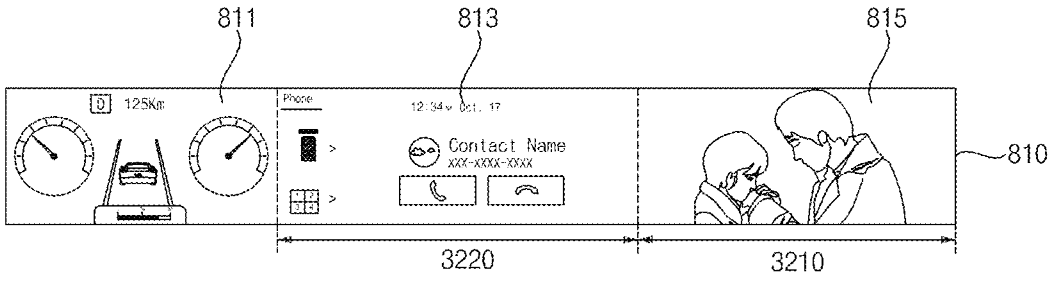
Figure 33:
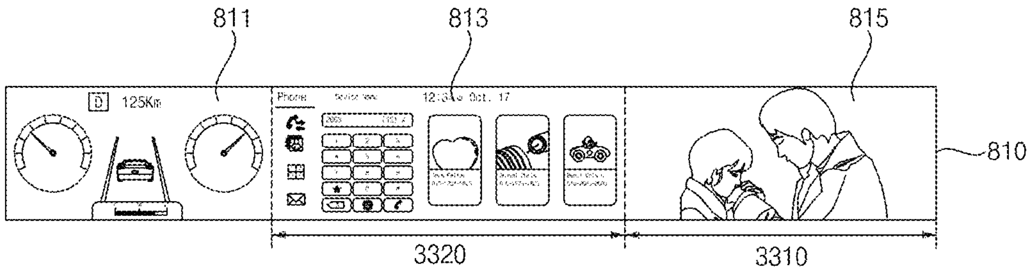

Referring to FIGS. 32 and 33, content related to call function may be output through the second area 813 of the display panel 810. In this case, when the content related to call function corresponds to a call function of the mobile device of the passenger 20, the second area 813 may be determined as the second restricted area 3220, 3320. Meanwhile, when the content related to call function corresponds to a mobile device of the driver 10, the second area 813 may be determined as the first restricted area according to the first condition. For example, when the speed of the vehicle 100 is greater than or equal to the first speed (e.g., 60 km/h), at least a portion of the second area 813 may be included in the first restricted area according to the speed of the vehicle 100.

Figure 34:
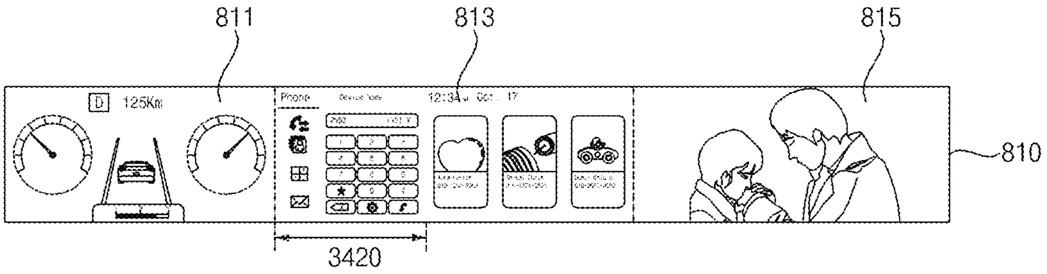

Referring to FIG. 34, content related to call function may be output through the second area 813 of the display panel 810. In this case, when keypad-related content corresponds to the mobile device of the passenger 20 and contact-related content corresponds to the mobile device of the driver 10, only a portion of the second area 813 where the keypad-related content is output may be determined as the second restricted area 3420.

Figure 35:
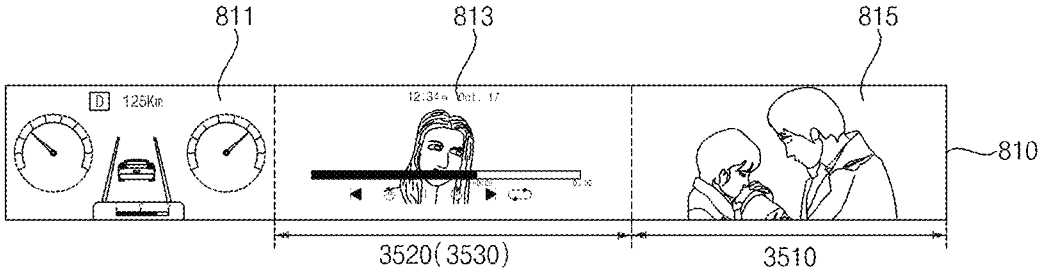

Referring to FIG. 35, real-time OTT service-related content may be output through the second area 813 of the display panel 810. In this case, the vehicle display device 251 may determine the third area 815 of the display panel 810, where the OTT service-related content corresponding to video content is output, as the first restricted area 3520.

Figure 36:
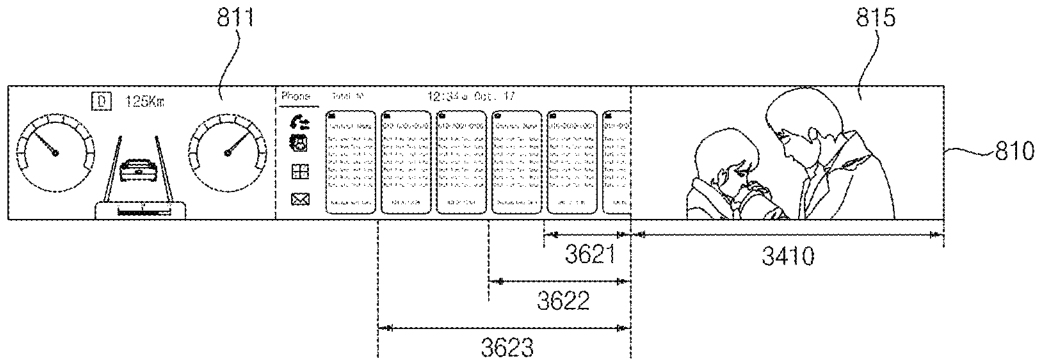

Referring to FIG. 36, text message-related content may be output through the second area 813 of the display panel 810. In this case, when the text message-related content is transmitted from the mobile device of the passenger 20 or is preset as exclusive content for the passenger 20, the vehicle display device 251 may determine the second area 813 of the display panel 810 as the second restricted area.

Meanwhile, when the text message-related content corresponds to the mobile device of the driver 10, the second area 813 may be determined as the first restricted area according to the first condition. For example, when the speed of the vehicle 100 is greater than or equal to a predetermined speed (e.g., 80 km/h), the area of a portion 3621, 3622, 3623 of the second area 813 included in the first restricted area may increase as the speed of the vehicle 100 increases.

Figure 37:
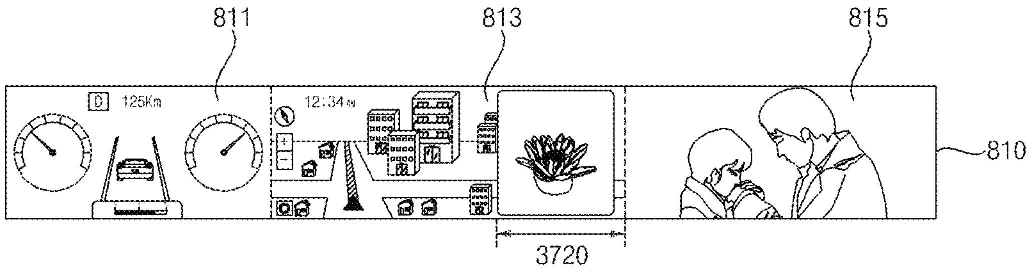

Referring to FIG. 37, a navigation screen may be output through a portion of the second area 813 of the display panel 810. In this case, as the navigation screen is driving-related content, the vehicle display device 251 may determine the first restricted area and/or the second restricted area in the remaining area of the second area 813, excluding the portion where the navigation screen is output.

Photo-related content may be output through a remaining portion of the second area 813 of the display panel 810. In this case, when the photo-related content is transmitted from the mobile device of the passenger 20 or is preset as exclusive content for the passenger 20, the vehicle display device 251 may determine the remaining portion of the second area 813 as the second restricted area 3720.

Figure 38:
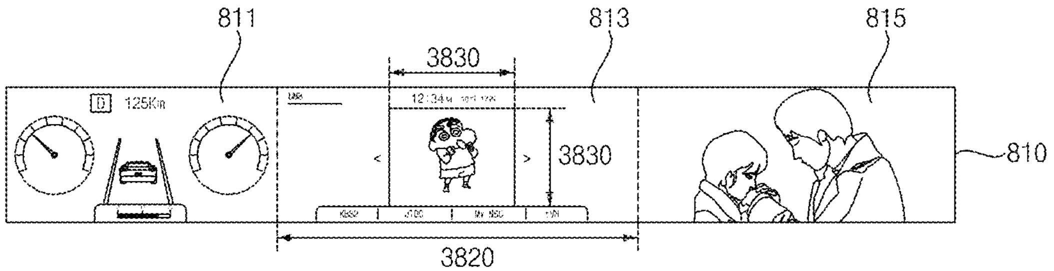

Referring to FIG. 38, digital multimedia broadcasting (DMB)-related content may be output through the second area 813 of the display panel 810. In this case, the vehicle display device 251 may determine the second area 813 of the display panel 810, where the DMB-related content corresponding to video content is output, as the first restricted area 3820. Meanwhile, the vehicle display device 251 may determine only a portion corresponding to an image of the DMB-related content in the second area 813 as the first restricted area 3830.

Figure 39:
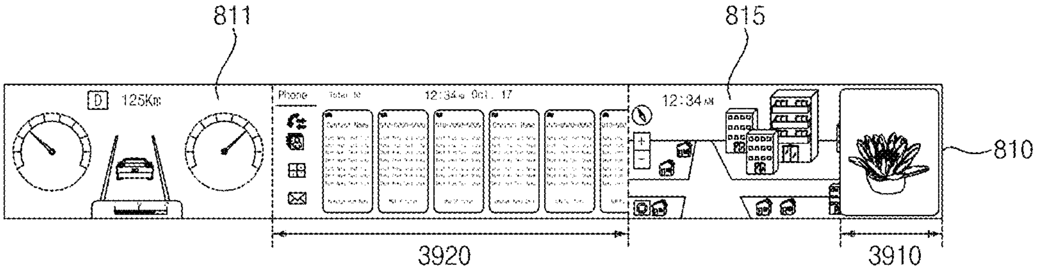

Referring to FIG. 39, a navigation screen may be output through a portion of the third area 815 of the display panel 810. In this case, as the navigation screen is driving-related content, the vehicle display device 251 may determine the first restricted area and/or the second restricted area in the remaining area of the third area 815, excluding the portion where the navigation screen is output.

Photo-related content may be output through a remaining portion of the third area 815 of the display panel 810. In this case, when the photo-related content is transmitted from the mobile device of the passenger 20 or is preset as exclusive content for the passenger 20, the vehicle display device 251 may determine the remaining portion of the third area 815 as the second restricted area 3910.

Meanwhile, text message-related content may be output through the second area 813 of the display panel 810. In this case, when the text message-related content is transmitted from the mobile device of the passenger 20 or is preset as exclusive content for the passenger 20, the vehicle display device 251 may determine the second area 813 of the display panel 810 as the second restricted area 3920.

Figure 40:
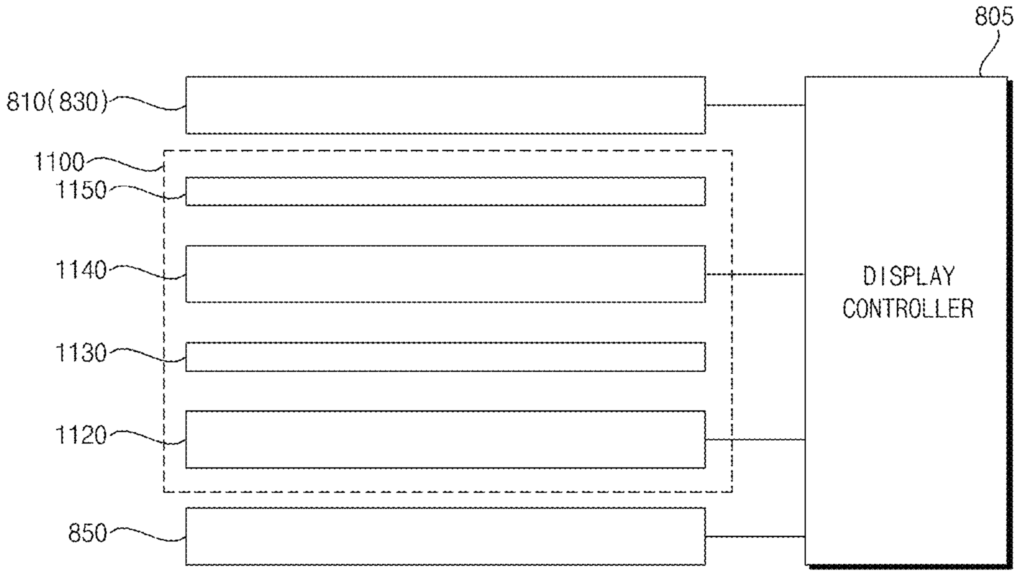
FIGS. 40 to 42 are views for explaining a display device for a vehicle according to an embodiment of the present disclosure.
Figure 41:
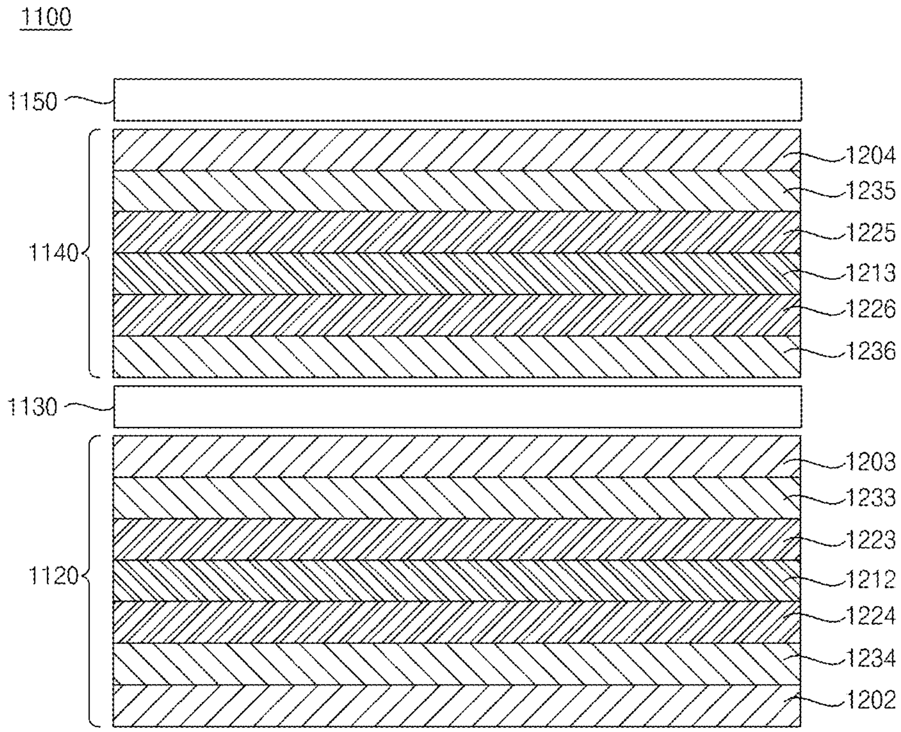
Figure 42:
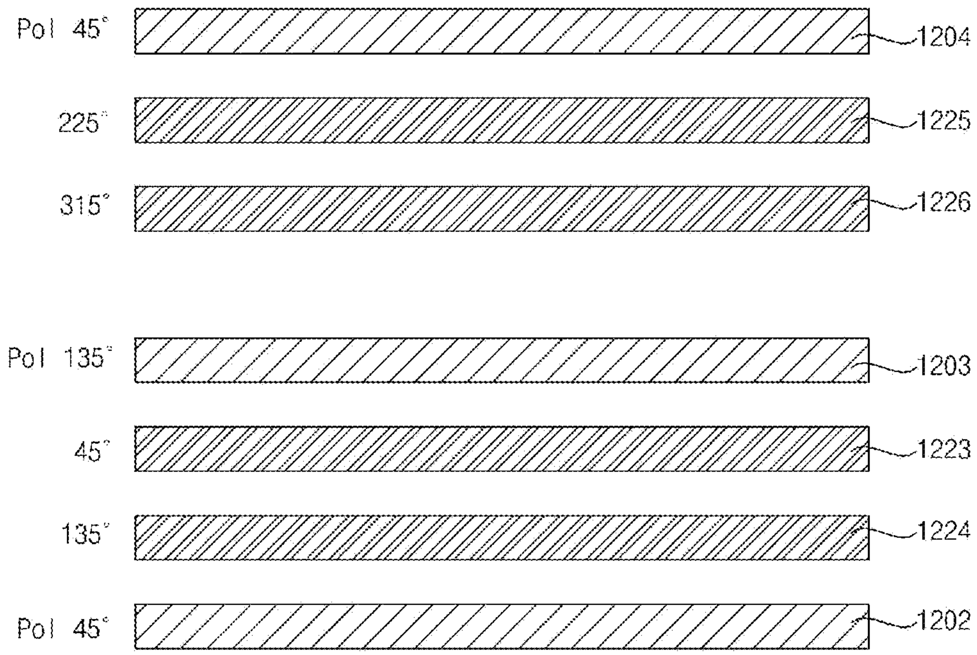

FIGS. 40 to 42 are diagrams for explaining a display device for a vehicle according to an embodiment of the present disclosure. A detailed description similar or equal to the description of FIGS. 11 to 19 will be omitted.

Referring to FIGS. 40 to 42, the viewing angle adjustment panel 1100 may include a second adjustment unit 1120 and a third adjustment unit 1140.

The third adjustment unit 1140 may correspond to the first adjustment unit 1110 rotated by 180° with respect to a rotation axis parallel to the vertical direction in which the components of the viewing angle adjustment panel 1100 are stacked.

The third adjustment unit 1140 may include a third liquid crystal layer 1213 composed of liquid crystal molecules. The third adjustment unit 1140 may include a third upper alignment layer 1225 disposed over the third liquid crystal layer 1213 and a third lower alignment layer 1226 disposed under the third liquid crystal layer 1213. The orientation of the liquid crystal molecules included in the third liquid crystal layer 1213 may be defined by properties of the liquid crystal molecules and patterns of the plurality of third alignment layers 1225 and 1226.

The direction in which the liquid crystal molecules are aligned by the third upper alignment layer 1225 and the direction in which the liquid crystal molecules are aligned by the third lower alignment layer 1226 may be perpendicular to each other. The direction in which the liquid crystal molecules are aligned by the third upper alignment layer 1225 may be opposite to the direction in which the liquid crystal molecules are aligned by the first upper alignment layer 1221. The direction in which the liquid crystal molecules are aligned by the third lower alignment layer 1226 may be opposite to the direction in which the liquid crystal molecules are aligned by the first lower alignment layer 1222.

The third adjustment unit 1140 may include a third upper substrate 1235 disposed over the third liquid crystal layer 1213, and a third lower substrate 1236 disposed under the third liquid crystal layer 1213. The arrangement of the liquid crystal molecules included in the third liquid crystal layer 1213 may be changed according to the voltage difference between electrodes of the plurality of third substrates 1235 and 1236.

As the voltage difference between the electrode of the third upper substrate 1235 and the electrode of the third lower substrate 1236 increases, the degree (or extent) to which the arrangement of the liquid crystal molecules included in the third liquid crystal layer 1213 is changed may increase. In this case, as the degree to which the arrangement of the liquid crystal molecules included in the third liquid crystal layer 1213 is changed, the viewing angle may decrease. For example, as the arrangement of the liquid crystal molecules constituting the first liquid crystal layer 1211 of the first adjustment unit 1110 is changed, emission of light toward the driver's seat may be restricted. For example, as the arrangement of the liquid crystal molecules constituting the third liquid crystal layer 1213 of the third adjustment unit 1130 is changed, emission of light toward the passenger seat may be restricted.

In one embodiment, the viewing angle adjustment panel 1100 may include a plurality of films 1130 and 1140.

A first film 1130 may be disposed over the second adjustment unit 1120. The first film 1130 may be configured to restrict emission of light at a first angle corresponding to the second adjustment unit 1120. For example, when emission of light toward the driver's seat is restricted as the arrangement of the liquid crystal molecules constituting the second liquid crystal layer 1212 of the second adjustment unit 1120 is changed, the first film 1130 may be configured to restrict emission of light at a predetermined angle toward the driver's seat.

The second film 1150 may be disposed over the third adjustment unit 1130. The second film 1150 may be configured to restrict emission of light at a second angle corresponding to the third adjustment unit 1140. For example, when emission of light toward the passenger seat is restricted as the arrangement of the liquid crystal molecules constituting the third liquid crystal layer 1213 of the third adjustment unit 1140 is changed, the second film 1150 may be configured to restrict emission of light at a predetermined angle toward the passenger seat.

In the present disclosure, it is described that the viewing angle adjustment panel 1100 includes the third adjustment unit 1140 corresponding to the first adjustment unit 1110, but the present disclosure is not limited thereto.

In one embodiment, the viewing angle adjustment panel 1100 may include a first adjustment unit 1110 and a fourth adjustment unit corresponding to the second adjustment unit 1120. In this case, the fourth adjustment unit may correspond to the second adjustment unit 1120 rotated by 180° with respect to a rotation axis parallel to the vertical direction in which the components of the viewing angle adjustment panel 1100 are stacked. For example, the vehicle display device 251 may restrict emission of light toward the driver's seat through the first adjustment unit 1110, and may restrict emission of light toward the passenger seat through the fourth adjustment unit.

In one embodiment, the vehicle display device 251 may include a plurality of viewing angle adjustment panels. The plurality of viewing angle adjustment panels may be stacked and arranged along the vertical direction. One of the plurality of viewing angle adjustment panels may correspond to the viewing angle adjustment panel 1100 illustrated in FIGS. 11 to 13. A remaining one of the plurality of viewing angle adjustment panels may correspond to the viewing angle adjustment panel 1100 rotated by 180° with respect to a rotation axis parallel to the vertical direction. For example, the vehicle display device 251 may restrict emission of light toward the driver's seat through one of the plurality of viewing angle adjustment panels, and may restrict emission of light toward the passenger seat through a remaining one of the plurality of viewing angle adjustment panels.

Figure 43:
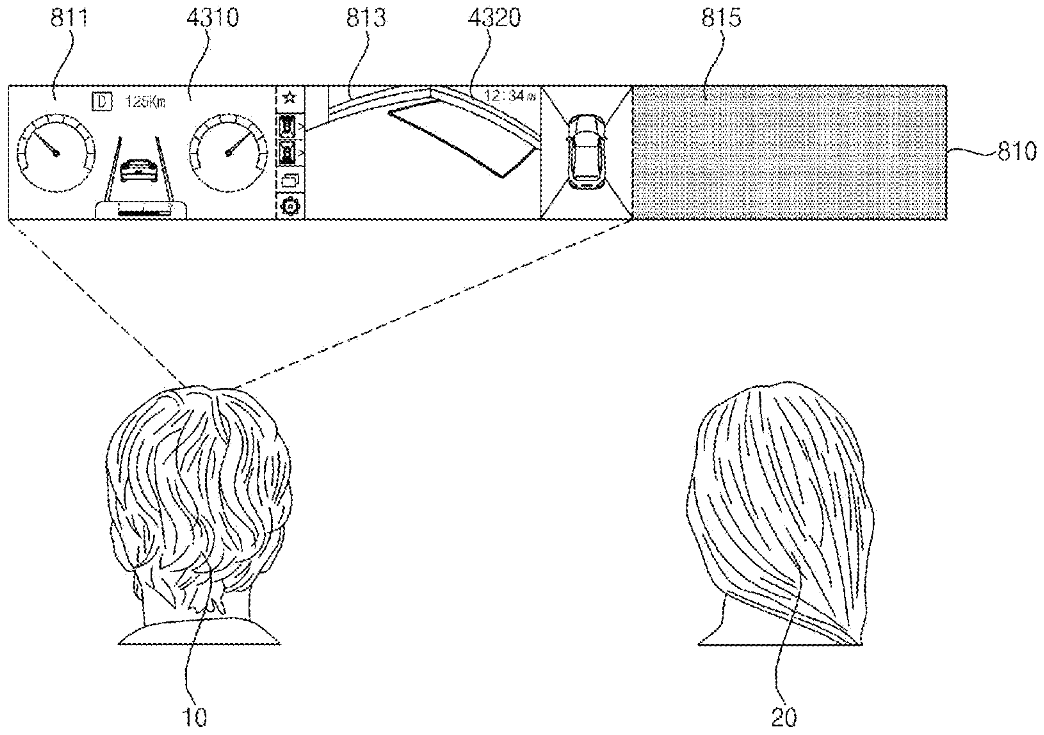
FIGS. 43 to 60 are views for explaining the operation of a display device for a vehicle according to an embodiment of the present disclosure.
Figure 44:
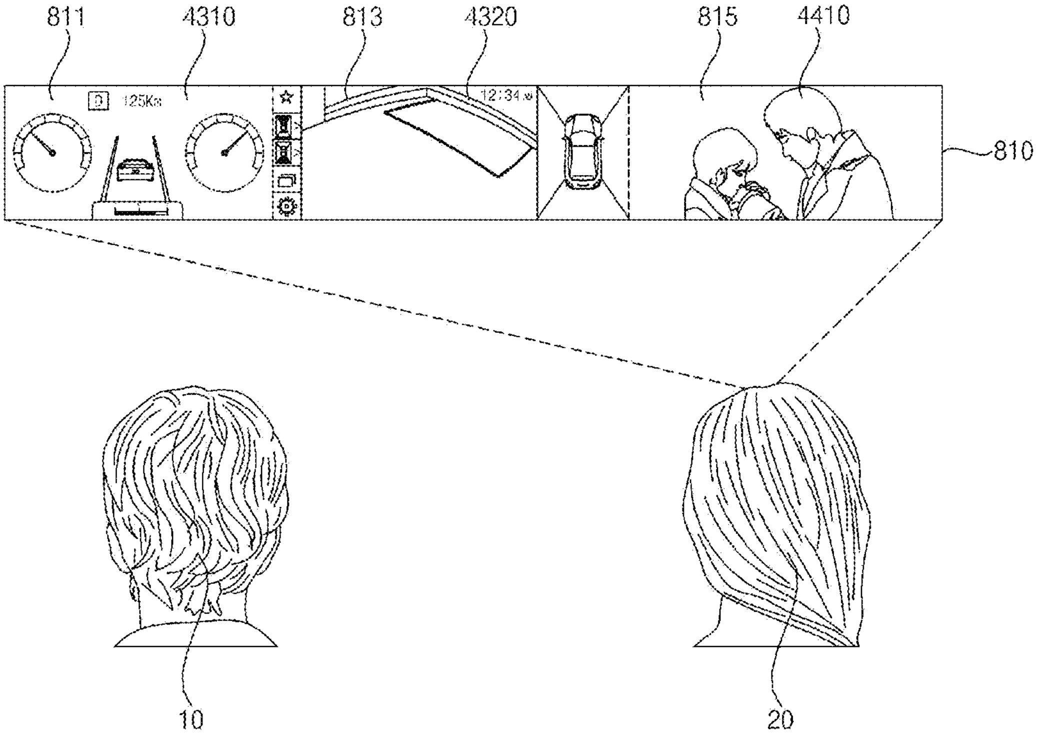

Referring to FIGS. 43 and 44, as an instrument panel screen 4310 output through the first area 811 and an around view monitor screen 4320 output through the second area 813 are both driving-related content, the vehicle display device 251 may determine the first restricted area from the remaining area, excluding the first area 811 and the second area 813.

As movie-related content 4410 corresponding to video content is output through the third area 815, the vehicle display device 251 may determine the third area 815 as the first restricted area.

The vehicle display device 251 may restrict light emitted toward the driver's seat from the third area 815 of the display panel 810, which is determined as the first restricted area. The vehicle display device 251 may apply voltage to the second upper substrate 1233 and the second lower substrate 1234 disposed in one area of the viewing angle adjustment panel 1100 corresponding to the third area 815 of the display panel 810. In this case, as the arrangement of the liquid crystal molecules of the second liquid crystal layer 1212 corresponding to the third area 815 is changed, light emitted from the third area 815 toward the driver's seat may be restricted.

Thus, the driver 10 may only be able to view the instrument panel screen 4310 and the around view monitor screen 4320, and may not be able to view the movie-related content 4410. By contrast, the passenger 20 may be able to view all of the instrument panel screen 4310, the around view monitor screen 4320, and the movie-related content 4410.

Figure 45:
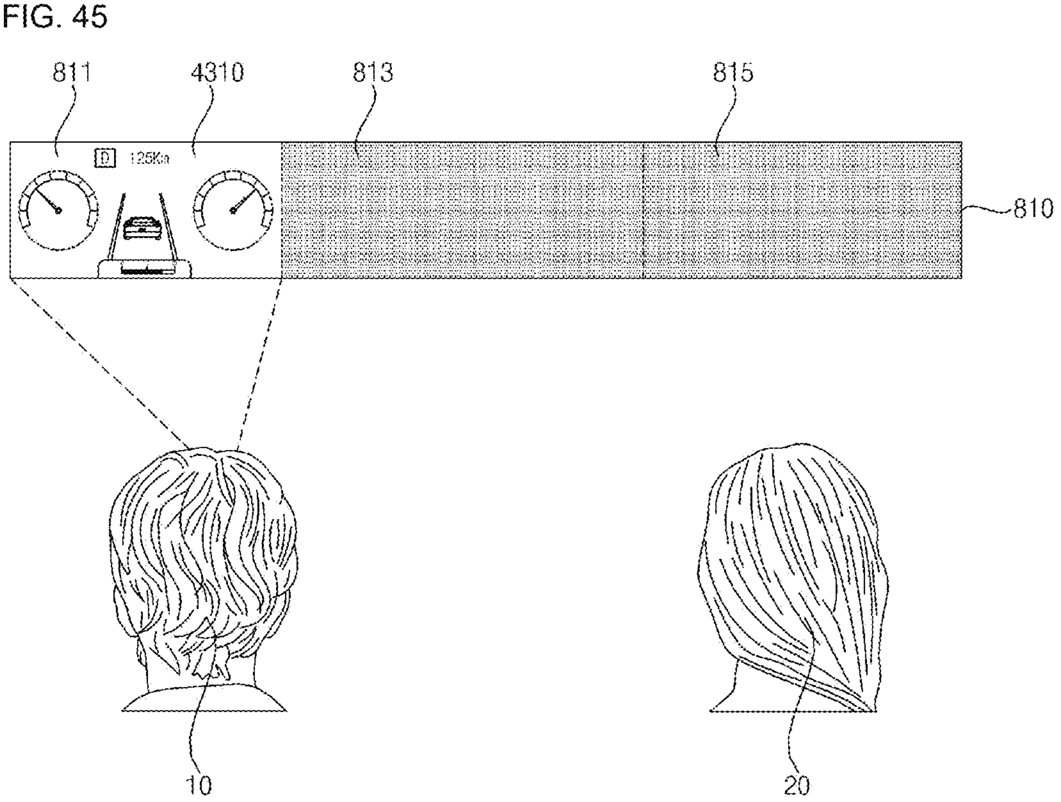
Figure 46:
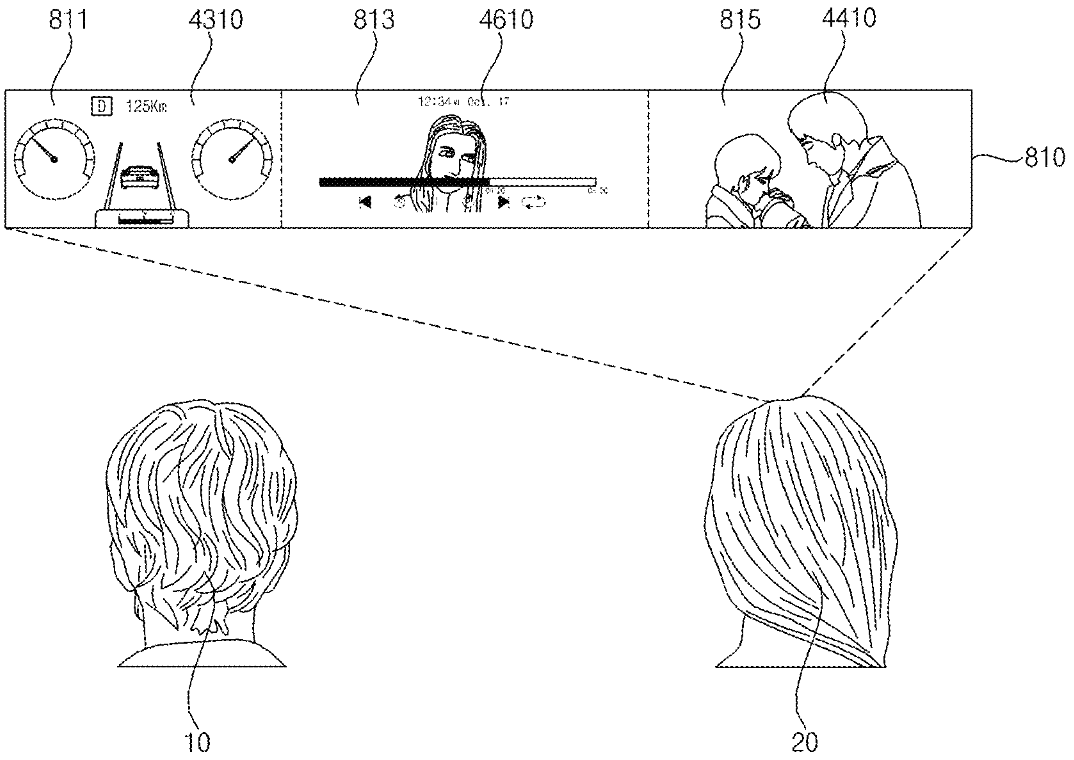

Referring to FIGS. 45 and 46, as real-time OTT service-related content 4610 output through the second area 813 and movie-related content 4410 output through the third area 815 are both video content, the vehicle display device 251 may determine the second area 813 and the third area 815 as the first restricted area.

The vehicle display device 251 may restrict light emitted toward the driver's seat from the second area 813 and the third area 815 of the display panel 810, which are determined as the first restricted area. The vehicle display device 251 may apply voltage to the second upper substrate 1233 and the second lower substrate 1234 disposed in one area of the viewing angle adjustment panel 1100 corresponding to the second area 813 and the third area 815 of the display panel 810. In this case, as the arrangement of the liquid crystal molecules of the second liquid crystal layer 1212 corresponding to the second area 813 and the third area 815 is changed, light emitted from the second area 813 and the third area 815 toward the driver's seat may be restricted.

Thus, the driver 10 may only be able to view the instrument panel screen 4310, and may not be able to view the real-time OTT service-related content 4610 and the movie-related content 4410. By contrast, the passenger 20 may be able to view all of the instrument panel screen 4310, the real-time OTT service-related content 4610, and the movie-related content 4410.

Figure 47:
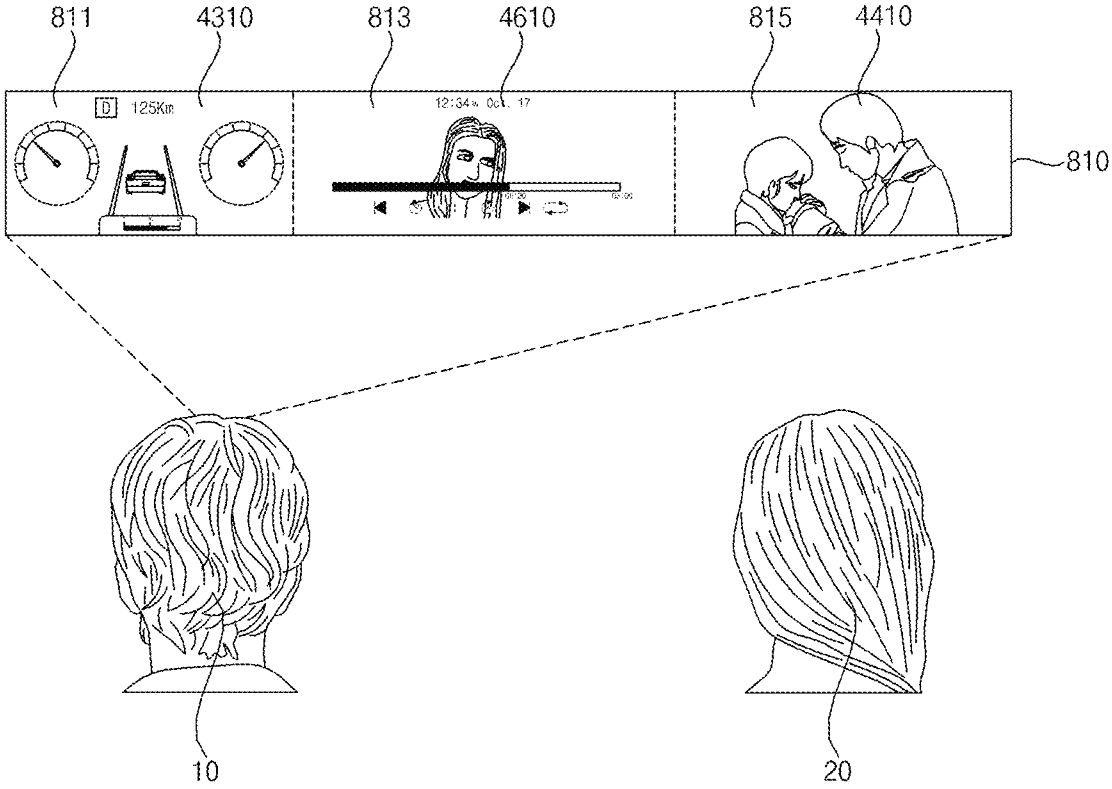

Meanwhile, referring to FIG. 47, when the speed of the vehicle 100 is less than a preset speed limit (e.g., 10 km per hour), when the autonomous mode is set, when the state of a transmission is park (P), etc., the first condition related to driving of the vehicle 100 may not be satisfied. In this case, the vehicle display device 251 may stop applying voltage to the second upper substrate 1233 and the second lower substrate 1234 disposed in one area of the viewing angle adjustment panel 1100. Accordingly, like the passenger 20, the driver 10 may be able to view all of the instrument panel screen 4310, the real-time OTT service-related content 4610, and the movie-related content 4410.

Figure 48:
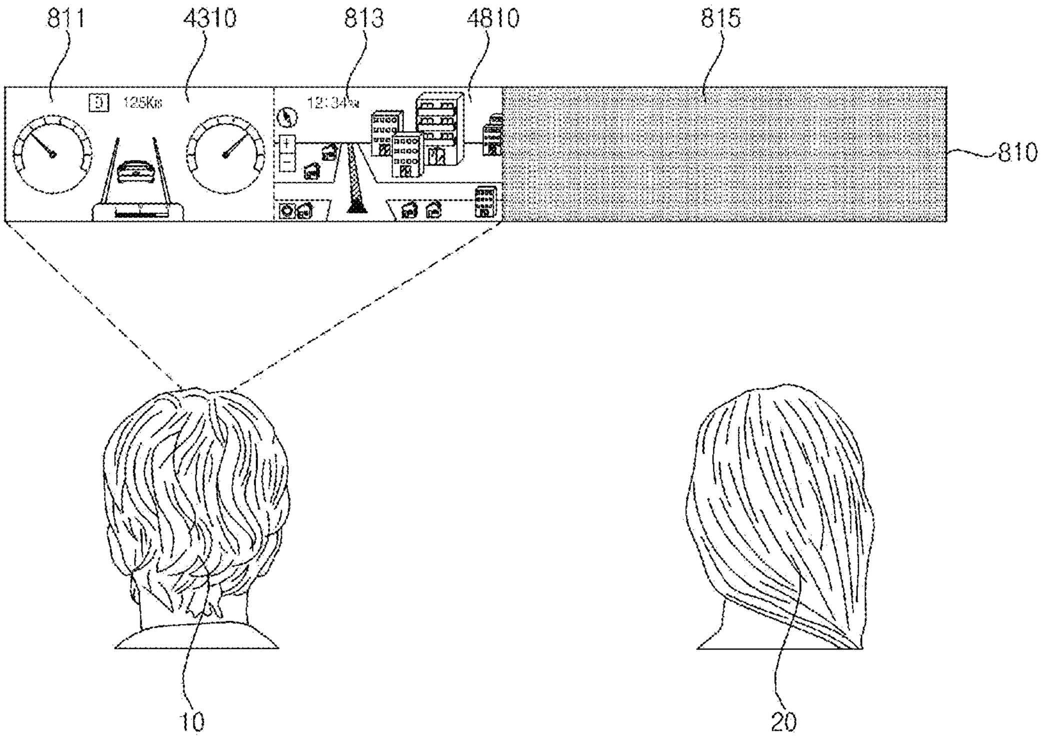
Figure 49:
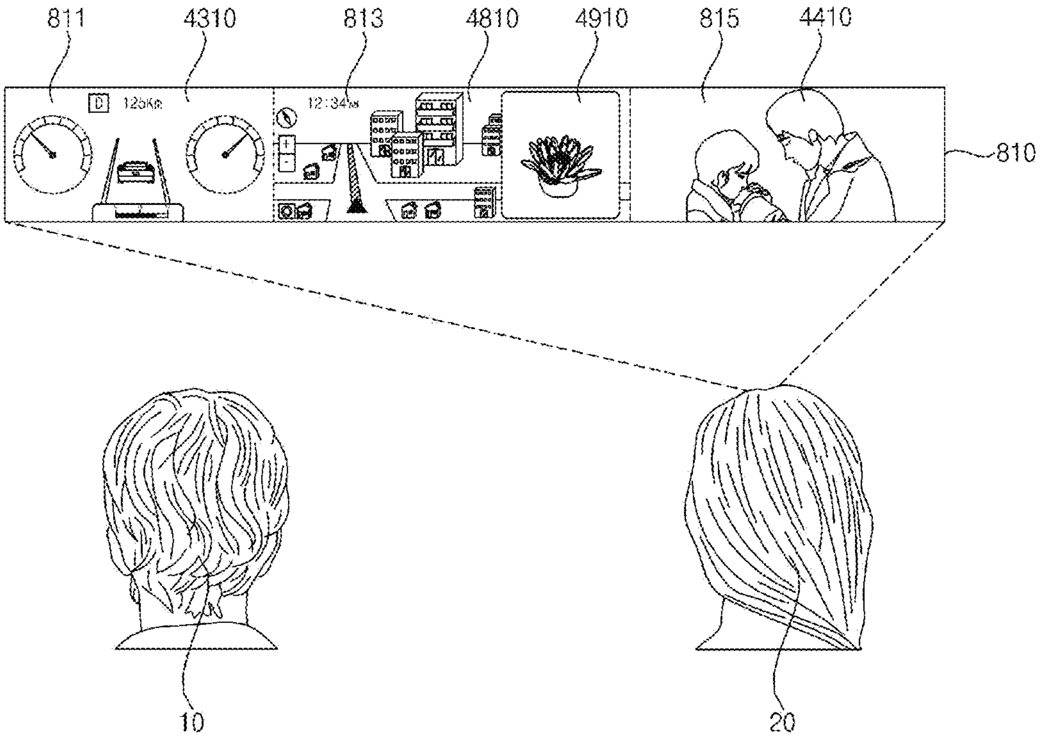

Referring to FIGS. 48 and 49, a navigation screen 4810 and photo-related content 4910 may be output through the second area 813 of the display panel 810. As the instrument panel screen 4310 output through the first area 811 and the navigation screen 4810 output through the second area 813 are both driving-related content, the vehicle display device 251 may determine the first restricted area between the first area 811 and the second area 813, excluding an area where the navigation screen 4810 is output.

When the speed of the vehicle 100 is greater than or equal to a preset speed limit (e.g., 10 km per hour), the display device 251 may determine the third area 815, where movie-related content 4410 is output, as the first restricted area. Meanwhile, when the speed of the vehicle 100 is a predetermined speed (e.g., 60 km/h), the display device 251 may determine, between the third area 815 and the second area 813, an area where the photo-related content 4910 is output as the first restricted area.

Thus, the driver 10 may be able to view all of the instrument panel screen 4310, the navigation screen 4810, and the photo-related content 4910 when the speed of the vehicle 100 is greater than or equal to the preset speed limit (e.g., 10 km/h) and less than the predetermined speed (e.g., 60 km/h). In addition, the driver 10 may only be able to view the instrument panel screen 4310 and the navigation screen 4810 when the speed of the vehicle 100 is greater than or equal to the predetermined speed (e.g., 60 km/h).

Figure 50:
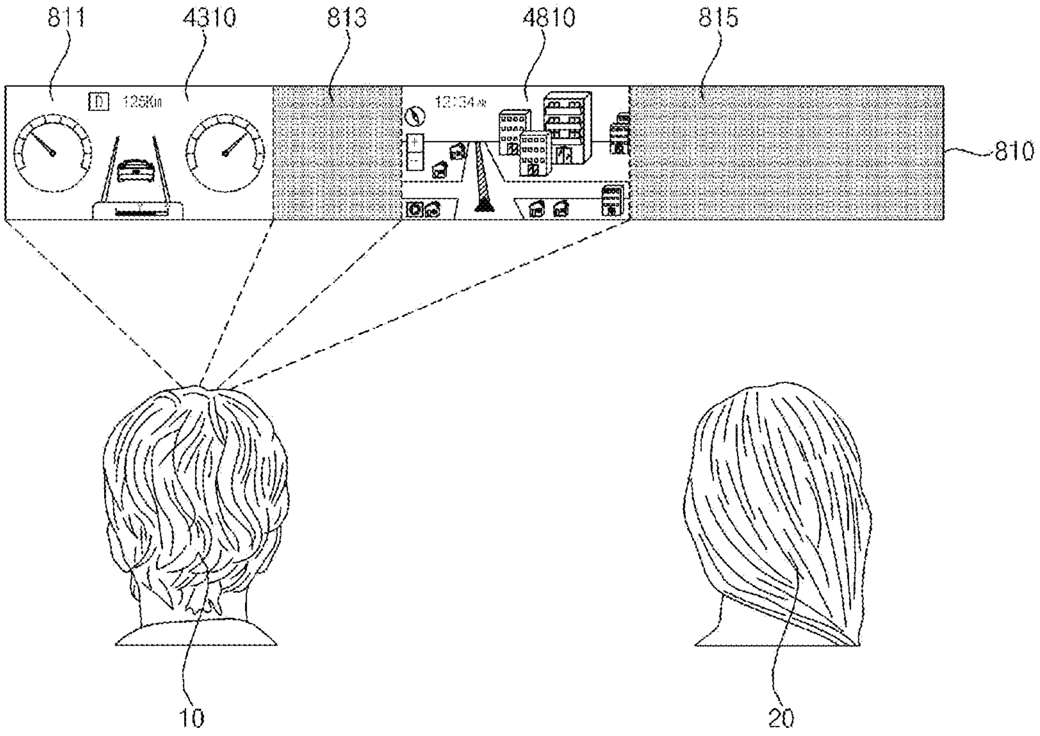
Figure 51:
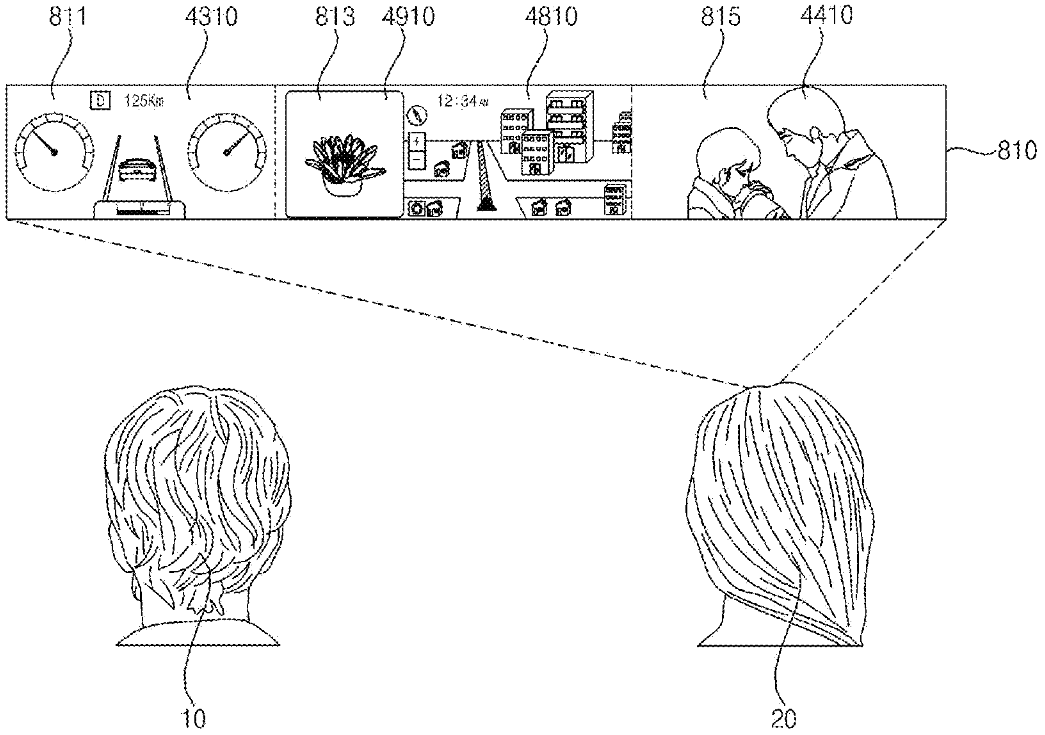

Referring to FIGS. 50 and 51, a navigation screen 4810 and photo-related content 4910 may be output through the second area 813 of the display panel 810. As the instrument panel screen 4310 output through the first area 811 and the navigation screen 4810 output through the second area 813 are both driving-related content, the vehicle display device 251 may determine the first restricted area between the first area 811 and the second area 813, excluding an area where the navigation screen 4810 is not output.

As the movie-related content 4410 corresponding to video content is output through the third area 815, the vehicle display device 251 may determine the third area 815 as the first restricted area.

Meanwhile, when the movie-related video content 4410 and the photo-related content 4910 are transmitted from a mobile device of the passenger 20 to the vehicle 100, the vehicle display device 251 may determine the third area 815 and a portion of the second area 813 where the photo-related content 4910 is output as the second restricted area. In this case, the third area 815 and the portion of the second area 813 where the photo-related content 4910 is output, may correspond to a restricted area related to privacy of the passenger seat (hereinafter referred to as a "third restricted area") included in the second restricted area.

The vehicle display device 251 may restrict light emitted toward the driver's seat from the third area 815 of the display panel 810, which is determined as the first restricted area and the third restricted area. In addition, the vehicle display device 251 may restrict light emitted toward the driver's seat from a portion of the second area 813 where the photo-related content 4910 is output, which is determined as the third restricted area.

Thus, while the first condition related to driving of the vehicle 100 is satisfied, the driver 10 may only be able to view the instrument panel screen 4310 and the navigation screen 4810, and may not be able to view the movie-related video content 4410 and the photo-related content 4910. In addition, the driver 10 may not be able to view the movie-related video content 4410 and the photo-related content 4910 when the first condition related to driving of the vehicle 100 is not satisfied. By contrast, the passenger 20 may be able to view all of the instrument panel screen 4310, the photo-related content 4910, the navigation screen 4810, and the movie-related content 4410.

Figure 52:
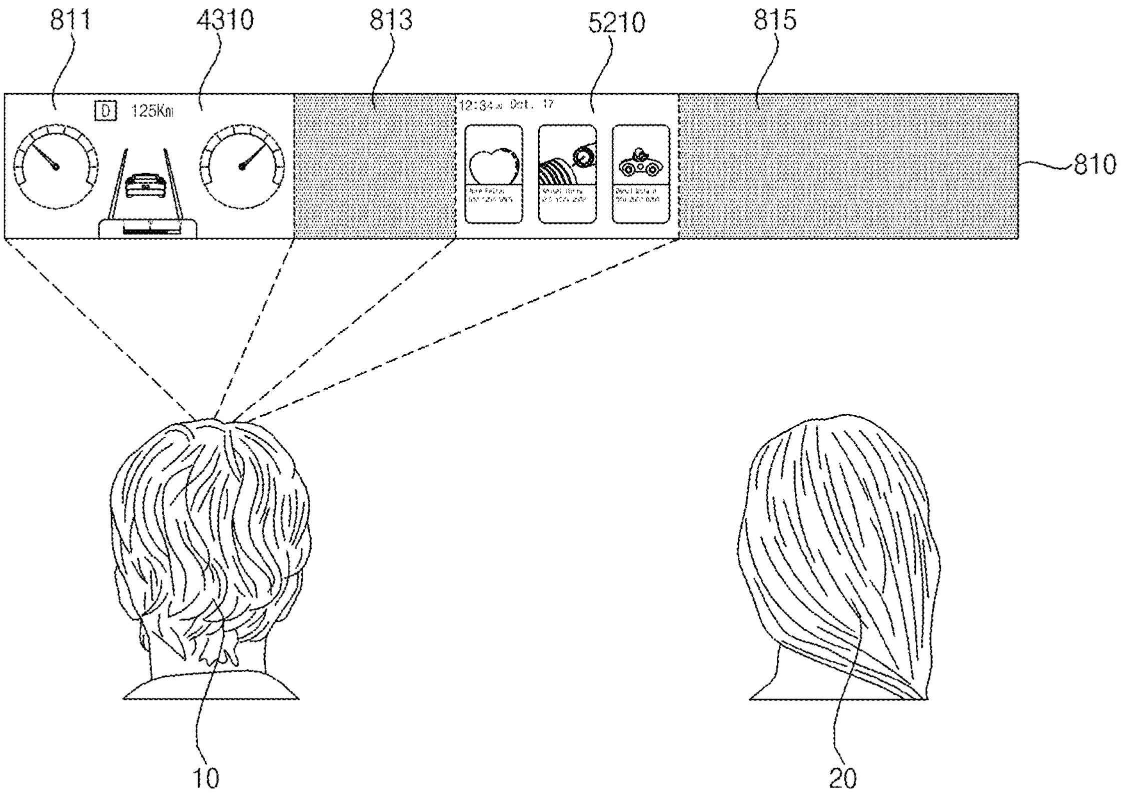
Figure 53:
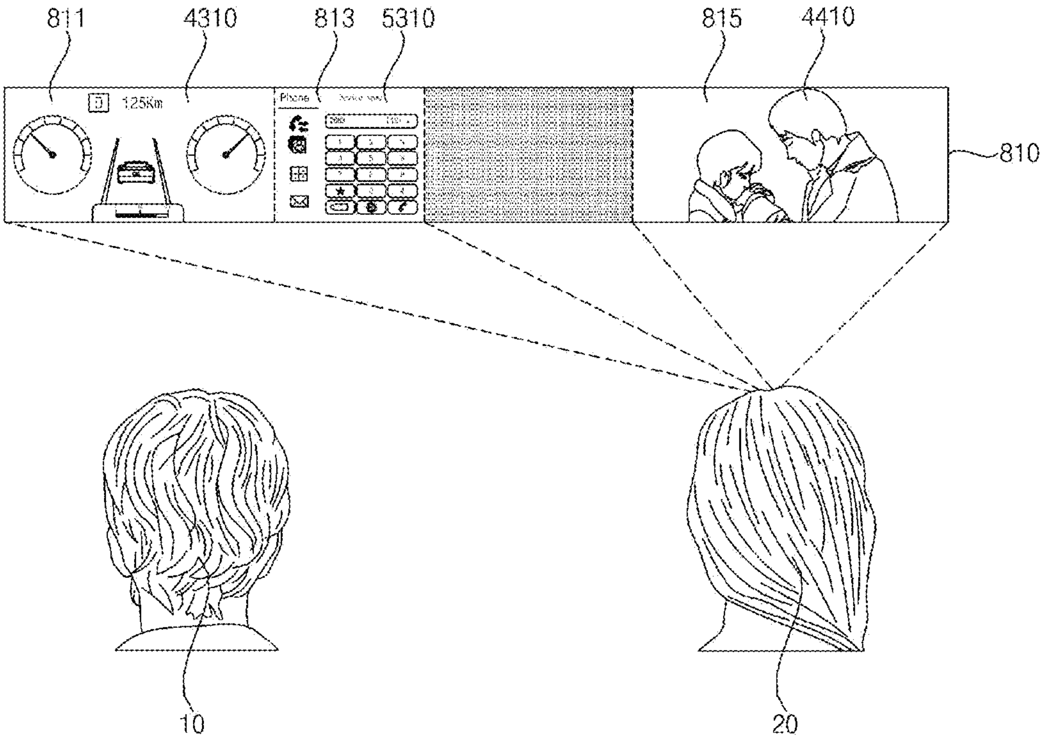

Referring to FIGS. 52 and 53, contact-related content 5210 and keypad-related content 5310 may be output through the second area 813 of the display panel 810. In this case, the contact-related content 5210 may be transmitted from the mobile device of the driver 10 to the vehicle 100. In addition, the keypad-related content 5310 may be preset as exclusive content for the passenger 20.

As the movie-related content 4410 corresponding to video content is output through the third area 815, the vehicle display device 251 may determine the third area 815 as the first restricted area.

Meanwhile, when the contact-related content 5210 is transmitted from the mobile device of the driver 10 to the vehicle 100, the vehicle display device 251 may determine a portion of the second area 813 where the contact-related content 5210 is output as the second restricted area. In this case, the portion of the second area 813 where the contact-related content 5210 is output may correspond to a restricted area related to privacy of the driver's seat (hereinafter referred to as a "fourth restricted area") included in the second restricted area. In addition, a portion of the second area 813 where the keypad-related content 5310, which is preset as exclusive content for the passenger 20, is output may correspond to the third restricted area of the second restricted area.

The vehicle display device 251 may restrict light emitted toward the driver's seat from the third area 815 of the display panel 810, which is determined as the first restricted area. In addition, the vehicle display device 251 may restrict light emitted toward the driver's seat from a portion of the second area 813 where the keypad-related content 5310 is output, which is determined as the third restricted area.

Meanwhile, the vehicle display device 251 may restrict light emitted toward the passenger seat from a portion of the second area 813 where the contact-related content 5210 is output, which is determined as the fourth restricted area. The vehicle display device 251 may apply voltage to the third upper substrate 1235 and the third lower substrate 1236 disposed in one area of the viewing angle adjustment panel 1100 corresponding to an area where the contact-related content 5210 is output. In this case, as the arrangement of the liquid crystal molecules of the third liquid crystal layer 1213 corresponding to the area where the contact-related content 5210 is output is changed, light emitted toward the passenger seat from the area where the contact-related content 5210 is output may be restricted.

Thus, while the first condition related to driving of the vehicle 100 is satisfied, the driver 10 may only be able to view the instrument screen panel 4310 and the contact information-related content 5210, and may not be able to view the movie-related video content 4410 and the keypad-related content 5310. In addition, the passenger 20 may only be able to view the instrument panel screen 4310, the keypad-related content 5310, and the movie-related content 4410, and may not be able to view the contact-related content 5210.

Figure 54:
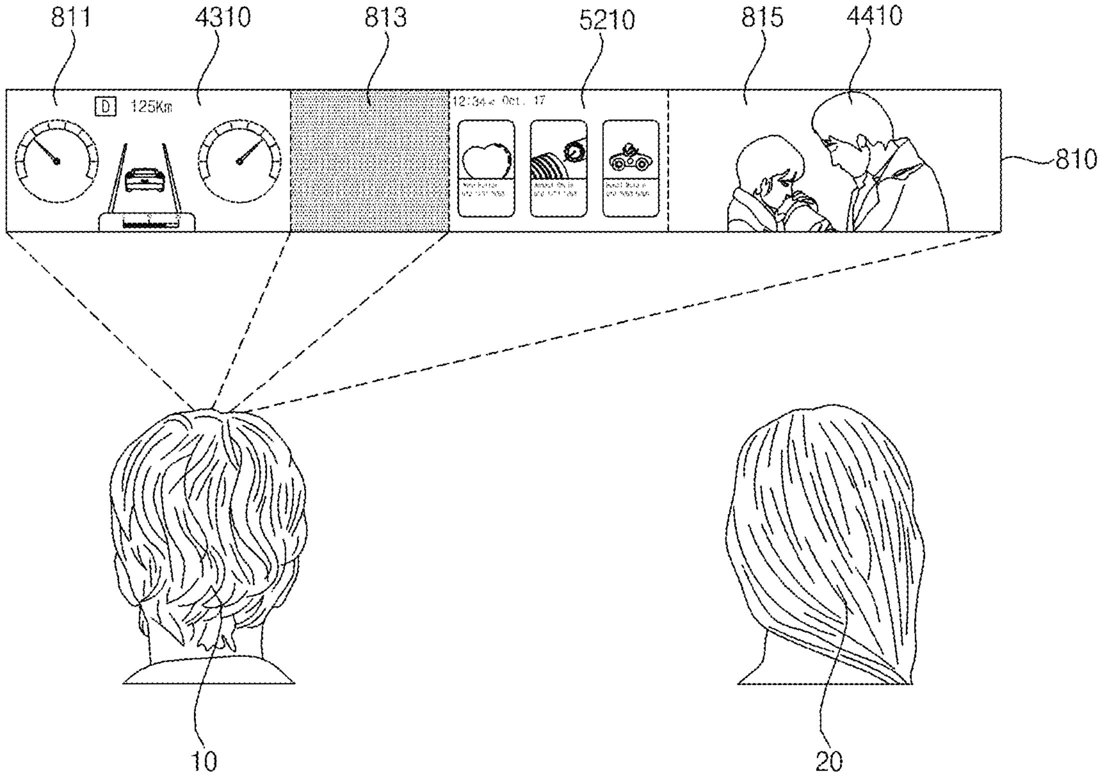

Meanwhile, referring to FIG. 54, when the speed of the vehicle 100 is less than a preset speed limit (e.g., 10 km per hour), when the autonomous mode is set, when the state of the transmission is park (P), etc., the first condition related to driving of the vehicle 100 may not be satisfied. In this case, the vehicle display device 251 may stop applying voltage to the second upper substrate 1233 and the second lower substrate 1234 disposed in one area of the viewing angle adjustment panel 1100. Accordingly, like the passenger 20, the driver 10 may be able to view the movie-related content 4410.

Meanwhile, when the first condition related to driving of the vehicle 100 is not satisfied, the driver 10 may not be able to view the keypad-related content 5310 output through a portion of the second area 813.

Figure 55:
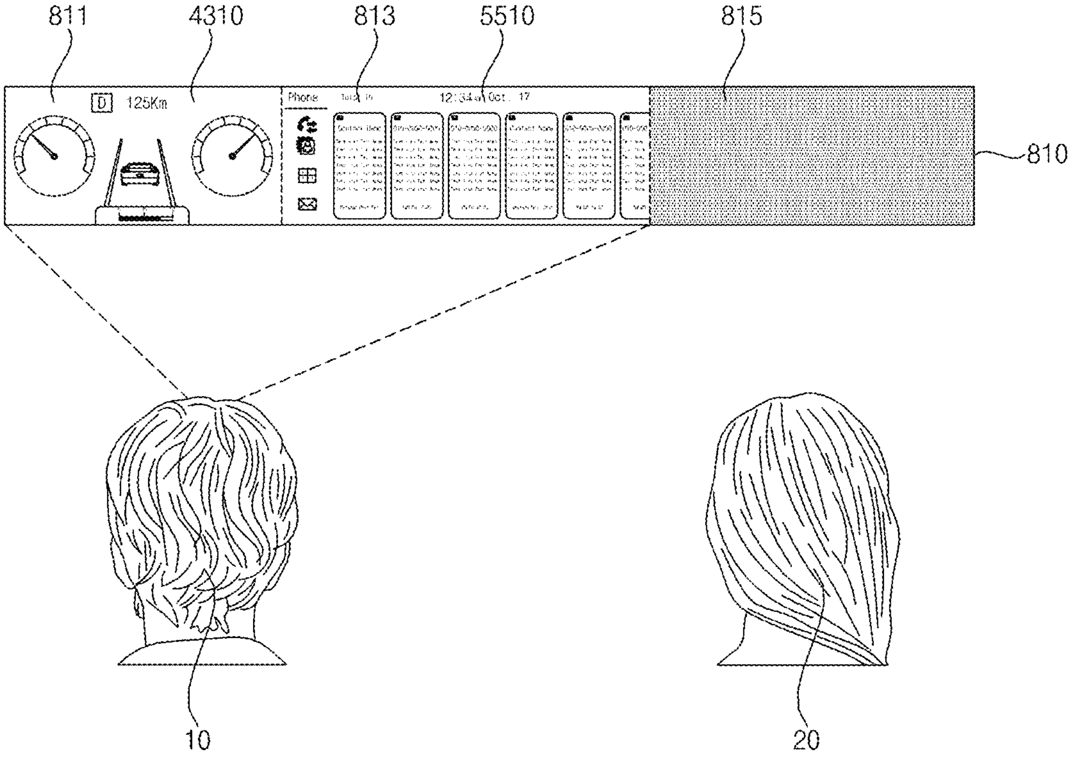
Figure 56:
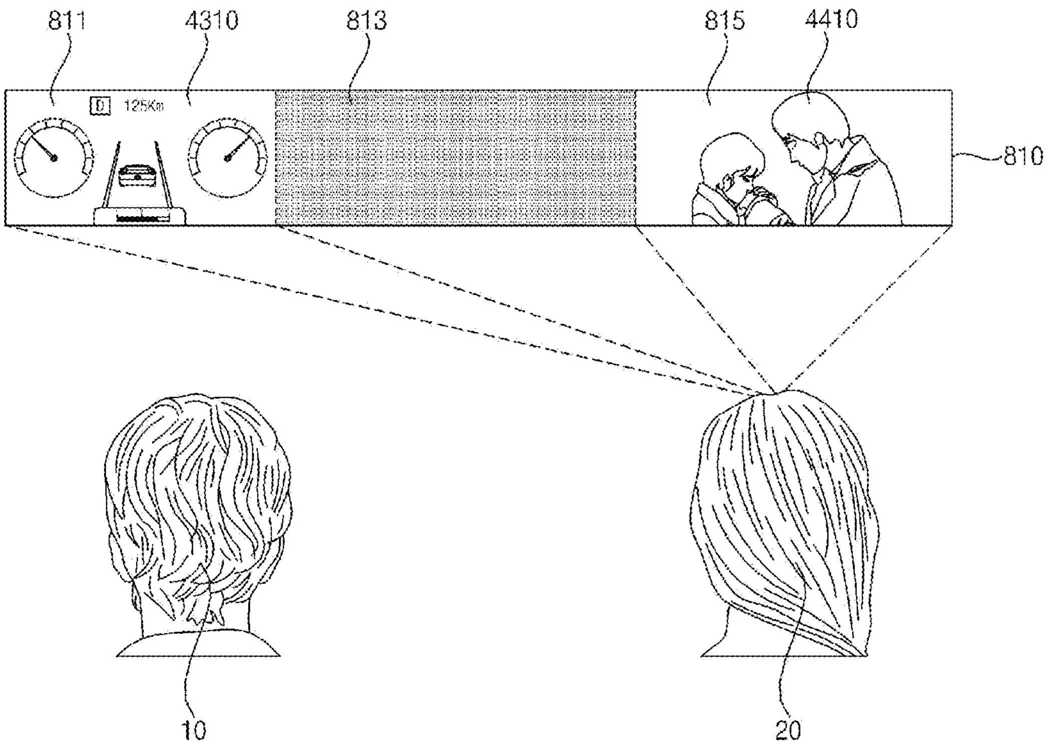

Referring to FIGS. 55 and 56, movie-related content 4410 may be transmitted from the mobile device of the passenger 20 to the vehicle 100, or may be set as exclusive content for the passenger 20. In this case, the third area 815 where the movie-related content 4410 is output may be determined as the third restricted area of the second restricted area. In addition, text message-related content 5510 may be transmitted from the mobile device of the driver 10 to the vehicle 100, or may be set as exclusive content for the driver 10. In this case, a portion of the second area 813 where the text message-related content 5510 is output may be determined as the fourth restricted area of the second restricted area.

The vehicle display device 251 may restrict light emitted toward the driver's seat from the third area 815 determined as the third restricted area. In addition, the vehicle display device 251 may restrict light emitted toward the passenger seat from the second area 813 determined as the fourth restricted area. Accordingly, the driver 10 may only be able to view the instrument panel screen 4310 and the text message-related content 5510, and may not be able to view the movie-related video content 4410. In addition, the passenger 20 may only be able to view the instrument panel screen 4310 and the movie-related content 4410, and may not be able to view the text message-related content 5510.

Figure 57:
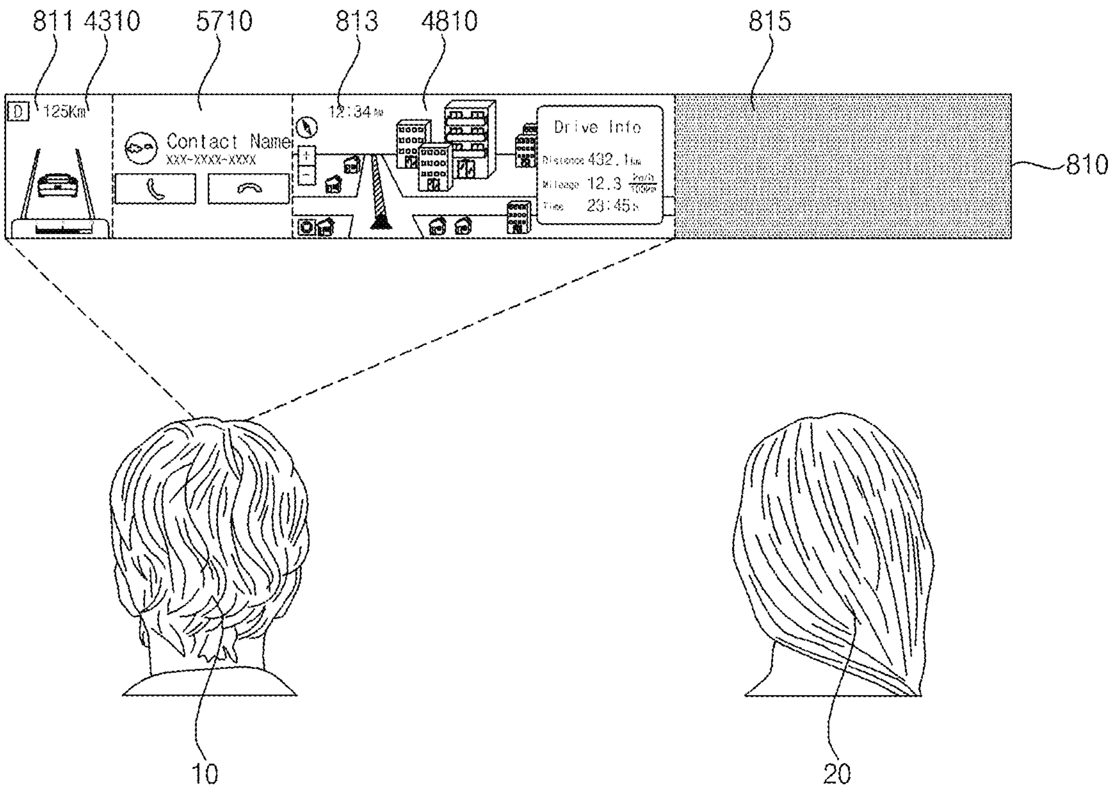
Figure 58:
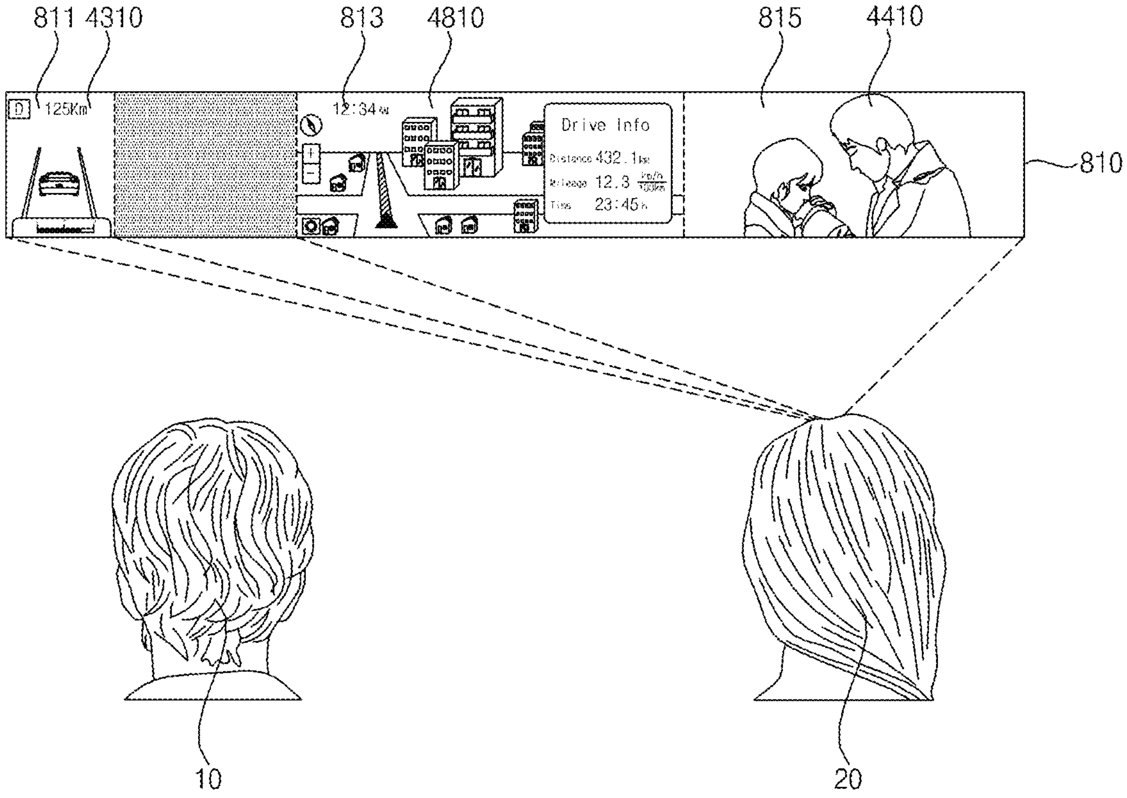

Referring to FIGS. 57 and 58, as movie-related content 4410 corresponding to video content is output through the third area 815, the vehicle display device 251 may determine the third area 815 as the first restricted area. In addition, call function-related content 5710 may be preset as exclusive content for the driver 10. In this case, a portion of the first area 811 where the call function-related content 5710 is output may be determined as the fourth restricted area of the second restricted area.

The vehicle display device 251 may restrict light emitted toward the driver's seat from the third area 815, which is determined as the first restricted area. In addition, the vehicle display device 251 may restrict light emitted toward the passenger seat from a portion of the first area 811 where the call function-related content 5710 is output, which is determined as the fourth restricted area.

Thus, while the first condition related to driving of the vehicle 100 is satisfied, the driver 10 may only be able to view the instrument panel screen 4310, the call function-related content 5710, and the navigation screen 4810, and may not be able to view the movie-related video content 4410. By contrast, the passenger 20 may only be able to view the instrument panel screen 4310, the navigation screen 4810, and the movie-related video content 4410, and may not be able to view the call function-related content 5710.

Figure 59:
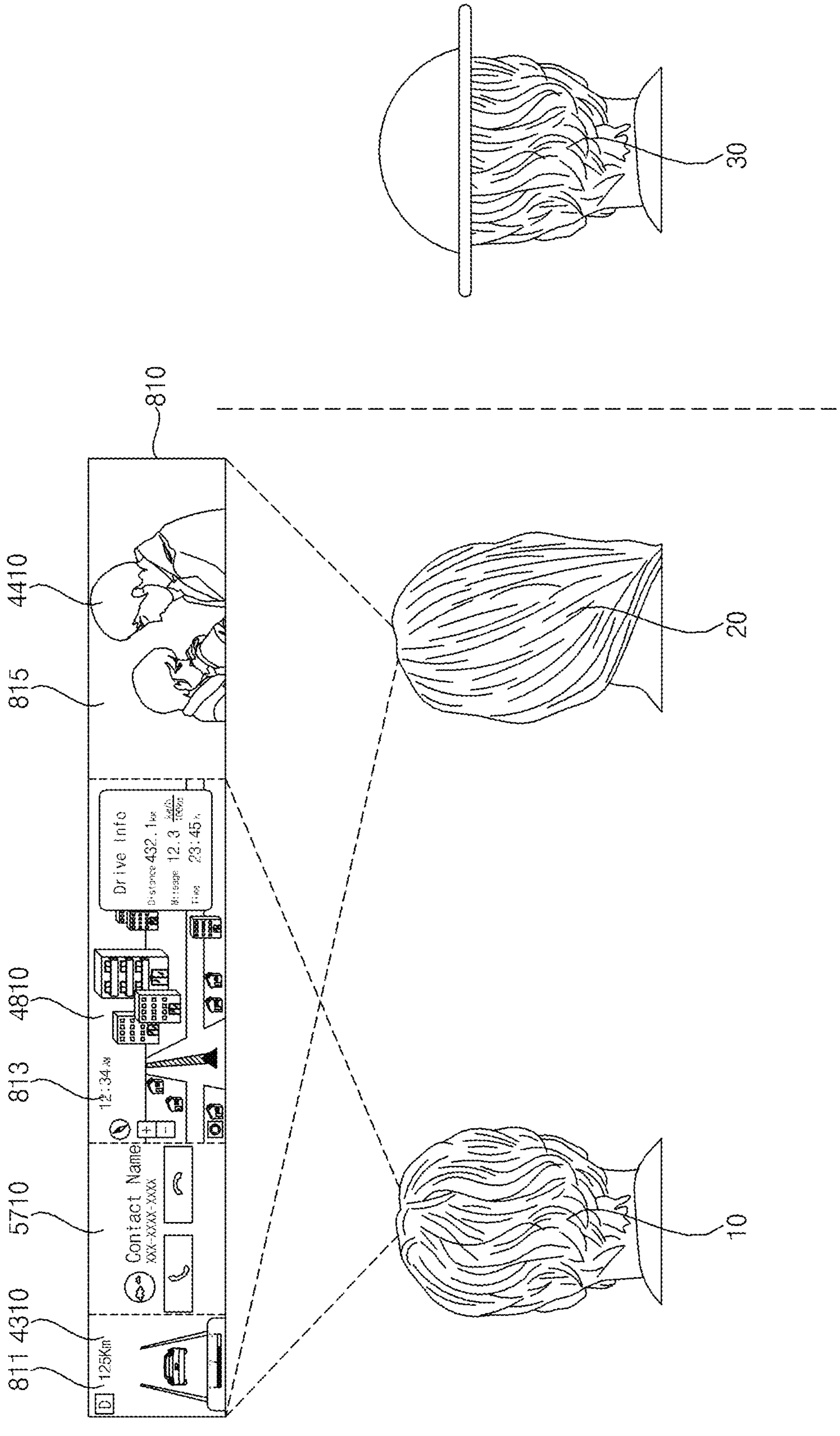
Figure 60:
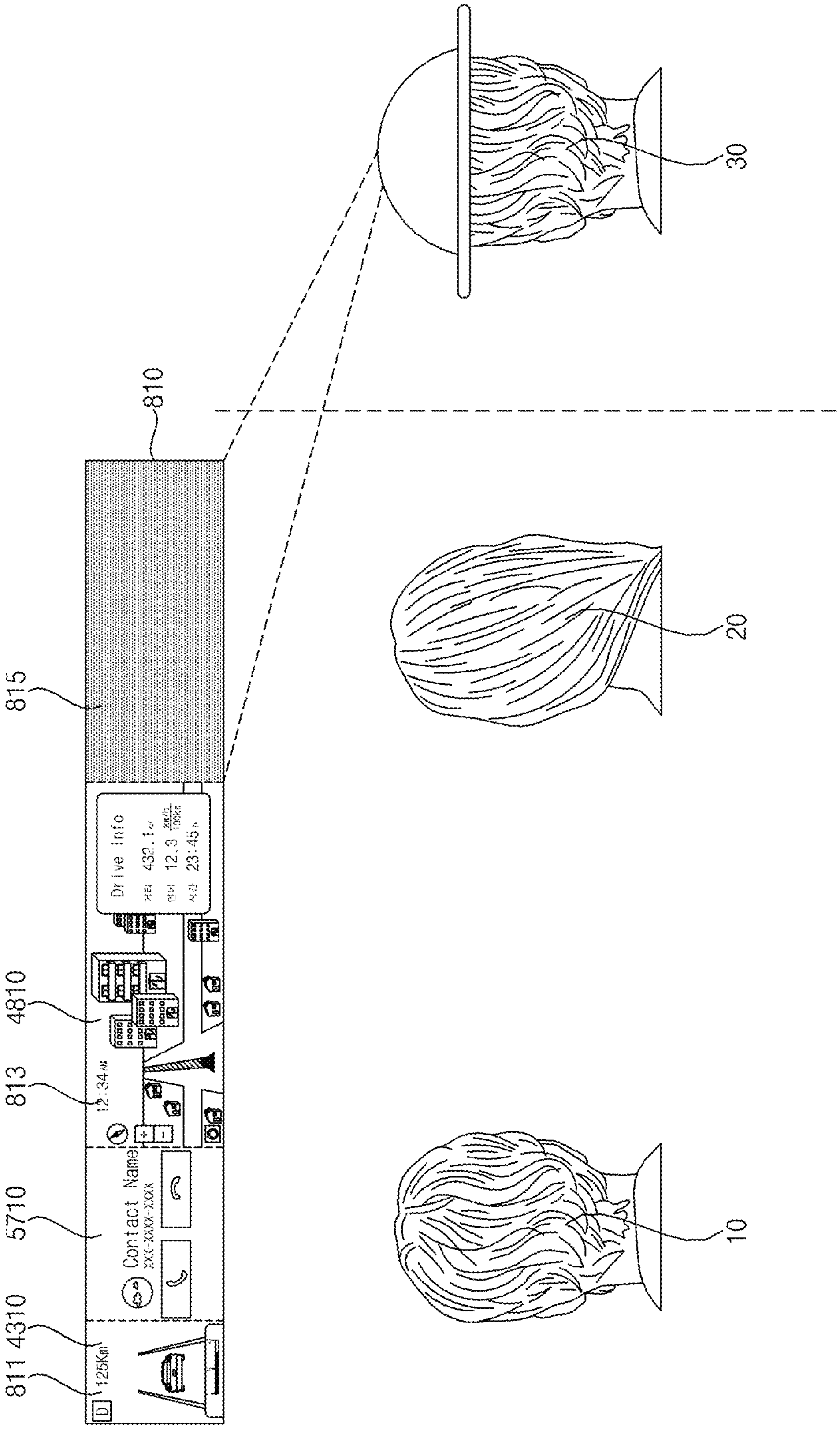

Referring to FIGS. 59 and 60, the vehicle display device 251 according to an embodiment of the present disclosure may use the viewing angle adjustment panel 1100 to block an image output through the display panel 810 from being exposed to the outside of the vehicle 100.

The controller 170 and/or the processor 370 may determine, through the object detection device 300, whether a nearby vehicle OB11, a pedestrian OB12, a two-wheeled vehicle OB13, or the like approaches the right side of the vehicle 100 where the passenger seat is located. When it is determined that the nearby vehicle OB11, the pedestrian OB12, the two-wheeled vehicle OB13, or the like approaches the right side of the vehicle 100, the vehicle display device 251 may adjust, through the viewing angle control panel 1100, a viewing angle corresponding to the third area 815. The vehicle display device 251 may apply voltage to the third upper substrate 1235 and the third lower substrate 1236 disposed in one area of the viewing angle adjustment panel 1100 corresponding to the third area 815. In this case, as the arrangement of the liquid crystal molecules of the third liquid crystal layer 1213 corresponding to the third area 815 is changed, light emitted toward the right outside of the vehicle 100 may be restricted.

Thus, the pedestrian 30 located outside the vehicle 100 may not be able to view the movie-related content 4410 output through the third area 815. Meanwhile, the driver 10 and the passenger 20 located inside the vehicle 100 may be able to view all of the instrument panel screen 4310, the call function-related content 5710, the navigation screen 4810, and the movie-related content 4410.

In the present disclosure, the screen output through the third area 815 is described as an example, but the present disclosure is not limited thereto. The controller 170 and/or the processor 370 may determine, through the object detection device 300, whether a nearby vehicle OB11, a pedestrian OB12, a two-wheeled vehicle OB13, or the like, approaching the left side of the vehicle 100 where the driver's seat is located. In this case, when it is determined that the nearby vehicle OB11, the pedestrian OB12, the two-wheeled vehicle OB13, or the like approaches the left side of the vehicle 100, the vehicle display device 251 may adjust a viewing angle corresponding to the first area 811 through the control panel 1100. The vehicle display device 251 may apply voltage to the second upper substrate 1233 and the second lower substrate 1234 disposed in one area of the viewing angle adjustment panel 1100 corresponding to the first area 811. In this case, as the arrangement of the liquid crystal molecules of the second liquid crystal layer 1212 corresponding to the first area 811 is changed, light emitted toward the left outside of the vehicle 100 may be restricted.

As described above, according to at least one embodiment of the present disclosure, it is possible to adjust a viewing angle for the display panel 810.

According to at least one embodiment of the present disclosure, it is possible to variously adjust a display area where a viewing angle is adjustable.

According to at least one embodiment of the present disclosure, it is possible to compensate for the luminance of an image output through an area where a viewing angle is adjustable, when a viewing angle for the display panel is adjusted.

According to at least one embodiment of the present disclosure, it is possible to prevent the privacy of a specific person in the vehicle 100 from being exposed to others in the vehicle 100.

According to at least one embodiment of the present disclosure, it is possible to prevent content output through the display panel 810 from being exposed to the outside of the vehicle 100.

The above description should not be construed as restrictive in all aspects but considered as illustrative. The scope of the disclosure should be determined by reasonable interpretation of the appended claims and all changes that come within the equivalent scope of the disclosure are included in the scope of the disclosure.

Meanwhile, the method of operating the vehicle display device of the present disclosure can be implemented as processor-readable code in a recording medium readable by a processor provided in the image display device. The processor-readable recording medium may be any type of recording device capable of storing data readable by a processor. Examples of the processor-readable recording medium may include a ROM, a RAM, a CD-ROM, a magnetic tape, a floppy disc, and an optical data storage device. Also, the processor-readable recording medium may be implemented as a carrier wave (e.g., data transmission over the Internet). The processor-readable recording medium may be distributed to a computer system connected via a network so that the processor-readable codes may be saved and executed in a distributed manner.

Although the preferred embodiments of the present disclosure have been illustrated and described, those skilled in the art will appreciate that the present disclosure should not be limited to the above specific embodiments and various modifications thereof are possible without departing from the scope and spirit of the disclosure as disclosed in the accompanying claims, and these modifications should not be understood independently of the technical idea of the present disclosure.

The invention claimed is:

1. A display device for a vehicle, the display device comprising:

a display panel configured to output at least one content;

a viewing angle adjustment panel including at least one liquid crystal layer comprising liquid crystal molecules; and a controller configured to control an arrangement of the liquid crystal molecules to change a viewing angle for the display panel, wherein the viewing angle adjustment panel comprises a plurality of sub-units disposed side by side to correspond to each of a plurality of areas constituting the display panel, each of the plurality of sub-units including the at least one liquid crystal layer and a plurality of substrates respectively disposed on both sides of the at least one liquid crystal layer, wherein the controller is configured to;

determine a first restricted area of the display panel based on a first condition related to driving of the vehicle and a second restricted area of the display panel based on a second condition related to privacy, control the arrangement of the liquid crystal molecules of a first sub-unit corresponding to the first restricted area among the plurality of sub-units to change the first viewing angle of the first restricted area by applying a first voltage to the plurality of substrates of the first sub-unit, control the arrangement of the liquid crystal molecules of a second sub-unit corresponding to the second restricted area among the plurality of sub-units to change a second viewing angle of the second restricted area by applying a second voltage to the plurality of substrates of the second sub-unit, wherein the first restricted area and the second restricted area correspond to different positions on the display panel, and wherein the first viewing angle corresponding to the first voltage and the second viewing angle corresponding to the second voltage are different.

2. The display device of claim 1, wherein the viewing angle adjustment panel comprises a plurality of substrates disposed on both sides of the liquid crystal layer, respectively, wherein, based on a voltage being applied to the plurality of substrates, the arrangement of the liquid crystal molecules is changed to a predetermined direction that restricts emission of light toward a driver's seat, and wherein the controller is configured to apply a predetermined voltage to the plurality of substrates disposed in one area of the viewing angle adjustment panel that corresponds to at least one of the first restricted area and the second restricted area.

3. The display device of claim 2, wherein the voltage applied to the one area of the viewing angle adjustment panel increases as a distance between the one area of the viewing angle adjustment panel and the driver's seat decreases.

4. The display device of claim 1, wherein, based on a speed of the vehicle being greater than or equal to a predetermined speed limit, which is one of the first condition, the controller is configured to determine one area of the display panel that is adjacent to a passenger seat as the first restricted area, and wherein a size of the first restricted area increases as the speed of the vehicle increases.

5. The display device of claim 4, wherein, based on predetermined content related to driving of the vehicle being output, which is one of the first condition, the controller is configured to determine the first restricted area in a remaining area, excluding an area where the predetermined content is output.

6. The display device of claim 2, wherein, based on predetermined content corresponding to a passenger seat being output, which is one of the second condition, the controller is configured to determine an area of the display panel where the predetermined content is output as the second restricted area.

7. The display device of claim 1, wherein the controller is configured to:

based on a state of a transmission of the vehicle corresponding to drive (D), reverse (R), or neutral (N), perform a determination on the first condition and the second condition; and based on the state of the transmission of the vehicle corresponding to park (P), perform a determination on the second condition.

8. The display device of claim 1, wherein the controller is configured to:

based on the vehicle being in a manual mode, perform a determination on the first condition and the second condition; and based on the vehicle being in an autonomous mode, perform a determination on the second condition.

9. The display device of claim 1, wherein the viewing angle adjustment panel comprises:

a plurality of first substrates respectively disposed on both sides of a first liquid crystal layer; and a plurality of second substrates respectively disposed on both sides of a second liquid crystal layer, wherein, based on a voltage being applied to the plurality of first substrates, an arrangement of liquid crystal molecules included in the first liquid crystal layer is changed to a first direction that restricts emission of light toward a driver's seat, and wherein, based on a voltage being applied to the plurality of second substrates, an arrangement of liquid crystal molecules included in the second liquid crystal layer is changed to a second direction that restricts emission of light toward a passenger seat.

10. The display device of claim 9, wherein the controller is configured to:

apply a predetermined voltage to the plurality of first substrates disposed in a first adjustment area of the viewing angle adjustment panel corresponding to the first restricted area and, of the second restricted area, a third restricted area related to privacy of the passenger seat; and apply a predetermined voltage to the plurality of second substrates disposed in a second adjustment area of the viewing angle adjustment panel corresponding to a fourth restricted area related to privacy of the driver's seat of the second restricted area.

11. The display device of claim 10, wherein the controller is configured to:

based on first content corresponding to the passenger seat being output, which is one of the second condition, determine an area of the display panel where the first content being output as the third restricted area; and based on second content corresponding to the driver's seat being output, which is one the second condition, determine an area of the display panel where the second content is output as the fourth restricted area.

12. The display device of claim 11, wherein, based on a gaze of a user seated in the driver's seat being directed forward, the controller is configured to stop determining on the first condition and, of the second condition, on whether the first content is output.

13. The display device of claim 11, wherein the controller is configured to:

based on a user being seated in the passenger seat, perform a determination on the second condition; and based on the user not being seated in the passenger seat, stop determining on the second condition.

14. The display device of claim 9, wherein the controller is configured to:

based on a predetermined object located outside the vehicle approaching the driver's seat, apply a predetermined voltage to the plurality of first substrates disposed in one area of the viewing angle adjustment panel; and based on the predetermined object approaching the passenger seat, apply a predetermined voltage to the plurality of second substrates disposed in one area of the viewing angle adjustment panel.

* * * * *